US012236774B2

(12) United States Patent
Scalisi

(10) Patent No.: US 12,236,774 B2
(45) Date of Patent: Feb. 25, 2025

(54) DOORBELL COMMUNICATION SYSTEMS AND METHODS

(71) Applicant: SkyBell Technologies IP, LLC, Irvine, CA (US)

(72) Inventor: Joseph Frank Scalisi, Yorba Linda, CA (US)

(73) Assignee: SkyBell Technologies IP, LLC, Irvine, CA (US)

( * ) Notice: Subject to any disclaimer, the term of this patent is extended or adjusted under 35 U.S.C. 154(b) by 54 days.

(21) Appl. No.: 17/887,334

(22) Filed: Aug. 12, 2022

(65) Prior Publication Data

US 2022/0392317 A1 Dec. 8, 2022

Related U.S. Application Data

(63) Continuation of application No. 16/983,137, filed on Aug. 3, 2020, now abandoned, which is a
(Continued)

(51) Int. Cl.
*G08B 3/10* (2006.01)
*G08B 7/06* (2006.01)
(Continued)

(52) U.S. Cl.
CPC .......... *G08B 3/10* (2013.01); *H04L 12/2818* (2013.01); *H04L 12/2825* (2013.01);
(Continued)

(58) Field of Classification Search
CPC .......... G08B 3/10; G08B 7/064; G08B 15/00; G08B 25/009; G08B 19/00; G08B 7/06;
(Continued)

(56) References Cited

U.S. PATENT DOCUMENTS 3,480,727 A 11/1969 Moore
4,075,659 A 2/1978 Desanti
(Continued)

FOREIGN PATENT DOCUMENTS

CA 2228679 A1 8/1999
CA 2691774 A1 8/2010
(Continued)

OTHER PUBLICATIONS

Panasonic—"Panasonic Network Camera Operating Instructions Model No. KX-HCM270"—Instruction Manual—Printed in Japan, 2002—Downloaded Jun. 9, 2021—Available from Internet <URL: http://www.voicesonic.com/panasonic/manuals/Panasonic_Cameras/KX-HCM270_Network_Camera_Manual.pdf>.
(Continued)

*Primary Examiner* — Jared Walker
(74) *Attorney, Agent, or Firm* — Gallium Law; Jacob Panangat

(57) ABSTRACT

An electronic doorbell can include an outer housing configurable to couple to a building. The doorbell can also include a camera coupled to the outer housing and a microphone coupled to the outer housing. The doorbell can also include a button coupled to the outer housing. The electronic doorbell can be configurable to wirelessly communicate with an appliance located within the building.

19 Claims, 39 Drawing Sheets

Related U.S. Application Data continuation of application No. 15/214,451, filed on Jul. 20, 2016, now abandoned, which is a continuation-in-part of application No. 14/861,613, filed on Sep. 22, 2015, now Pat. No. 10,044,519.

(51) Int. Cl.
  *G08B 25/00* (2006.01)
  *H04L 12/28* (2006.01)
  *H04M 11/02* (2006.01)
  *H04N 7/18* (2006.01)
  *G08B 15/00* (2006.01)

(52) U.S. Cl.
  CPC .......... *H04M 11/025* (2013.01); *H04N 7/186* (2013.01); *G08B 7/064* (2013.01); *G08B 15/00* (2013.01); *G08B 25/009* (2013.01); *H04L 12/2803* (2013.01); *H04L 2012/2841* (2013.01); *H04L 2012/2849* (2013.01)

(58) Field of Classification Search
  CPC ............. H04L 12/2818; H04L 12/2825; H04L 12/2803; H04L 2012/2841; H04L 2012/2849; H04L 12/12; H04L 12/2823; H04L 12/2827; H04M 11/025; H04N 7/186
  See application file for complete search history.

(56) References Cited

U.S. PATENT DOCUMENTS

| | | |
|---|---|---|
| 4,370,675 A | 1/1983 | Cohn |
| 4,524,384 A | 6/1985 | Lefkowitz |
| 4,764,953 A | 8/1988 | Chern |
| 4,843,461 A | 6/1989 | Tatsumi |
| 4,959,713 A | 9/1990 | Morotomi |
| 4,982,092 A | 1/1991 | Jehle |
| 5,151,945 A | 9/1992 | Lee |
| 5,210,520 A | 5/1993 | Housley |
| 5,428,388 A | 6/1995 | von Bauer |
| 5,521,578 A | 5/1996 | Delvalle |
| 5,717,379 A | 2/1998 | Peters |
| 5,781,108 A | 7/1998 | Jacob |
| 5,799,130 A | 8/1998 | Hoshi |
| 5,822,542 A | 10/1998 | Smith |
| 5,861,804 A | 1/1999 | Fansa |
| 5,878,283 A | 3/1999 | House |
| 5,907,352 A | 5/1999 | Gilley |
| 6,028,626 A | 2/2000 | Aviv |
| 6,060,994 A | 5/2000 | Chen |
| 6,064,303 A | 5/2000 | Klein |
| 6,069,655 A | 5/2000 | Seeley |
| 6,097,429 A | 8/2000 | Seeley |
| 6,104,785 A | 8/2000 | Chen |
| 6,134,303 A | 10/2000 | Chen |
| 6,154,130 A | 11/2000 | Mondejar |
| 6,185,294 B1 | 2/2001 | Chornenky |
| 6,313,743 B1 | 11/2001 | Abraham-Fuchs |
| 6,323,897 B1 | 11/2001 | Kogane |
| 6,359,560 B1 | 3/2002 | Budge |
| 6,385,772 B1 | 5/2002 | Courtney |
| 6,400,265 B1 | 6/2002 | Saylor |
| 6,414,589 B1 | 7/2002 | Angott |
| 6,421,080 B1 | 7/2002 | Lambert |
| 6,424,371 B1 | 7/2002 | Wen |
| 6,429,893 B1 | 8/2002 | Xin |
| 6,476,858 B1 | 11/2002 | Diaz |
| 6,542,078 B2 | 4/2003 | Script |
| 6,661,340 B1 | 12/2003 | Saylor |
| 6,816,085 B1 | 11/2004 | Haynes |
| 6,828,909 B2 | 12/2004 | Script |
| 6,870,488 B1 | 3/2005 | Compton |
| 6,943,682 B1 | 9/2005 | Dowens |
| 6,956,478 B2 | 10/2005 | Oyagi |
| 6,993,123 B1 | 1/2006 | Allen |
| 7,012,523 B2 | 3/2006 | Stuart |
| 7,015,943 B2 | 3/2006 | Chiang |
| 7,019,770 B1 | 3/2006 | Katz |
| 7,113,090 B1 | 9/2006 | Saylor |
| 7,119,609 B2 | 10/2006 | Naidoo |
| 7,123,142 B2 | 10/2006 | Bohbot |
| 7,187,279 B2 | 3/2007 | Chung |
| 7,193,644 B2 | 3/2007 | Carter |
| 7,218,220 B1 | 5/2007 | Bovsun |
| 7,242,295 B1 | 7/2007 | Milnusic |
| 7,262,690 B2 | 8/2007 | Heaton |
| 7,277,010 B2 | 10/2007 | Joao |
| 7,310,111 B2 | 12/2007 | Ramirez-Diaz |
| 7,375,492 B2 | 5/2008 | Calhoon |
| 7,403,116 B2 | 7/2008 | Bittner |
| 7,440,025 B2 | 10/2008 | Cheng |
| 7,477,134 B2 | 1/2009 | Langer |
| 7,529,485 B2 | 5/2009 | Farmer |
| 7,583,191 B2 | 9/2009 | Zinser |
| 7,609,941 B2 | 10/2009 | Matsukawa |
| 7,701,171 B2 | 4/2010 | Defant |
| 7,738,917 B2 | 6/2010 | Ryley |
| 7,746,223 B2 | 6/2010 | Howarter |
| 7,786,891 B2 | 8/2010 | Owens |
| 7,809,966 B2 | 10/2010 | Imao |
| 7,952,609 B2 | 5/2011 | Simerly |
| 7,956,576 B2 | 6/2011 | Neu |
| 7,956,739 B2 | 6/2011 | Hong |
| 7,991,381 B1 | 8/2011 | Dunne |
| 8,125,329 B1 | 2/2012 | Hirou |
| 8,138,098 B2 | 3/2012 | Yu |
| 8,144,183 B2 | 3/2012 | Carter |
| 8,144,184 B2 | 3/2012 | Carter |
| 8,154,581 B2 | 4/2012 | Carter |
| 8,164,614 B2 | 4/2012 | Carter |
| 8,237,574 B2 | 8/2012 | Anderson |
| 8,354,914 B2 | 1/2013 | Buckingham |
| 8,504,103 B2 | 8/2013 | Ficquette |
| 8,520,068 B2 | 8/2013 | Naidoo |
| 8,562,158 B2 | 10/2013 | Chien |
| 8,619,136 B2 | 12/2013 | Howarter |
| 8,669,876 B2 | 3/2014 | Anderson |
| 8,875,208 B1 | 10/2014 | Abkairov |
| 8,947,530 B1 | 2/2015 | Scalisi |
| 8,948,245 B2 | 2/2015 | Henson |
| 8,976,244 B2 | 3/2015 | Felt |
| 9,021,134 B1 | 4/2015 | Patel |
| 9,250,267 B1 | 2/2016 | Jackson |
| 9,300,921 B2 | 3/2016 | Naidoo |
| 9,414,030 B2 | 8/2016 | Carter |
| 9,432,638 B2 | 8/2016 | Carter |
| 9,485,478 B2 | 11/2016 | Carter |
| 9,516,284 B2 | 12/2016 | Carter |
| 9,554,090 B1 | 1/2017 | Carter |
| 9,635,323 B2 | 4/2017 | Carter |
| 9,648,290 B2 | 5/2017 | Carter |
| 9,697,723 B1 | 7/2017 | Ladanyi |
| 9,706,178 B2 | 7/2017 | Carter |
| 9,866,802 B2 | 1/2018 | Carter |
| 9,924,141 B2 | 3/2018 | Carter |
| 9,955,090 B2 | 4/2018 | Yang |
| 10,097,796 B2 | 10/2018 | Carter |
| 10,097,797 B2 | 10/2018 | Carter |
| 10,200,660 B2 | 2/2019 | Carter |
| 10,356,303 B1 | 7/2019 | Jordan |
| 10,523,906 B2 | 12/2019 | Carter |
| 10,674,120 B2 | 6/2020 | Carter |
| 10,863,147 B2 | 12/2020 | Carter |
| 10,977,797 B2 | 4/2021 | Carter |
| 2001/0022627 A1 | 9/2001 | Bernhardt |
| 2002/0016971 A1 | 2/2002 | Berezowski |
| 2002/0030583 A1 | 3/2002 | Jang |
| 2002/0067259 A1 | 6/2002 | Fufidio |
| 2002/0071031 A1 | 6/2002 | Lord |
| 2002/0075307 A1 | 6/2002 | Alexander |
| 2002/0076049 A1 | 6/2002 | Alexander |
| 2002/0097161 A1 | 7/2002 | Deeds |
| 2002/0118283 A1 | 8/2002 | Guerrero |

(56) References Cited

U.S. PATENT DOCUMENTS

| | | |
|---|---|---|
| 2002/0147982 A1 | 8/2002 | Naidoo |
| 2003/0013503 A1 | 1/2003 | Menard |
| 2003/0046557 A1 | 3/2003 | Miller |
| 2003/0061344 A1 | 3/2003 | Monroe |
| 2003/0062997 A1 | 4/2003 | Naidoo |
| 2003/0071724 A1 | 4/2003 | D'Amico |
| 2003/0075287 A1 | 4/2003 | Weik |
| 2003/0081747 A1 | 5/2003 | Ahlstrom |
| 2003/0095184 A1 | 5/2003 | Lin |
| 2003/0095185 A1 | 5/2003 | Naifeh |
| 2003/0103138 A1 | 6/2003 | Assayag |
| 2003/0122514 A1 | 7/2003 | Mercier |
| 2003/0169178 A1 | 9/2003 | Jensen |
| 2003/0171930 A1 | 9/2003 | Junqua |
| 2003/0206101 A1 | 11/2003 | Dixon |
| 2003/0117280 A1 | 12/2003 | Prehn |
| 2004/0003051 A1 | 1/2004 | Krzyanowski |
| 2004/0036603 A1 | 2/2004 | Bingham |
| 2004/0080615 A1 | 4/2004 | Klein |
| 2004/0080627 A1 | 4/2004 | Kroll |
| 2004/0085205 A1 | 5/2004 | Yeh |
| 2004/0095254 A1 | 5/2004 | Maruszczak |
| 2004/0178889 A1 | 9/2004 | Buckingham |
| 2004/0229569 A1 | 11/2004 | Franz |
| 2004/0257336 A1 | 12/2004 | Hershkovitz |
| 2004/0257670 A1 | 12/2004 | Kawakami |
| 2005/0001717 A1 | 1/2005 | Bohbot |
| 2005/0006528 A1 | 1/2005 | Movsesian |
| 2005/0007451 A1 | 1/2005 | Chiang |
| 2005/0040954 A1 | 2/2005 | Mcnally |
| 2005/0071879 A1 | 3/2005 | Haldavnekar |
| 2005/0116480 A1 | 6/2005 | Deng |
| 2005/0165612 A1 | 7/2005 | Van Rysselberghe |
| 2005/0259641 A1 | 11/2005 | Beninato |
| 2005/0285934 A1 | 12/2005 | Carter |
| 2005/0285944 A1 | 12/2005 | Watanabe |
| 2006/0010504 A1 | 1/2006 | Sharma |
| 2006/0038663 A1 | 2/2006 | Steinetz |
| 2006/0087993 A1 | 4/2006 | Sengupta |
| 2006/0093187 A1 | 5/2006 | Mittal |
| 2006/0095539 A1 | 5/2006 | Renkis |
| 2006/0100002 A1 | 5/2006 | Luebke |
| 2006/0139449 A1 | 6/2006 | Cheng |
| 2006/0152365 A1 | 7/2006 | Kim |
| 2006/0156361 A1* | 7/2006 | Wang ............ H04N 7/186 725/105 |
| 2006/0171453 A1 | 8/2006 | Rohlfing |
| 2006/0187034 A1 | 8/2006 | Styers |
| 2006/0195872 A1 | 8/2006 | Seo |
| 2006/0255931 A1 | 11/2006 | Hartsfield |
| 2006/0271678 A1 | 11/2006 | Jessup |
| 2006/0273895 A1 | 12/2006 | Kollin |
| 2007/0008081 A1 | 1/2007 | Tylicki |
| 2007/0025712 A1 | 2/2007 | Jezierski |
| 2007/0046442 A1 | 3/2007 | Bartorelli |
| 2007/0052531 A1 | 3/2007 | Matthews |
| 2007/0066316 A1* | 3/2007 | Hoover ............ H04L 65/611 455/445 |
| 2007/0103548 A1 | 5/2007 | Carter |
| 2007/0109441 A1 | 5/2007 | Cheng |
| 2007/0118831 A1 | 5/2007 | Kondo |
| 2007/0126574 A1 | 6/2007 | Langer |
| 2007/0146115 A1 | 6/2007 | Roosli |
| 2007/0146122 A1 | 6/2007 | Ratner |
| 2007/0162748 A1 | 7/2007 | Okayama |
| 2008/0036862 A1 | 2/2008 | Lang |
| 2008/0047287 A1 | 2/2008 | Ruppert |
| 2008/0068150 A1* | 3/2008 | Nguyen ............ G08B 3/10 340/541 |
| 2008/0117299 A1 | 5/2008 | Carter |
| 2008/0128586 A1 | 6/2008 | Johnson |
| 2008/0129498 A1 | 6/2008 | Howarter |
| 2008/0145050 A1 | 6/2008 | Mayer |
| 2008/0157936 A1 | 7/2008 | Ebrom |
| 2008/0157956 A1 | 7/2008 | Radivojevic |
| 2008/0167072 A1 | 7/2008 | Berstis |
| 2008/0198225 A1 | 8/2008 | Gal |
| 2008/0291036 A1 | 11/2008 | Richmond |
| 2008/0297339 A1 | 12/2008 | Mathews |
| 2009/0042604 A1 | 2/2009 | Ficquette |
| 2009/0059002 A1 | 3/2009 | Kim |
| 2009/0072963 A1 | 3/2009 | Langer |
| 2009/0093235 A1 | 4/2009 | Grealish |
| 2009/0141939 A1 | 6/2009 | Chambers |
| 2009/0167862 A1 | 7/2009 | Jentoft |
| 2009/0207249 A1 | 8/2009 | Erel |
| 2009/0224912 A1 | 9/2009 | Sobol |
| 2009/0243852 A1 | 10/2009 | Haupt |
| 2009/0296641 A1 | 12/2009 | Bienas |
| 2009/0308116 A1 | 12/2009 | Lambrou |
| 2010/0087161 A1 | 4/2010 | Young |
| 2010/0103300 A1 | 4/2010 | Jones |
| 2010/0134072 A1 | 6/2010 | Neu |
| 2010/0195810 A1 | 8/2010 | Mota |
| 2010/0225455 A1 | 9/2010 | Claiborne |
| 2010/0245060 A1 | 9/2010 | Tylicki |
| 2010/0276570 A1 | 11/2010 | Moser |
| 2011/0028118 A1 | 2/2011 | Thomas |
| 2011/0121940 A1 | 5/2011 | Jones |
| 2011/0140845 A1 | 6/2011 | Sanders |
| 2011/0287718 A1 | 11/2011 | Abel |
| 2012/0027248 A1 | 2/2012 | Feris |
| 2012/0044050 A1 | 2/2012 | Vig |
| 2012/0044085 A1 | 2/2012 | Hung |
| 2012/0098439 A1 | 4/2012 | Recker |
| 2012/0113253 A1 | 5/2012 | Slater |
| 2012/0162416 A1 | 6/2012 | Su |
| 2012/0229282 A1 | 9/2012 | Zagami |
| 2012/0230203 A1 | 9/2012 | Casey |
| 2012/0267962 A1 | 10/2012 | Hanchett |
| 2012/0287123 A1 | 11/2012 | Starner |
| 2012/0293310 A1 | 11/2012 | Fitzgibbon |
| 2012/0327246 A1 | 12/2012 | Senior |
| 2013/0020875 A1 | 1/2013 | Wozniak |
| 2013/0045763 A1 | 2/2013 | Ruiz |
| 2013/0057695 A1 | 3/2013 | Huisking |
| 2013/0057696 A1 | 3/2013 | Felt |
| 2013/0128050 A1 | 5/2013 | Aghdasi |
| 2013/0130749 A1 | 5/2013 | Andersen |
| 2013/0147964 A1 | 6/2013 | Frank |
| 2013/0169809 A1 | 7/2013 | Grignan |
| 2013/0169814 A1 | 7/2013 | Liu |
| 2013/0201316 A1 | 8/2013 | Binder |
| 2013/0208123 A1 | 8/2013 | Lakhani |
| 2013/0328522 A1 | 12/2013 | Brockman |
| 2013/0335219 A1 | 12/2013 | Malkowski |
| 2014/0009609 A1 | 1/2014 | Webster |
| 2014/0015967 A1 | 1/2014 | Moore |
| 2014/0070922 A1 | 3/2014 | Davis |
| 2014/0087780 A1 | 3/2014 | Abhyanker |
| 2014/0088761 A1 | 3/2014 | Shamlian |
| 2014/0167676 A1 | 6/2014 | Mack |
| 2014/0253725 A1 | 9/2014 | Hsu |
| 2014/0265359 A1 | 9/2014 | Cheng |
| 2014/0266669 A1 | 9/2014 | Fadell |
| 2014/0266767 A1 | 9/2014 | Huang |
| 2014/0267716 A1 | 9/2014 | Child |
| 2014/0267740 A1 | 9/2014 | Almomani |
| 2014/0285672 A1 | 9/2014 | Hogasten |
| 2015/0022618 A1 | 1/2015 | Siminoff |
| 2015/0022620 A1 | 1/2015 | Siminoff |
| 2015/0027178 A1 | 1/2015 | Scalisi |
| 2015/0035987 A1 | 2/2015 | Fernandez |
| 2015/0061859 A1 | 3/2015 | Matsuoka |
| 2015/0109111 A1 | 4/2015 | Lee |
| 2015/0120015 A1 | 4/2015 | Fadell |
| 2015/0156031 A1* | 6/2015 | Fadell ............ G08B 27/003 700/90 |
| 2015/0163463 A1* | 6/2015 | Hwang ............ H04N 7/188 348/143 |
| 2015/0185964 A1 | 7/2015 | Stout |
| 2015/0194839 A1 | 7/2015 | Wojcik |
| 2015/0208032 A1 | 7/2015 | Gavney |
| 2015/0228281 A1 | 8/2015 | Raniere |

(56) References Cited

U.S. PATENT DOCUMENTS

| | | | |
|---|---|---|---|
| 2015/0236966 | A1 | 8/2015 | Francini |
| 2015/0245163 | A1* | 8/2015 | Candelore ............ G01S 5/0284 |
| | | | 455/456.1 |
| 2015/0276266 | A1 | 10/2015 | Warren |
| 2015/0276820 | A1* | 10/2015 | Floyd, III ............... H02J 13/00 |
| | | | 702/62 |
| 2015/0339895 | A1 | 11/2015 | Chen |
| 2016/0001719 | A1 | 1/2016 | Frost |
| 2016/0057199 | A1 | 2/2016 | Aziz |
| 2016/0078699 | A1 | 3/2016 | Kalb |
| 2016/0261425 | A1 | 9/2016 | Horton |
| 2016/0292936 | A1 | 10/2016 | Palmer |
| 2016/0314663 | A1 | 10/2016 | Glencross |
| 2017/0109984 | A1 | 4/2017 | Child |
| 2017/0149855 | A1 | 5/2017 | Doshi |
| 2018/0019889 | A1 | 1/2018 | Burns |
| 2018/0032979 | A1 | 2/2018 | Siminoff |
| 2019/0058720 | A1 | 2/2019 | Lindquist |
| 2019/0066471 | A1 | 2/2019 | Jeon |
| 2019/0206243 | A1 | 7/2019 | Siminoff |

FOREIGN PATENT DOCUMENTS

| | | |
|---|---|---|
| CN | 2131143 Y | 4/1993 |
| CN | 2304927 Y | 1/1999 |
| CN | 1704985 A | 12/2005 |
| CN | 101023466 A | 8/2007 |
| CN | 201266988 Y | 7/2009 |
| CN | 102254385 A | 11/2011 |
| CN | 103348074 A | 10/2013 |
| CN | 103856739 A | 6/2014 |
| FR | 2759804 A1 | 8/1998 |
| GB | 2285365 A | 7/1995 |
| JP | H09107409 A | 4/1997 |
| KR | 19980039422 A | 8/1998 |
| KR | 20010074212 A | 8/2001 |
| KR | 100373449 B1 | 9/2001 |
| WO | 1999006976 A1 | 2/1999 |
| WO | 2001027763 A1 | 4/2001 |
| WO | 2001050731 A2 | 7/2001 |
| WO | 2001093220 A1 | 12/2001 |
| WO | 2001097524 A1 | 12/2001 |
| WO | 2002005220 A1 | 1/2002 |
| WO | 2002065420 A1 | 8/2002 |
| WO | 2003028375 A1 | 4/2003 |
| WO | 2006046234 A2 | 5/2006 |
| WO | 2007111802 A2 | 10/2007 |
| WO | 2008021312 A2 | 2/2008 |

OTHER PUBLICATIONS

Axis—"Axis adds wireless capability to its video offerings—introduces two new WLAN products"—Press Release—Published Feb. 24, 2003, Lund, Sweden—Downloaded Jun. 9, 2021—Available from Internet <URL: https://www.axis.com/files/press_releases/8021lb_devices_pressrelease.pdf>.

Ching-Kai, Huang; and Tsuhan, Chen—"Motion Activated Video Surveillance Using TI DSP"—Carnegie Mellon University—Published Dsps Fest '99, Houston, Texas, Aug. 4-6, 1999—Downloaded Jun. 9, 2021—Available from Internet <URL: https://www.ti.com/sc/docs/general/dsp/fest99/avi/1paper.pdf>.

National Institute of Justice—"Video Surveillance Equipment Selection and Application Guide"—NIJ Guide 201-99—Published Oct. 1999, Rockville, MD—Downloaded Jun. 9, 2021—Available from Internet <URL: https://www.ojp.gov/pdffiles1/nij/179545.pdf>.

Schwartz, John—"Nanny-Cam May Leave a Home Exposed"—New York Times—Published Apr. 14, 2002—Downloaded Jun. 9, 2021—Available from Internet <URL: https://www.nytimes.com/2002/04/14/business/nanny-cam-may-leave-a-home-exposed.html>.

Nguyen, Duy—"Mobile Home Security with GPRS"—Edith Cowan University—Published 2002—Downloaded Jun. 9, 2021—Available from Internet <URL: https://ro.ecu.edu.au/theses_hons/339/>.

Raggio, Marco; Berbieri, Ivano; and Bailo, Gianluca—"Scalable Multimedia System for Interactive Surveillance and Video Communication Applications"—IEEE 10th European Signal Processing Conference, Sep. 4-8, 2000, Genova, Italy—pp. 1-4—Downloaded Jun. 9, 2021—Available from Internet <URL: https://ieeexplore.ieee.org/document/7075784>.

X10 Wireless Technology, Inc.—"XCam2™ and WideEey™ Indoor/Outdoor Wireless Camer System"—Owner's Manual—Downloaded Jun. 9, 2021—Available from Internet <URL: http://www.electronicoscaldas.com/datasheet/XCam2-WideEye_X10.pdf>.

Axis—"Axis 2100 Network Camera Users Guide V.1.2"—Technical User Manual—Published May 2001—Downloaded Jun. 9, 2021—Available from Internet <URL: https://docs.rs-online.com/7155/0900766b800a94f9.pdf>.

Enterasys Networks—"Enterasys Networks ™ delivers the industry's first 54 megabit wireless access point"—Canada News Wire—Published Apr. 30, 2001—Downloaded Apr. 15, 2021—Available from Internet <URL: https://global-factiva-com.libproxy.mit.edu/hp/printsavews.aspx?pp=Print&hc=All>.

Panasonic—"Panasonic Network Cameras, including Model No. KC-HCM270"—Webstore Page—Downloaded Jun. 9, 2021—Available from Internet <URL: https://security.panasonic.com/products_technology/products/kx-hcm270/>.

Axis—"Axis Network Cameras, including Axis 2100"—Webstore Page—Downloaded Jun. 9, 2021—Available from Internet <URL: https://www.axis.com/products/axis-2100>.

Menard, Raymond J., et al.—"Modular Communication System and Method"—U.S. Appl. No. 09/579,913, filed May 26, 2000—Downloaded Jun. 9, 2021—Available from Internet <URL: https://patentscope.wipo.int/search/en/detail.jsf?docId=WO2001093220&tab=PCTDOCUMENTS>.

CNIPA—China National Intellectual Property Administration; Notification of the Third Office Action of CN Application No. 201510309496.5; Nov. 15, 2019.

CNIPA—China National Intellectual Property Administration; Notification of the First Office Action of CN Application No. 201510309104.5; Feb. 7, 2018.

\* cited by examiner

DOORBELL COMMUNICATION SYSTEMS AND METHODS

CROSS-REFERENCE TO RELATED APPLICATIONS

The entire contents of the following application are incorporated by reference herein: U.S. Non-provisional application Ser. No. 16/983,137; filed Aug. 3, 2020; and entitled DOORBELL COMMUNICATION SYSTEMS AND METHODS.

The entire contents of the following application are incorporated by reference herein: U.S. Non-provisional application Ser. No. 15/214,451; filed Jul. 20, 2016; and entitled DOORBELL COMMUNICATION SYSTEMS AND METHODS.

The entire contents of the following application are incorporated by reference herein: U.S. Nonprovisional patent application Ser. No. 14/861,613; filed Sep. 22, 2015; issued as U.S. Pat. No. 10,044,519 on Aug. 7, 2018; and entitled DOORBELL COMMUNICATION SYSTEMS AND METHODS.

The entire contents of the following application are incorporated by reference herein: U.S. Nonprovisional patent application Ser. No. 14/737,411; filed Jun. 11, 2015; issued as U.S. Pat. No. 9,160,987 on Oct. 13, 2015; and entitled DOORBELL CHIME SYSTEMS AND METHODS.

The entire contents of the following application are incorporated by reference herein: U.S. Nonprovisional patent application Ser. No. 14/724,723; filed May 28, 2015; issued as U.S. Pat. No. 9,179,108 on Nov. 3, 2015; and entitled DOORBELL CHIME SYSTEMS AND METHODS.

The entire contents of the following application are incorporated by reference herein: U.S. Nonprovisional patent application Ser. No. 14/724,702; filed May 28, 2015; issued as U.S. Pat. No. 9,179,107 on Nov. 3, 2015; and entitled DOORBELL CHIME SYSTEMS AND METHODS.

The entire contents of the following application are incorporated by reference herein: U.S. Provisional Patent Application No. 62/161,616; filed May 14, 2015; and entitled DOORBELL CHIME SYSTEMS AND METHODS.

The entire contents of the following application are incorporated by reference herein: U.S. Nonprovisional patent application Ser. No. 14/695,436; filed Apr. 24, 2015; issued as U.S. Pat. No. 9,196,133 on Nov. 24, 2015; and entitled DOORBELL COMMUNICATION SYSTEMS AND METHODS.

The entire contents of the following application are incorporated by reference herein: U.S. Nonprovisional patent application Ser. No. 14/684,302; filed Apr. 10, 2015; issued as U.S. Pat. No. 9,113,052 on Aug. 18, 2015; and entitled DOORBELL COMMUNICATION SYSTEMS AND METHODS.

The entire contents of the following application are incorporated by reference herein: U.S. Nonprovisional patent application Ser. No. 14/726,517; filed May 30, 2015; issued as U.S. Pat. No. 9,179,109 on Nov. 3, 2015; and entitled DOORBELL COMMUNICATION SYSTEMS AND METHODS.

The entire contents of the following application are incorporated by reference herein: U.S. Nonprovisional patent application Ser. No. 14/664,345; filed Mar. 20, 2015; issued as U.S. Pat. No. 9,118,819 on Aug. 25, 2015; and entitled DOORBELL COMMUNICATION SYSTEMS AND METHODS.

The entire contents of the following application are incorporated by reference herein: U.S. Provisional Patent Application No. 62/127,660; filed Mar. 3, 2015; and entitled DOORBELL COMMUNICATION SYSTEMS AND METHODS.

The entire contents of the following application are incorporated by reference herein: U.S. Provisional Patent Application No. 62/135,133; filed Mar. 18, 2015; and entitled DOORBELL COMMUNICATION SYSTEMS AND METHODS.

The entire contents of the following application are incorporated by reference herein: U.S. Provisional Patent Application No. 62/016,050; filed Jun. 23, 2014; and entitled IDENTITY VERIFICATION USING A SOCIAL NETWORK.

The entire contents of the following application are incorporated by reference herein: U.S. Provisional Patent Application No. 62/016,053; filed Jun. 23, 2014; and entitled IDENTITY VERIFICATION USING A SOCIAL NETWORK AND A NAME OF A VISITOR.

The entire contents of the following application are incorporated by reference herein: U.S. Provisional Patent Application No. 62/016,057; filed Jun. 23, 2014; and entitled IDENTITY VERIFICATION OF FREQUENT AND NON-FREQUENT VISITORS.

The entire contents of the following application are incorporated by reference herein: U.S. Provisional Patent Application No. 62/158,750; filed May 8, 2015; and entitled DOORBELL COMMUNICATION SYSTEMS AND METHODS.

The entire contents of the following application are incorporated by reference herein: U.S. Nonprovisional patent application Ser. No. 14/612,376; filed Feb. 3, 2015; issued as U.S. Pat. No. 9,058,738 on Jun. 16, 2015; and entitled DOORBELL COMMUNICATION SYSTEMS AND METHODS.

The entire contents of the following application are incorporated by reference herein: U.S. Nonprovisional patent application Ser. No. 14/589,830; filed Jan. 5, 2015; issued as U.S. Pat. No. 9,060,104 on Jun. 16, 2015; and entitled DOORBELL COMMUNICATION SYSTEMS AND METHODS.

The entire contents of the following application are incorporated by reference herein: U.S. Nonprovisional patent application Ser. No. 14/502,601; filed Sep. 30, 2014; issued as U.S. Pat. No. 9,094,584 on Jul. 28, 2015; and entitled DOORBELL COMMUNICATION SYSTEMS AND METHODS.

The entire contents of the following application are incorporated by reference herein: U.S. Nonprovisional patent application Ser. No. 14/492,809; filed Sep. 22, 2014; issued as U.S. Pat. No. 9,065,987 on Jun. 23, 2015; and entitled DOORBELL COMMUNICATION SYSTEMS AND METHODS.

The entire contents of the following application are incorporated by reference herein: U.S. Nonprovisional patent application Ser. No. 14/275,811; filed May 12, 2014; issued as U.S. Pat. No. 8,872,915 on Oct. 28, 2014; and entitled DOORBELL COMMUNICATION SYSTEMS AND METHODS.

The entire contents of the following application are incorporated by reference herein: U.S. Nonprovisional patent application Ser. No. 14/142,839; filed Dec. 28, 2013; issued as U.S. Pat. No. 8,842,140 on Sep. 23, 2014; and entitled DOORBELL COMMUNICATION SYSTEMS AND METHODS.

The entire contents of the following application are incorporated by reference herein: U.S. Nonprovisional patent application Ser. No. 14/099,888; filed Dec. 6, 2013; issued as U.S. Pat. No. 8,823,795 on Sep. 2, 2014; and entitled DOORBELL COMMUNICATION SYSTEMS AND METHODS.

The entire contents of the following application are incorporated by reference herein: U.S. Nonprovisional patent application Ser. No. 14/098,772; filed Dec. 6, 2013; issued as U.S. Pat. No. 8,780,201 on Jul. 15, 2014; and entitled DOORBELL COMMUNICATION SYSTEMS AND METHODS.

The entire contents of the following application are incorporated by reference herein: U.S. Provisional Patent Application No. 61/872,439; filed Aug. 30, 2013; and entitled DOORBELL COMMUNICATION SYSTEMS AND METHODS.

The entire contents of the following application are incorporated by reference herein: U.S. Provisional Patent Application No. 61/859,070; filed Jul. 26, 2013; and entitled DOORBELL COMMUNICATION SYSTEMS AND METHODS.

The entire contents of the following application are incorporated herein by reference: International Application No. PCT/US14/53506; filed Aug. 29, 2014 with the U.S. Patent and Trademark Office; and entitled DOORBELL COMMUNICATION SYSTEMS AND METHODS.

The entire contents of the following application are incorporated herein by reference: International Application No. PCT/US14/47622; filed Jul. 22, 2014 with the U.S. Patent and Trademark Office; and entitled DOORBELL COMMUNICATION SYSTEMS AND METHODS.

BACKGROUND

Field

Various embodiments disclosed herein relate to doorbells. Certain embodiments relate to communication between a person near a doorbell and a person in another location.

Description of Related Art

Homes, offices, and other buildings sometimes include communication and surveillance systems to enable friendly visitors to summon occupants of the buildings and to deter unwanted visitors. Communication and surveillance systems can include video cameras and doorbells.

Doorbells can enable a person located outside of an entry point, such as a door, to alert a person inside of an entry point that someone outside would like to talk to someone inside. Doorbells sometimes include a button located near a door, such as a front door, side door, or back door of a home, office, dwelling, warehouse, building, or structure. Doorbells are sometimes used near a gate or some other entrance to a partially enclosed area. Pushing the doorbell sometimes causes a chime or other alerting sound to be emitted. In some cases, this alerting sound can typically be heard within a short distance from the entry point or sound source. For example, a homeowner located remotely from her home likely would not be able to hear the alerting sound, and thus, would not be aware that someone is ringing her doorbell. Thus, there is a need for devices and methods to alert remotely located individuals that someone seeks the attention of the homeowner, tenant, building guardian, or steward.

SUMMARY

The disclosure includes an electronic doorbell comprising an outer housing configurable to couple to a building. The doorbell can include a camera coupled to the outer housing. The camera can be configurable to capture an image. The doorbell can also include a microphone coupled to the outer housing. The microphone can be configurable to audibly detect a noise. Even still, the doorbell can include a button coupled to the outer housing. The button can be configurable to enable a visitor to sound an electronic chime.

In some embodiments, the electronic doorbell is configurable to wirelessly communicate with an appliance located within the building. The electronic doorbell can be configurable to display the image captured by the camera on a display screen of the appliance. The electronic doorbell can also be configurable to emit the noise detected by the microphone on a speaker of the appliance.

Furthermore, in some embodiments, the electronic doorbell is configurable to wirelessly transmit a visitor alert to the appliance. The visitor alert can comprise one of a notification that a visitor is present at the electronic doorbell and a notification that the visitor has left a message via the electronic doorbell. The visitor alert can be sent from the doorbell to the appliance via the wireless network of the building.

Even still, in some embodiments, the visitor alert comprises an audible notification emitted by a speaker of the appliance. As well, the visitor alert can comprise a visual notification displayed by a display screen of the appliance. The visual notification can comprise at least one of a video and a still image. The video can be sent from the doorbell to the appliance via the wireless network of the building.

In some embodiments, the electronic doorbell is configurable to receive a wireless notification from the appliance. When the electronic doorbell receives the wireless notification at least one of the camera and microphone can change from a sleep mode to an alert mode that consumes more power than the sleep mode. The electronic doorbell can also be configured to allow two-way audio communication between the appliance and the electronic doorbell via a communication hub.

Furthermore, the disclosures include an electronic doorbell system comprising an electronic doorbell having an outer housing configurable to couple to a building. The doorbell system can include a camera coupled to the outer housing, a microphone coupled to the outer housing, and a button coupled to the outer housing. The button can be configurable to enable a visitor to sound an electronic chime. The doorbell system can also include an appliance configurable to wirelessly communicate with the doorbell and a visitor alert received by the appliance. The visitor alert can comprise one of a notification that a visitor is present at the electronic doorbell and a notification that the visitor has left a message via the electronic doorbell.

In some embodiments, the appliance is located within the building. Additionally, the appliance can comprise at least one of a refrigerator, range, microwave, dishwasher, laundry machine, dryer, and vacuum.

Furthermore, in some embodiments, a communication hub communicatively couples the electronic doorbell to the appliance. The doorbell system can also include the electronic chime communicatively coupled to the communication hub, and a remote computing device communicatively coupled to the communication hub.

Even still, in some embodiments, the doorbell system can comprise a first audible message received by the microphone of the electronic doorbell. The first audible message can be emitted by a speaker of the appliance. In some embodiments, the doorbell system can include a second audible message received by a microphone of the appliance. The second audible message can be emitted by a speaker of the electronic doorbell. Furthermore, the electronic doorbell system can include a third audible message received by a microphone of the remote computing device. The third audible message can be emitted by the speaker of the appliance and the speaker of the electronic doorbell.

The disclosure includes yet another electronic doorbell system comprising an electronic doorbell having an outer housing configurable to couple to a building, a camera coupled to the outer housing, a microphone coupled to the outer housing, and a button coupled to the outer housing. The button can be configurable to enable a visitor to sound an electronic chime. The doorbell system can also include an audible message received by at least one of a speaker of a remote computing device and a speaker of an appliance located within a building to which the electronic doorbell is coupled. In some embodiments, the audible message is not emitted by a speaker of the electronic doorbell. The audible message can comprise at least one of a predetermined word and a predetermined message.

In some embodiments, the electronic doorbell system comprises an action performed by the electronic doorbell. The action can be performed in response to the system receiving the audible message. The action can comprise at least one of recording an image with the camera of the electronic doorbell, recording a noise with the microphone of the electronic doorbell, emitting a predetermined message from the speaker of the electronic doorbell, and illuminating a light coupled to the building.

BRIEF DESCRIPTION OF THE DRAWINGS

These and other features, aspects, and advantages are described below with reference to the drawings, which are intended to illustrate, but not to limit, the invention. In the drawings, like reference characters denote corresponding features consistently throughout similar embodiments.

DETAILED DESCRIPTION

Although certain embodiments and examples are disclosed below, inventive subject matter extends beyond the specifically disclosed embodiments to other alternative embodiments and/or uses, and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components.

For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

The following patent is incorporated herein by reference: U.S. Pat. No. 7,583,191, entitled SECURITY SYSTEM AND METHOD FOR USE OF SAME, and filed Nov. 14, 2006.

Introduction

Communication systems can provide a secure and convenient way for a remotely located individual to communicate with a person who is approaching a sensor, such as a proximity sensor or motion sensor, or with a person who rings a doorbell, which can be located in a doorway, near an entrance, or within 15 feet of a door. Some communication systems allow an individual to hear, see, and talk with visitors who approach at least a portion of the communication system and/or press a button, such as a doorbell's button. For example, communication systems can use a computing device to enable a remotely located person to see, hear, and/or talk with visitors. Computing devices can include computers, laptops, tablets, mobile devices, smartphones, cellular phones, and wireless devices (e.g., cars with wireless communication). Example computing devices include the iPhone, iPad, iMac, MacBook Air, and MacBook Pro made by Apple Inc. Communication between a remotely located person and a visitor can occur via the Internet, cellular networks, telecommunication networks, and wireless networks.

Figure 1:
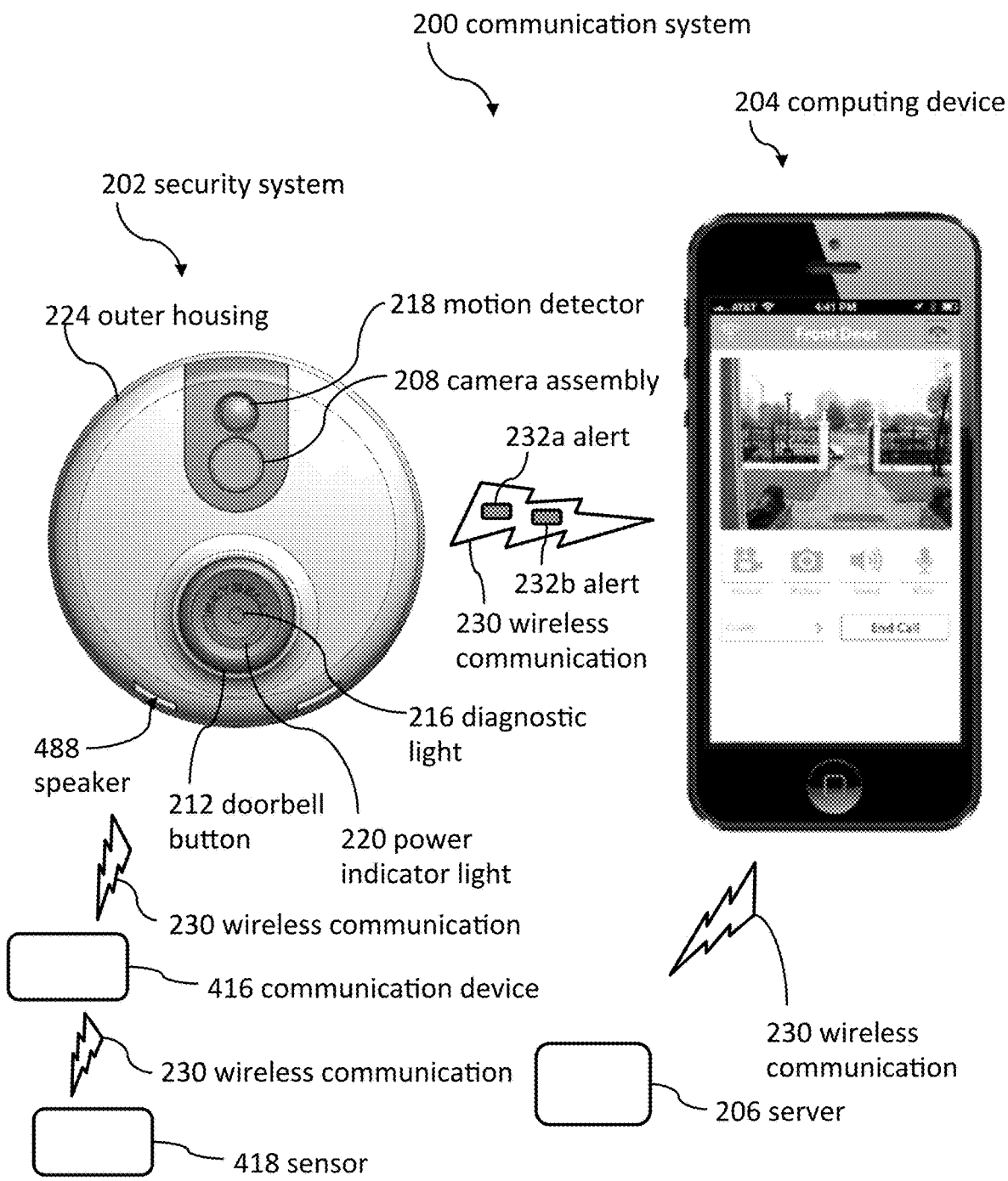
FIG. 1 illustrates a front view of a communication system, according to some embodiments.

FIG. 1 illustrates a front view of a communication system embodiment. The communication system 200 can include a security system 202 (e.g., a doorbell) and a computing device 204. Although the illustrated security system 202 includes many components in one housing, several security system embodiments include components in separate housings. The security system 202 can include a camera assembly 208 and a doorbell button 212. The camera assembly 208 can be a video camera, which in some embodiments is a webcam.

The security system 202 can include a diagnostic light 216 and a power indicator light 220. In some embodiments, the diagnostic light 216 is a first color (e.g., blue) if the security system 202 and/or the communication system 200 is connected to a wireless Internet network and is a second color (e.g., red) if the security system 202 and/or the communication system 200 is not connected to a wireless Internet network. In some embodiments, the power indicator 220 is a first color if the security system 202 is connected to a power source. The power source can be power supplied by the building 300 to which the security system 202 is attached. In some embodiments, the power indicator 220 is a second color or does not emit light if the security system 202 is not connected to the power source.

As well, the security system 202 can include at least one speaker 488. The speaker 488 can be located along any portion of the security system 202. For example, the speaker 488 can be located within an inner portion of the security system 202 or along an outer portion of the security system 202. The speaker 488 can be any type of sound output device configured to emit sound, such as a digital speaker, an analog speaker, and the like.

Furthermore, the security system 202 (e.g., a doorbell) can include an outer housing 224, which can be water resistant and/or waterproof. The outer housing can be made from metal or plastic, such as molded plastic with a hardness of 60 Shore D. In some embodiments, the outer housing 224 is made from brushed nickel or aluminum.

Rubber seals can be used to make the outer housing 224 water resistant or waterproof. The security system 202 can be electrically coupled to a power source, such as wires electrically connected to a building's electrical power system. In some embodiments, the security system 202 includes a battery for backup and/or primary power.

Wireless communication 230 can enable the security system 202 (e.g., a doorbell) to communicate with the computing device 204. Some embodiments enable communication via cellular and/or WiFi networks. Some embodiments enable communication via the Internet. Several embodiments enable wired communication between the security system 202 and the computing device 204. The wireless communication 230 can include the following communication means: radio, WiFi (e.g., wireless local area network), cellular, Internet, Bluetooth, telecommunication, electromagnetic, infrared, light, sonic, and microwave. Other communication means are used by some embodiments. In some embodiments, such as embodiments that include telecommunication or cellular communication means, the security system 202 can initiate voice calls or send text messages to a computing device 204 (e.g., a smartphone, a desktop computer, a tablet computer, a laptop computer).

Several embodiments use near field communication (NFC) to communicate between the computing device 204 and the doorbell 202. The doorbell 202 and/or the computing device 204 can include a NFC tag. Some NFC technologies include Bluetooth, radio-frequency identification, and QR codes.

Some embodiments include computer software (e.g., application software), which can be a mobile application designed to run on smartphones, tablet computers, and other mobile devices. Software of this nature is sometimes referred to as "app" software. Some embodiments include software designed to run on desktop computers and laptop computers.

The computing device 204 can run software with a graphical user interface. The user interface can include icons or buttons. In some embodiments, the software is configured for use with a touch-screen computing device such as a smartphone or tablet.

Figure 2:
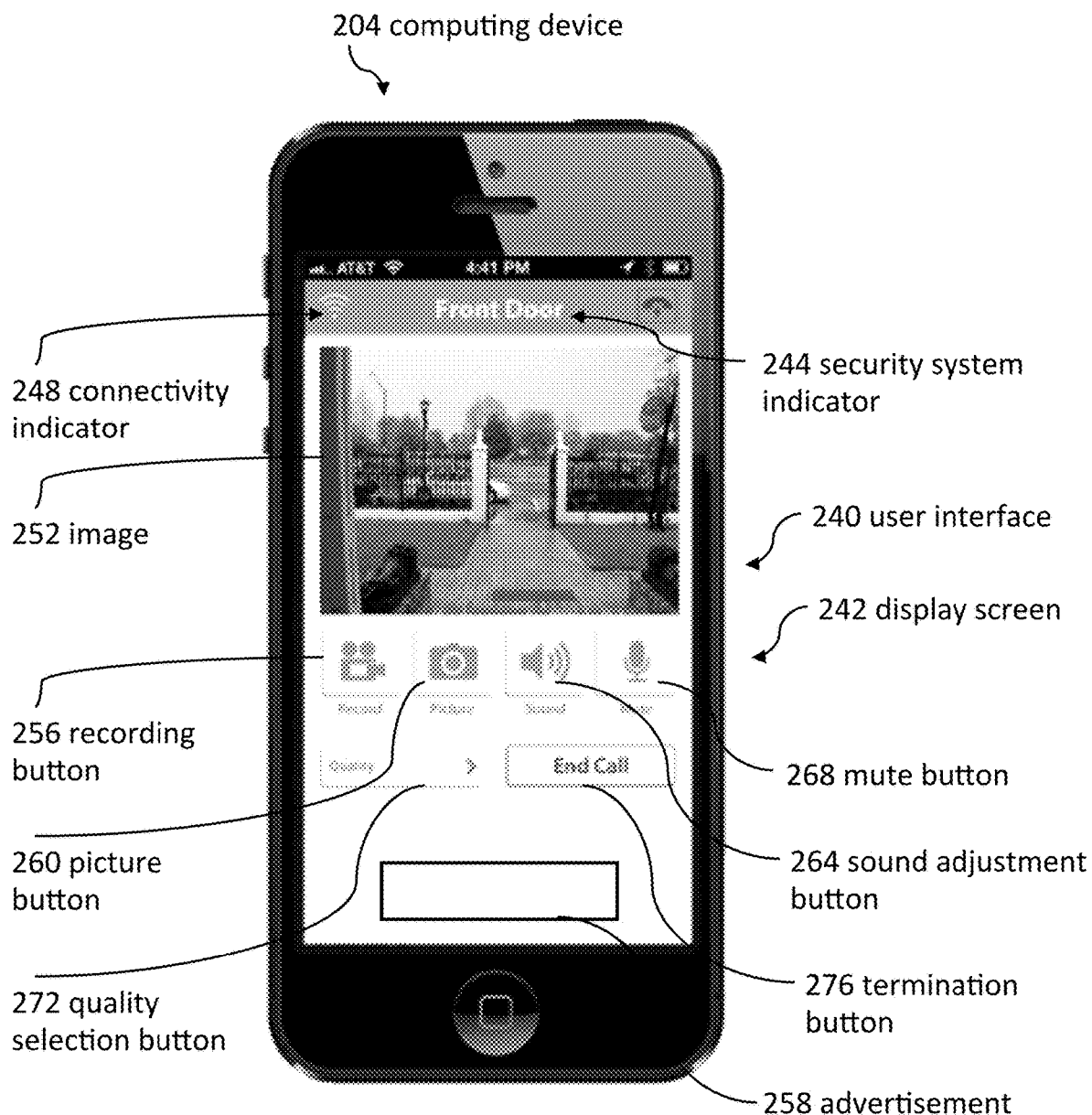
FIG. 2 illustrates a computing device running software, according to some embodiments.

FIG. 2 illustrates a computing device 204 running software. The software includes a user interface 240 displayed on a display screen 242. The user interface 240 can include a security system indicator 244, which can indicate the location of the security system that the user interface is displaying. For example, a person can use one computing device 204 to control and/or interact with multiple security systems, such as one security system located at a front door and another security system located at a back door. Selecting the security system indicator 244 can allow the user to choose another security system (e.g., the back door security system rather than the front door security system).

The user interface 240 can include a connectivity indicator 248. In some embodiments, the connectivity indicator can indicate whether the computing device is in communication with a security system, the Internet, and/or a cellular network. The connectivity indicator 248 can alert the user if the computing device 204 has lost its connection with the security system 202; the security system 202 has been damaged; the security system 202 has been stolen; the security system 202 has been removed from its mounting location; the security system 202 lost electrical power; and/or if the computing device 204 cannot communicate with the security system 202. In some embodiments, the connectivity indicator 248 alerts the user of the computing device 204 by flashing, emitting a sound, displaying a message, and/or displaying a symbol.

In some embodiments, if the security system 202 loses power, loses connectivity to the computing device 204, loses connectivity to the Internet, and/or loses connectivity to a remote server, a remote server 206 sends an alert (e.g., phone call, text message, image on the user interface 240) regarding the power and/or connectivity issue. In several embodiments, the remote server 206 can manage communication between the security system 202 and the computing device. In some embodiments, information from the security system 202 is stored by the remote server 206. In several embodiments, information from the security system 202 is stored by the remote server 206 until the information can be sent to the computing device 204, uploaded to the computing device 204, and/or displayed to the remotely located person via the computing device 204. The remote server 206 can be a computing device that stores information from the security system 202 and/or from the computing device 204. In some embodiments, the remote server 206 is located in a data center.

In some embodiments, the computing device 204 and/or the remote server 206 attempts to communicate with the security system 202. If the computing device 204 and/or the remote server 206 is unable to communicate with the security system 202, the computing device 204 and/or the remote server 206 alerts the remotely located person via the software, phone, text, a displayed message, and/or a website. In some embodiments, the computing device 204 and/or the remote server 206 attempts to communicate with the security system 202 periodically; at least every five hours and/or less than every 10 minutes; at least every 24 hours and/or less than every 60 minutes; or at least every hour and/or less than every second.

In some embodiments, the server 206 can initiate communication to the computer device 204 and/or to the security system 202. In several embodiments, the server 206 can initiate, control, and/or block communication between the computing device 204 and the security system 202.

In several embodiments, a user can log into an "app," website, and/or software on a computing device (e.g., mobile computing device, smartphone, tablet, desktop computer) to adjust the security system settings discussed herein.

In some embodiments, a computing device can enable a user to watch live video and/or hear live audio from a security system due to the user's request rather than due to actions of a visitor. Some embodiments include a computing device initiating a live video feed (or a video feed that is less than five minutes old).

In some embodiments, the user interface 240 displays an image 252 such as a still image or a video of an area near and/or in front of the security system 202. The image 252 can be taken by the camera assembly 208 and stored by the security system 202, server 206, and/or computing device 204. The user interface 240 can include a recording button 256 to enable a user to record images, videos, and/or sound from the camera assembly 208, microphone of the security system 202, and/or microphone of the computing device 204.

In several embodiments, the user interface 240 includes a picture button 260 to allow the user to take still pictures and/or videos of the area near and/or in front of the security system 202. The user interface 240 can also include a sound adjustment button 264 and a mute button 268. The user interface 240 can include camera manipulation buttons such as zoom, pan, and light adjustment buttons. In some embodiments, the camera assembly 208 automatically adjusts between Day Mode and Night Mode. Some embodiments include an infrared camera and/or infrared lights to illuminate an area near the security system 202 to enable the camera assembly 208 to provide sufficient visibility (even at night).

In some embodiments, buttons include diverse means of selecting various options, features, and functions. Buttons can be selected by mouse clicks, keyboard commands, and touching a touch screen. Many embodiments include buttons that can be selected without touch screens.

In some embodiments, the user interface 240 includes a quality selection button, which can allow a user to select the quality and/or amount of the data transmitted from the security system 202 to the computing device 204 and/or from the computing device 204 to the security system 202.

In some embodiments, video can be sent to and/or received from the computing device 204 using video chat protocols such as FaceTime (by Apple Inc.) or Skype (by Microsoft Corporation). In some embodiments, these videos are played by videoconferencing apps on the computing device 204 instead of being played by the user interface 240.

The user interface 240 can include a termination button 276 to end communication between the security system 202 and the computing device 204. In some embodiments, the termination button 276 ends the ability of the person located near the security system 202 (i.e., the visitor) to hear and/or see the user of the computing device 204, but does not end the ability of the user of the computing device 204 to hear and/or see the person located near the security system 202.

In some embodiments, a button 276 is both an answer button (to accept a communication request from a visitor) and is a termination button (to end communication between the security system 202 and the computing device 204). The button 276 can include the word "Answer" when the system is attempting to establish two-way communication between the visitor and the user. Selecting the button 276 when the system is attempting to establish two-way communication between the visitor and the user can start two-way communication. The button 276 can include the words "End Call" during two-way communication between the visitor and the user. Selecting the button 276 during two-way communication between the visitor and the user can terminate two-way communication. In some embodiments, terminating two-way communication still enables the user to see and hear the visitor. In some embodiments, terminating two-way communication causes the computing device 204 to stop showing video from the security system and to stop emitting sounds recorded by the security system.

In some embodiments, the user interface 240 opens as soon as the security system detects a visitor (e.g., senses indications of a visitor). Once the user interface 240 opens, the user can see and/or hear the visitor even before "answering" or otherwise accepting two-way communication, in several embodiments.

Some method embodiments include detecting a visitor with a security system. The methods can include causing the user interface to display on a remote computing device 204 due to the detection of the visitor (e.g., with or without user interaction). The methods can include displaying video from the security system and/or audio from the security system before the user accepts two-way communication with the visitor. The methods can include displaying video from the security system and/or audio from the security system before the user accepts the visitor's communication request. The methods can include the computing device simultaneously asking the user if the user wants to accept (e.g., answer) the communication request and displaying audio and/or video of the visitor. For example, in some embodiments, the user can see and hear the visitor via the security system before opening a means of two-way communication with the visitor.

In some embodiments, the software includes means to start the video feed on demand. For example, a user of the computing device might wonder what is happening near the security system 202. The user can open the software application on the computing device 204 and instruct the application to show live video and/or audio from the security device 202 even if no event near the security system 202 has triggered the communication.

In several embodiments, the security device 202 can be configured to record when the security device 202 detects movement and/or the presence of a person. The user of the computing device 204 can later review all video and/or audio records when the security device 202 detected movement and/or the presence of a person.

Referring now to FIG. 1, in some embodiments, the server 206 controls communication between the computing device 204 and the security system 202, which can be a doorbell with a camera, a microphone, and a speaker. In several embodiments, the server 206 does not control communication between the computing device 204 and the security system 202.

In some embodiments, data captured by the security system and/or the computing device 204 (such as videos, pictures, and audio) is stored by another remote device such as the server 206. Cloud storage, enterprise storage, and/or networked enterprise storage can be used to store video, pictures, and/or audio from the communication system 200 or from any part of the communication system 200. The user can download and/or stream stored data and/or storage video, pictures, and/or audio. For example, a user can record visitors for a year and then later can review conversations with visitors from the last year. In some embodiments, remote storage, the server 206, the computing device 204, and/or the security system 202 can store information and statistics regarding visitors and usage.

Figure 3:
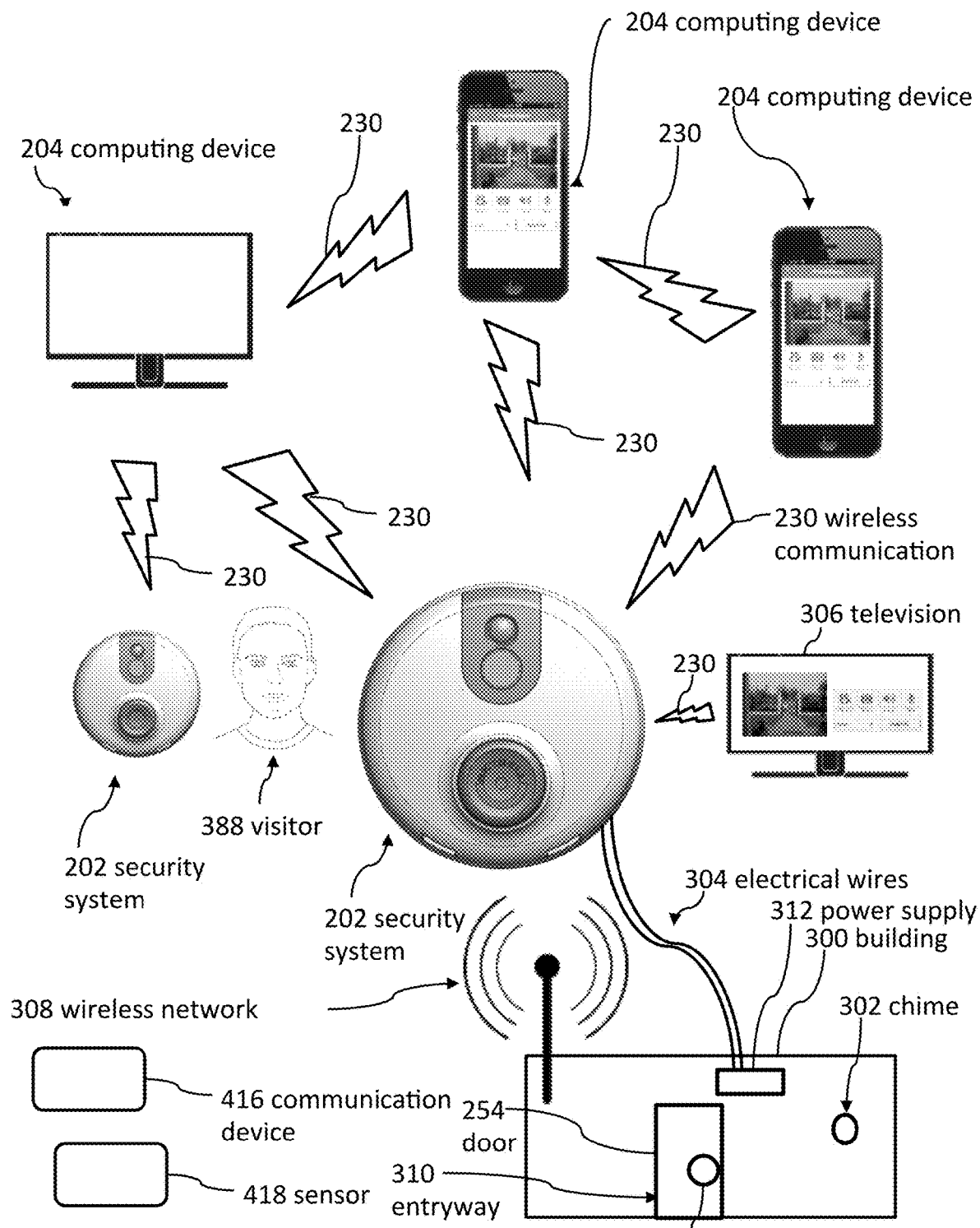
FIG. 3 illustrates an embodiment in which a security system is connected to a building, according to some embodiments.

FIG. 3 illustrates an embodiment in which a doorbell 202 is connected to a building 300, which can include an entryway 310 that has a door 254. A visitor 388 can approach the doorbell 202 and then can be detected by the doorbell 202. The visitor 388 can press the doorbell button 212. The user of the doorbell 202 can configure the doorbell 202 such that when the visitor 388 presses the doorbell button 212, the user receives a notification regarding the visitor 388.

Electrical wires 304 can electrically couple the doorbell 202 to the electrical system of the building 300 such that the doorbell 202 can receive electrical power from the building 300. The building can include a door lock 250 to lock the door 254.

A wireless network 308 can allow devices to wirelessly access the Internet. The security system 202 can access the Internet via the wireless network 308. The wireless network 308 can transmit data from the security system 202 to the Internet, which can transmit the data to remotely located computing devices 204. The Internet and wireless networks can transmit data from remotely located computing devices 204 to the security system 202. In some embodiments, a security system 202 connects to a home's WiFi.

As illustrated in FIG. 3, one computing device 204 (e.g., a laptop, a smartphone, a mobile computing device, a television) can communicate with multiple security systems 202. In some embodiments, multiple computing devices 204 can communicate with one security system 202.

In some embodiments, the security system 202 can communicate (e.g., wirelessly 230) with a television 306, which can be a smart television. Users can view the television 306 to see a visitor and/or talk with the visitor.

Figure 4:
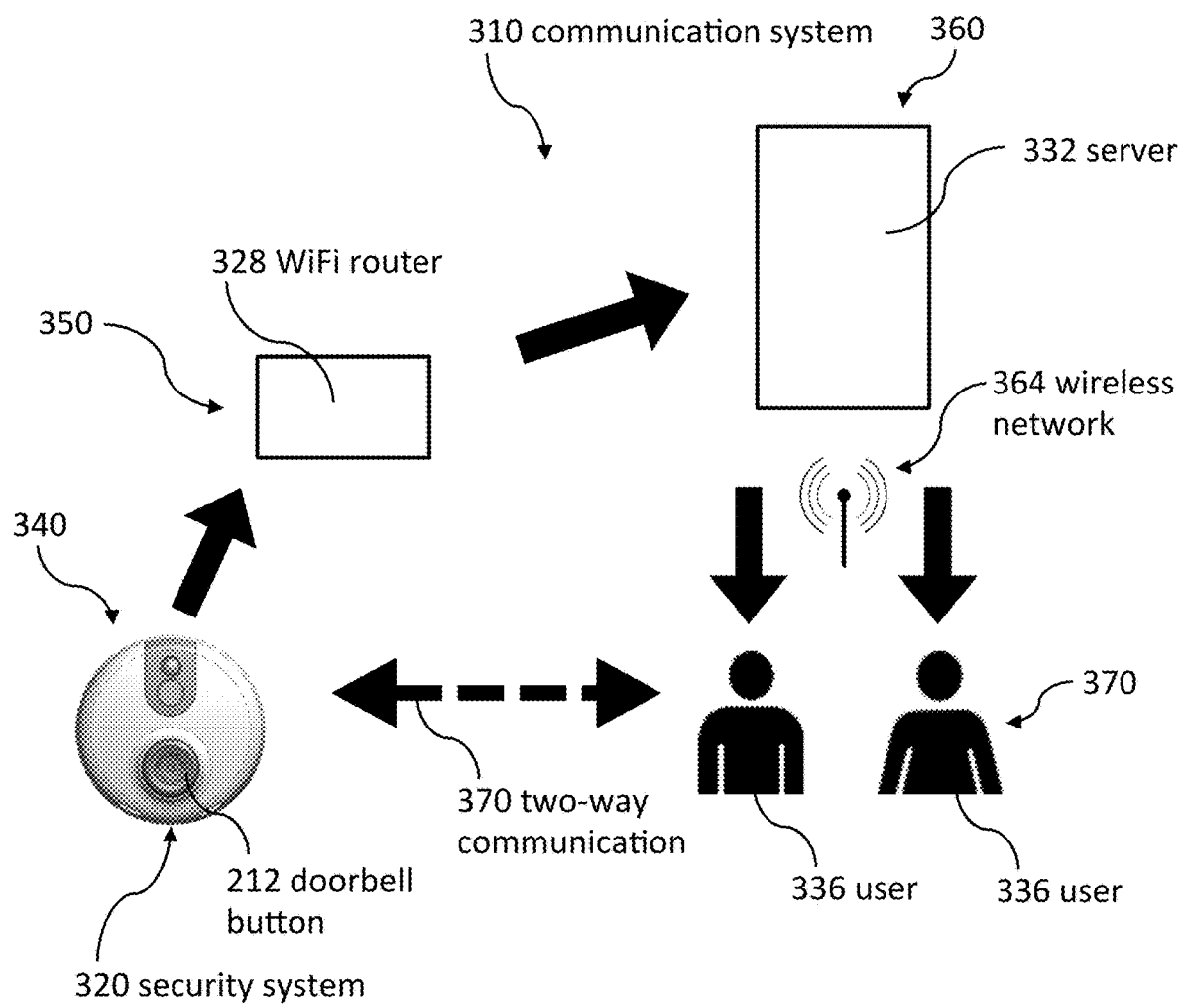
FIG. 4 illustrates a communication system that includes a security system, a doorbell button, a wireless router, a server, and users, according to some embodiments.

FIG. 4 illustrates a communication system 310 that includes a security system 320, a doorbell button 212, a WiFi router 328, a server 332, and users 336. In step 340, a visitor initiates a communication request by pressing the doorbell button 212 or triggering a motion or proximity sensor. The visitor can trigger the motion or proximity sensor by approaching the security system 320. In step 350, the security system 320 connects or otherwise communicates with a home WiFi router 328. In step 360, the server 332 receives a signal from the WiFi router 328 and sends video and/or audio to the users 336 via a wireless network 364. In step 370, the users see the visitor, hear the visitor, and talk with the visitor. Step 370 can include using a software application to see, hear, and/or talk with the visitor. The visitor and users 336 can engage in two-way communication 374 via the internet or other wireless communication system even when the visitor and the users 336 are located far away from each other. Some embodiments enable users to receive communication requests and communicate with visitors via diverse mobile communication standards including third generation ("3G"), fourth generation ("4G"), long term evolution ("LTE"), worldwide interoperability for microwave access ("WiMAX"), and WiFi.

In some cases, the users 336 utilize the communication system 310 to communicate with visitors who are in close proximity to the users 336. For example, a user 336 located inside her home can communicate with a visitor located just outside the home via the communication system 310.

Figure 29:
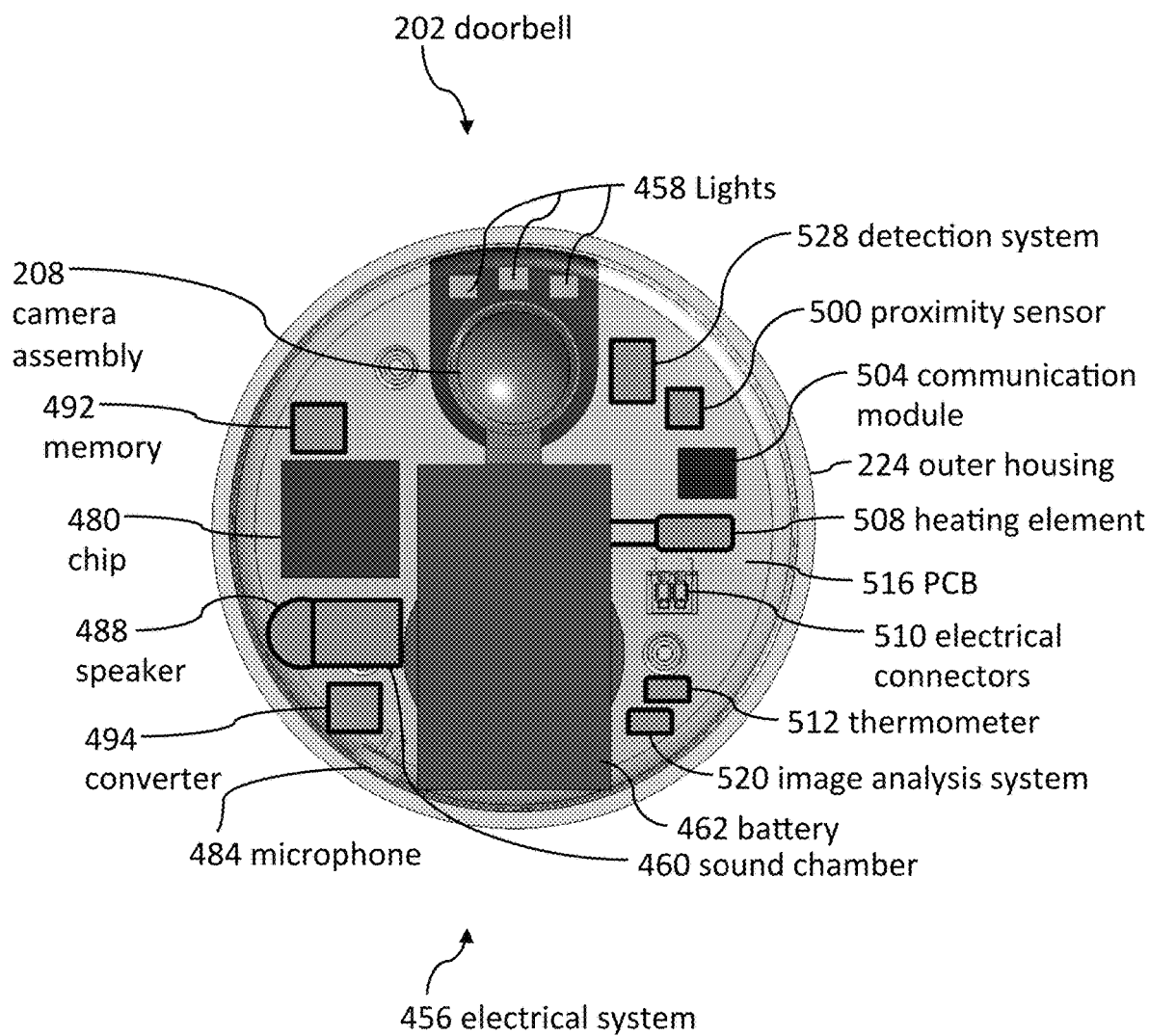
FIG. 29 illustrates a back view of the doorbell from FIG. 1 without a mounting bracket, according to some embodiments.

FIG. 29 illustrates an internal view of the doorbell 202. Doorbells 202 can include a chip 480 (e.g., integrated circuits, microprocessor, computer) and a memory 492. Doorbells 202 can also include a microphone 484 and a speaker 488. The speaker 488 can comprise a flat speaker and a sound chamber 460 configured to amplify an emitted sound. The flat speaker can be located in the sound chamber. Some doorbell embodiments include a proximity sensor 500. In several embodiments, doorbells 202 include a wireless communication module 504, such as a WiFi module. The communication module 504 can have an integrated antenna. In some embodiments, an antenna is contained within the outer housing 224.

The doorbell 202 can include one or more heating elements 508 configured to regulate the temperature of the doorbell 202. For example, doorbells 202 can be used in very cold environments, such as in Alaska. The heating element 508 can be used in various methods to protect temperature sensitive portions of the doorbell 202 from cold weather.

While protecting the doorbell 202 from cold weather can be important in some embodiments, protecting visitors from excessive heat can also be important in some embodiments. Excessive heat could burn visitors as they "ring" the doorbell (e.g., press the doorbell button 212 shown in FIG. 35). The doorbell 202 can include a thermometer 512 to enable the system to determine the temperature inside a portion of the doorbell 202 and/or outside the doorbell 202.

Several embodiments can be configured for 9 to 40 volts alternating current ("VAC") and/or 9 to 40 volts direct current ("VDC"). Some embodiments convert input electricity into direct current (DC), such as 12 VDC. Several embodiments include a converter 494 for power conversion (e.g., converting electrical energy from one form to another). The converter 494 can convert input power (e.g., from wiring in a building) to a suitable power form for the doorbell 202. The power conversion can convert between AC and DC, change the voltage, and/or change the frequency. The converter 494 can include a transformer and/or a voltage regulator. In several embodiments, the converter 494 can include a DC to DC converter, a voltage stabilizer, a linear regulator, a surge protector, a rectifier, a power supply unit, a switch, an inverter, and/or a voltage converter. In some embodiments, the converter 494 converts 50 Hertz ("Hz") power into 60 Hz power.

The electrical components of the doorbell 202 (e.g., the camera assembly 208, the memory 492, the chip 480, the speaker 488, the converter 494, the microphone 484, the lights 458, the rectifier 524, the proximity sensor 500, the communication module 504, the heating element 508, the electrical connectors 510, the thermometer 512, the image analysis system 520, and the battery 642) can be electrically coupled to a printed circuit board ("PCB") 516 and can receive electrical power from the PCB 516.

The PCB 516 and the electrical components of the doorbell 202 can be the electrical system 456 of the doorbell 202. Additional details regarding the PCB 516 and the electrical components of the doorbell 202 are described in U.S. Nonprovisional patent application Ser. No. 14/612,376; filed Feb. 3, 2015; and entitled DOORBELL COMMUNICATION SYSTEMS AND METHODS. The entire contents of patent application Ser. No. 14/612,376 are incorporated by reference herein.

Although some embodiments are described in the context of methods, the method embodiments can also be formulated as devices and systems. Methods described herein can be applied to the devices and systems incorporated by references herein.

Situational Sound Embodiments

The security system 202 may be configured to play unique sounds in response to detecting specific situations and/or during certain times of day. The sounds may be preprogrammed sounds or completely customizable by a user of the security system 202. As well, the security system 202 may be configured to play any of the sounds according to specific situations. For example, the security system 202 may be configured to play a specific message for a specific visiting individual, and/or may be configured to play a specific message when a potential visitor is identified as a specific person or is included in a list of specific people.

The security system 202 may include a speaker 488 configured to emit any type of sound. The security system 202 may also include a visitor detection system that may include at least one of a button 212, a camera 208, and a motion detector 218. Accordingly, the visitor detection system may be configurable to receive various indications of a visitor's presence. As well, the speaker 488 and the visitor detection system may be directly or indirectly coupled to the security system 202. Even still, the speaker 488 and the visitor detection system may be mechanically, electrically, and/or communicatively coupled to the security system 202.

Figure 5:
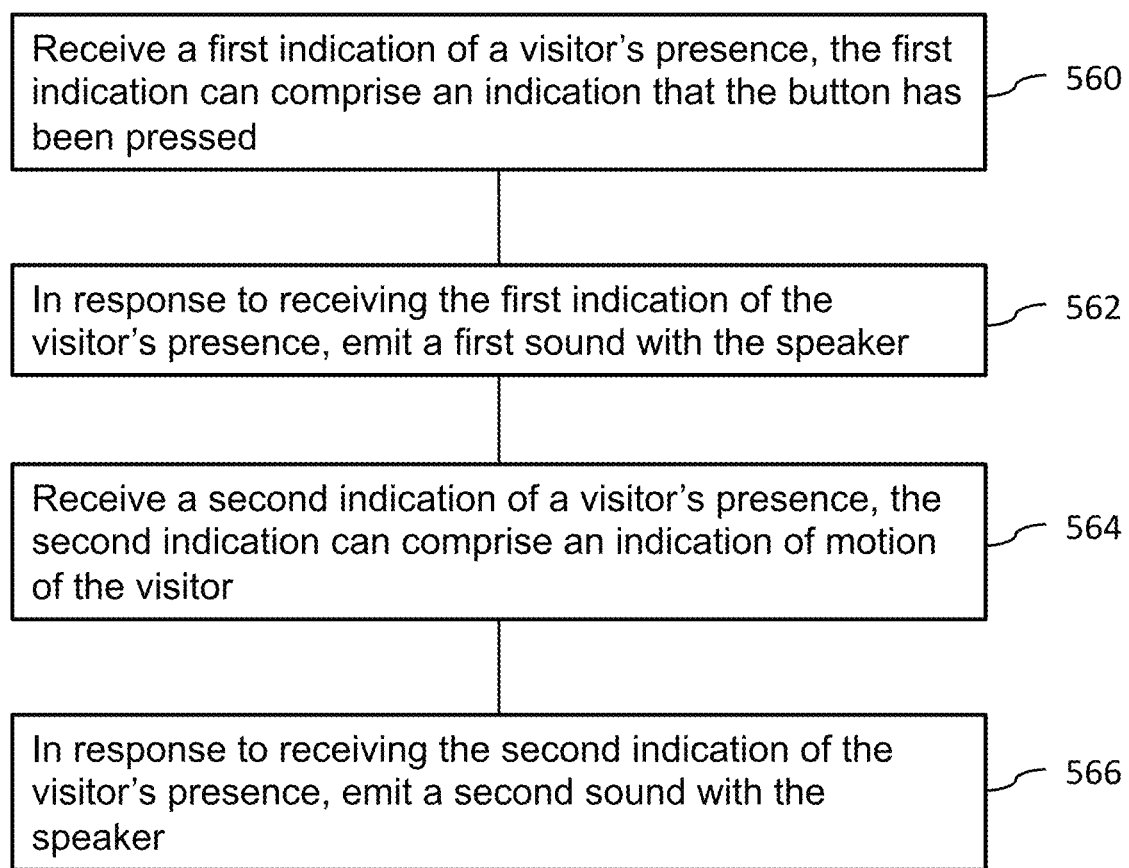
FIG. 5 illustrates a flow diagram showing a method of operating a security system, according to some embodiments.

The security system 202 may detect different indications of a visitor's presence. As shown in FIG. 5, the security system 202 can be configured to receive a first indication of a visitor's presence (at step 560). In response to receiving the first indication of the visitor's presence, the security system 202 can emit a first sound with the speaker 488 (at step 562). The security system 202 can be configured to receive a second indication of a visitor's presence (at step 564). In response to receiving the second indication of the visitor's presence, the security system 202 can emit a second sound with the speaker 488 (at step 566). The first sound can be audibly different than the second sound.

Some of the indications can be interpreted as being associated with a friendly or welcome visitor, while other indications can be interpreted as being associated with an unfriendly or unwelcome visitor. According to these different indications, the security system 202, by the speaker 488, can emit different sounds.

Figure 7:
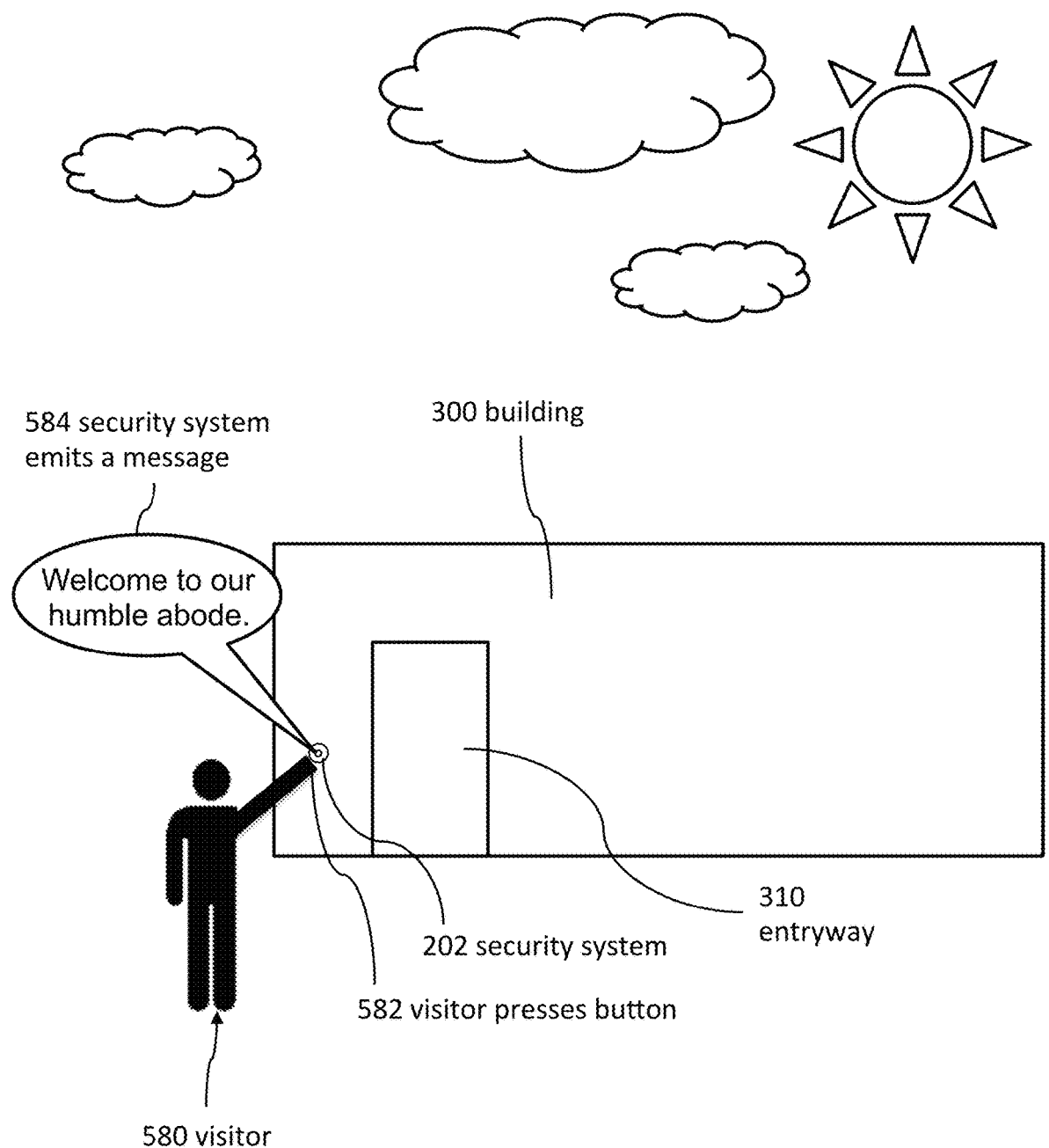
FIGS. 7, 8, 9 and 10 illustrate visitors being detected by security systems, according to various embodiments.

With reference to FIG. 7, when the security system 202 receives an indication that a visitor 580 has pressed the button 212 (at step 582), this can be interpreted as an indication of a friendly, or welcome visitor. In response to receiving the indication that the button 212 has been pressed, the speaker 488 can emit a first sound (at step 584), such as a friendly sound (e.g. "Welcome to our humble abode.").

Figure 8:
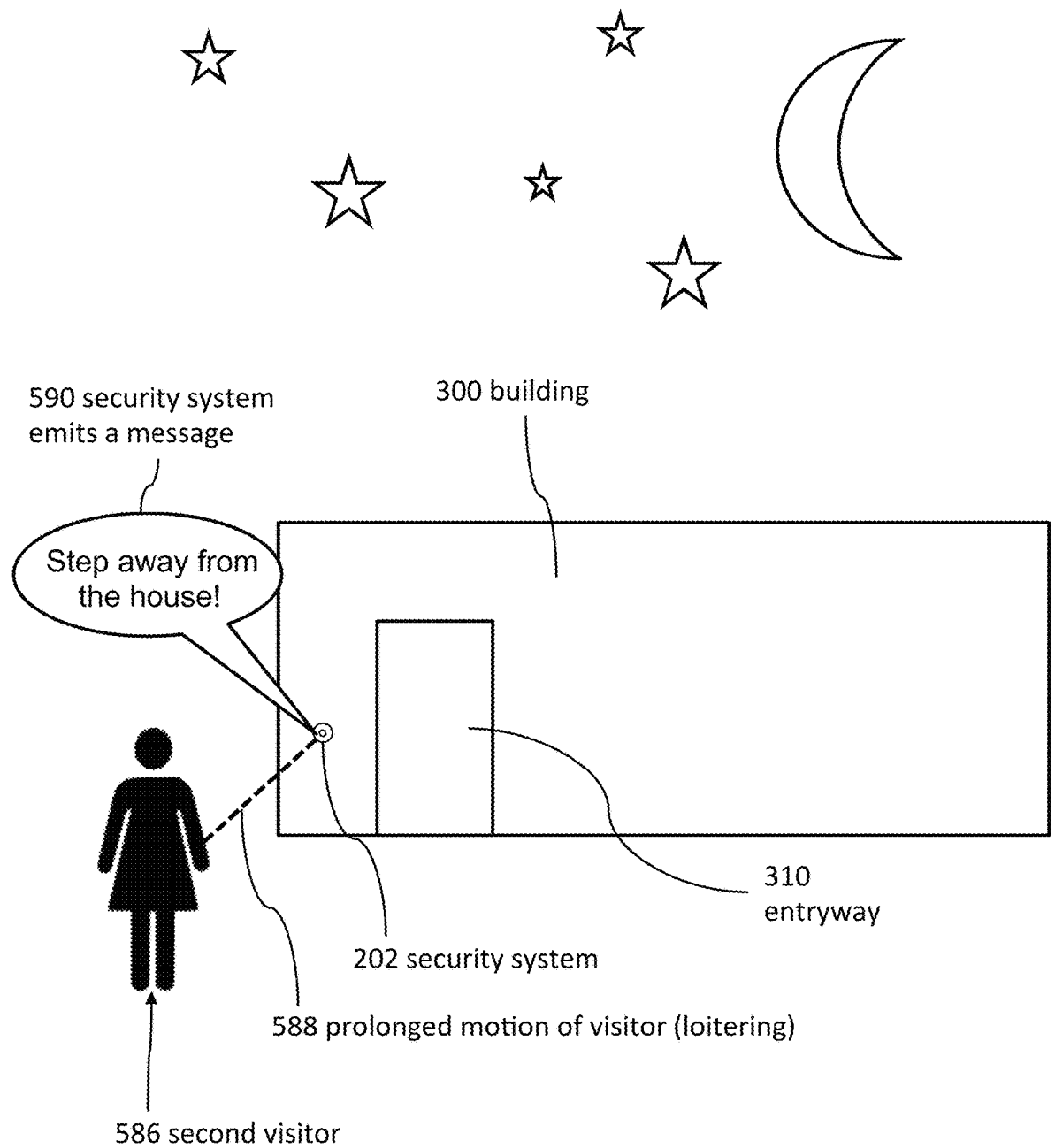

As illustrated in FIG. 8, when the security system 202 receives an indication that a visitor 586 has been moving in front of the security system 202 for a prolonged or predetermined time (e.g. 15 seconds or any time that indicates that the visitor is loitering) without pressing the button 212 (at step 588), this can be interpreted as an unfriendly or unwelcome visitor. In response to receiving the indication that the visitor has been moving in front of the security system 202 without pressing the button 212, the speaker 488 can emit a second sound (at step 590). The second sound can be an alert sound (e.g. a warning to move away from the building 300—"Step away from the house!"). It should be appreciated that the security system 202 can be configured to emit any number of sounds, such as a third sound, a fourth sound, a fifth sound, and any number of additional sounds.

The security system 202 can be configured to receive any number of indications. For example, in addition to a button press and a motion of a visitor, the indications can include indications of a remote computing device 204, a noise, a thermal signature (such as a thermal gradient indicating the presence of a person or animal), a retina scan, a fingerprint scan, a ground vibration, and the like. It should be appreciated that the indication can include any indication of a presence of any visitor, such as a person or animal.

In some embodiments, the security system 202 can emit different sounds for a first visitor. For example, as the first visitor approaches the building 300, the security system 202 can emit a first sound based upon the motion of the first visitor. As well, the security system 202 can emit a second sound once the first visitor pushes the button 212 of the security system 202.

Furthermore, any of the indications described in this disclosure can be associated with a visitor that is either welcome or unwelcome at the building. Accordingly, the security system 202 can be configured to any environment in which the building 300 is situated. For example, some buildings 300 can be located in high traffic areas where it is common for people to walk by the front of the security system 202 without pressing the button 212. In this regard, the security system 202 can be configured to ignore indications of motion and only emit sounds in response to affirmative indications that the visitor is visiting the building 300, such as an indication that the button 212 has been pressed. In some embodiments, the security system 202 can be configured to only respond to motion in certain zones. For example, if the security system 202 is located 20 feet from a busy sidewalk, then the security system 202 can be configured to ignore all motion that occurs more than 15 feet from the security system 202. In this manner, the security system 202 can only respond to movements occurring on the building property.

As well, combinations of indications can be interpreted in various manners. For example, a combination of an indication of motion (i.e. movement) of a visitor in front of the security system 202 and an indication that the visitor has pressed the button 212 can indicate that the visitor is welcome at the building 300. As previously described, the speaker 488 of the security system 202 can emit a friendly message in response to the combination of indications.

Even still, the security system 202 can be configured to emit different sounds in response to a positive detection of one indication and a negative detection of another indication. For example, if the security system 202 detects motion of a visitor but does not detect sound, this can be interpreted as an unwelcome visitor, such as a prowler sneaking around the outside of the building 300. In response, the speaker 488 of the security system 202 can emit an alert sound (e.g. a warning to exit the premise before the authorities are notified).

Figure 6:
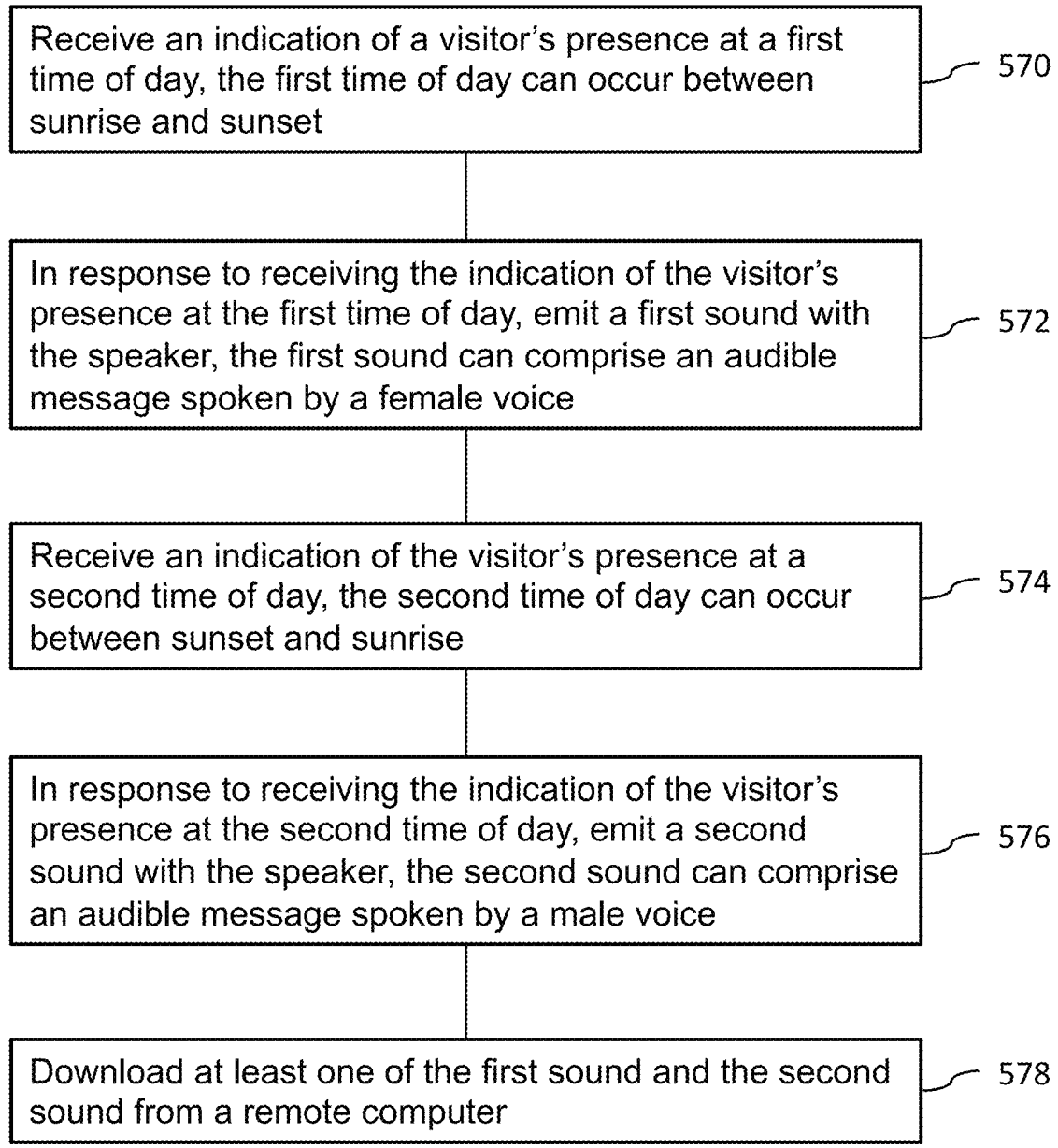
FIG. 6 illustrates a flow diagram showing another method of operating a security system, according to some embodiments.

Furthermore, the time of day and/or day when a visitor approaches the building 300 can also indicate whether the visitor is welcome or not. As shown in FIG. 6, the security system 202 can be configured to receive an indication of a visitor's presence at a first time of day (at step 570). The first time of day can occur between sunrise and sunset, or any other time of day. In response to receiving the indication of the visitor's presence at the first time of day, the security system 202 can emit a first sound with the speaker 488 (at step 572). In some embodiments, the first sound comprises an audible message spoken by a female voice, while some embodiments may comprise an audible message spoken by a male voice.

Furthermore, the security system 202 can be configured to receive an indication of the visitor's presence at a second time of day (at step 574). It should be appreciated that the second time of day can occur between sunset and sunrise, or any other time of day. In response to receiving the indication of the visitor's presence at the second time of day, the security system 202 can emit a second sound with the speaker 488 (at step 576). In some embodiments, the second sound comprises an audible message spoken by a male voice, while some embodiments may comprise an audible message spoken by a female voice.

Figure 9:
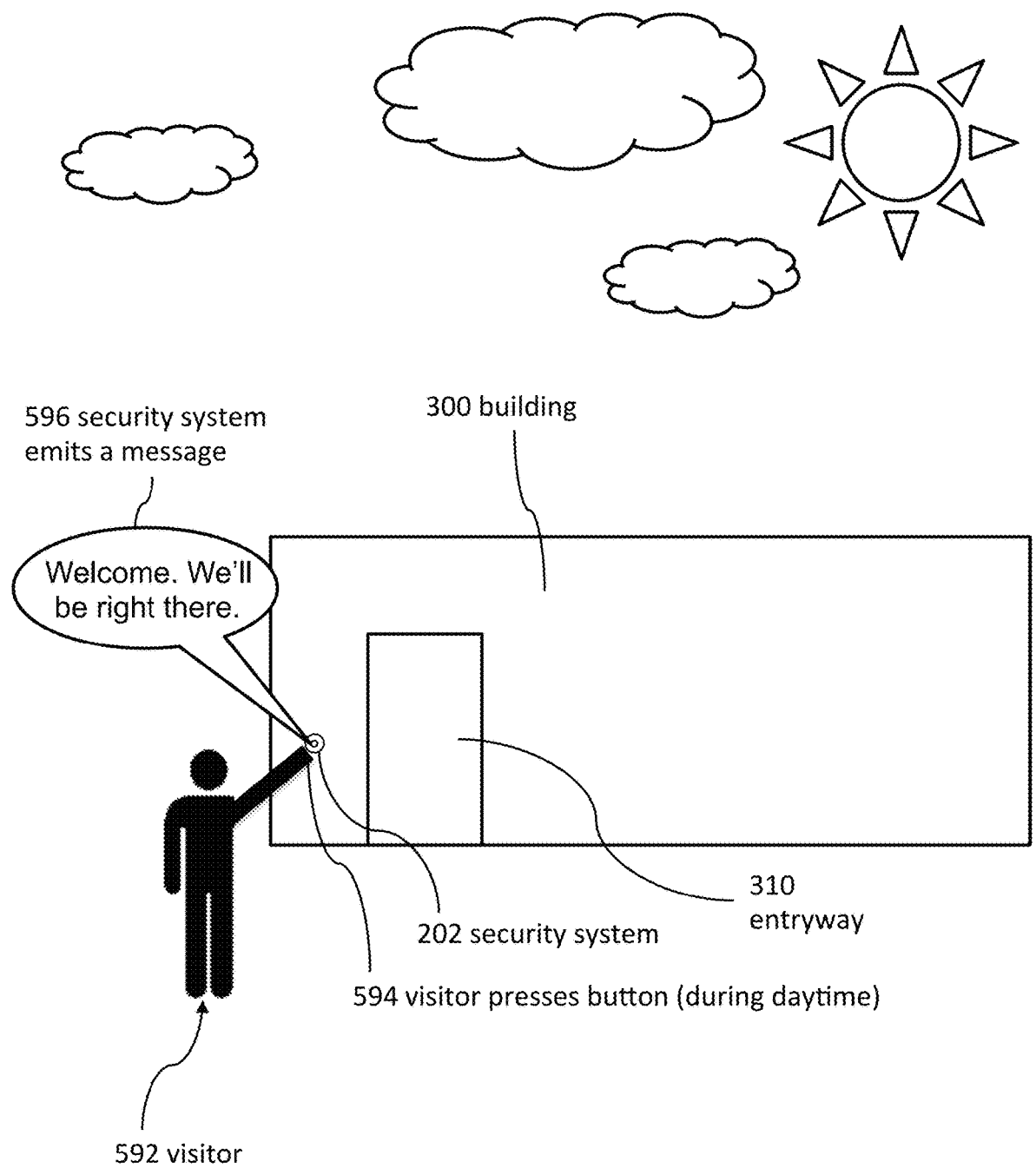
Figure 10:
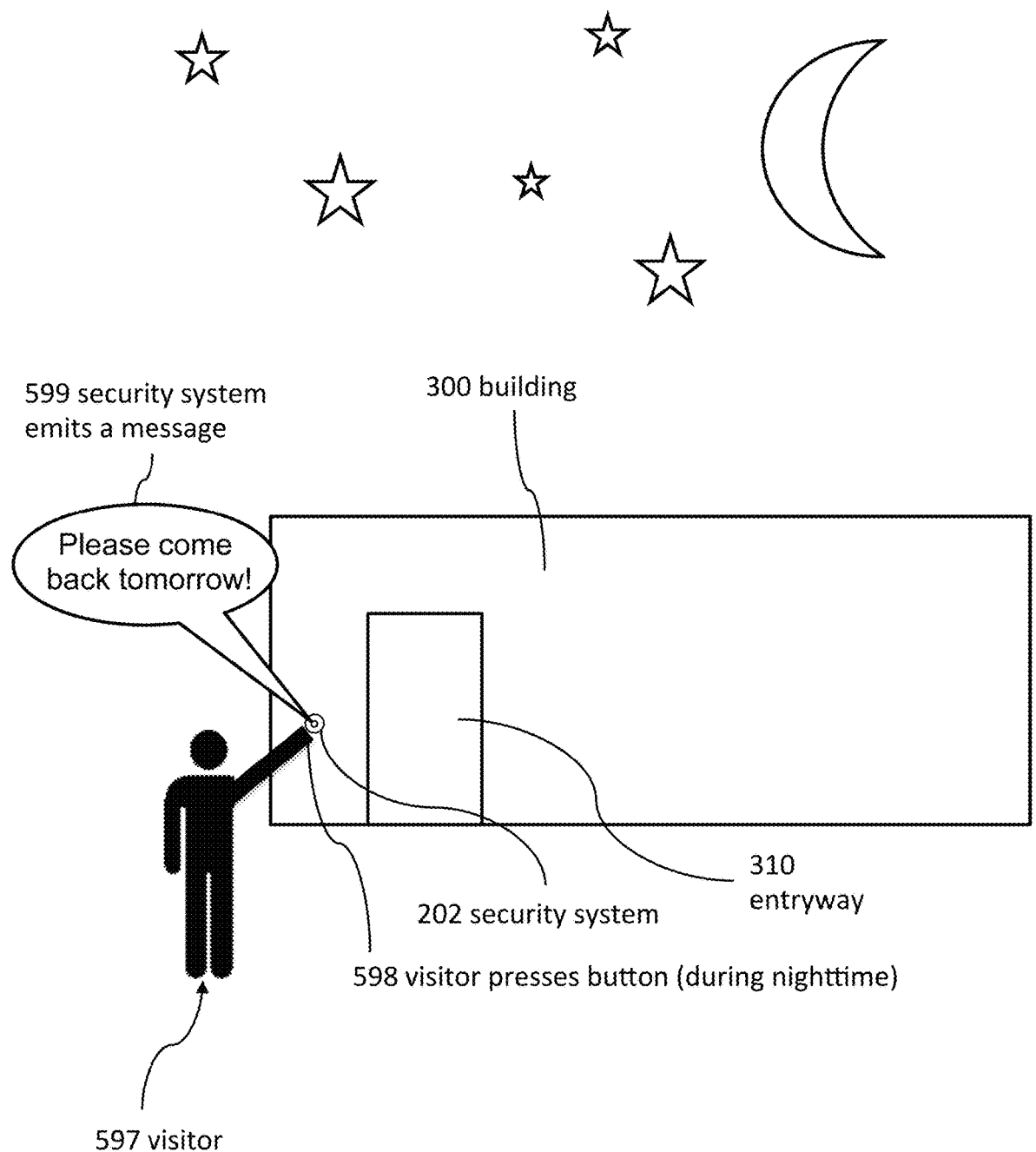

To illustrate a more specific example, such as the one shown in FIG. 9, if a visitor 592 presses the button 212 at noon on a weekend day (at step 594), the speaker 488 can emit a welcome message (e.g. "Welcome. We'll be right there.) (at step 596). In another example, as illustrated in FIG. 10, if a visitor 597 presses the button 212 at midnight on a workday (at step 598), the speaker 488 can emit a do not disturb message or a message instructing the visitor to come back another time (e.g. "Please come back tomorrow!").

Combinations of indications can be interpreted differently depending on the time of day. For example, in response to an indication of a motion and a noise during the day, the speaker 488 of the security system 202 can emit a friendly message. However, in response to an indication of a motion and a noise during the night, the speaker 488 can emit a warning message.

Even still, the security system 202 can be configured to respond differently based on the unique circumstances of the indication. For example, if the motion detector 218 of the security system 202 detects a slow movement versus a faster movement, then the speaker 488 can emit different sounds based upon these various circumstances. A slow movement can be interpreted as a prowler approaching the building, while a faster movement, such as a movement of a person walking at 3.5 miles per hour, can be interpreted as a friendly visitor approaching the building 300.

The time of day can be any selected time of day and any number of time ranges can be used. For example, the security system 202 can emit a welcome message during sunrise to sunset and an alert or warning message during sunset to sunrise. Accordingly, because sunrise and sunset change on a daily basis, the security system 202 can be communicatively coupled to an outside database(s) to allow the security system 202 to thereby automatically respond to these ever-changing conditions.

The security system 202 (e.g. doorbell) can elect to emit a particular sound, such as a first sound or a second sound, based on a time at which the security system 202 detects an indication of a presence of a visitor. In some embodiments, the security system 202 is configured to detect an amount of light, which may indicate a time of day. In response to detecting the amount of light, the security system 202 can elect to emit the first sound or the second sound based on the amount of light.

As well, the security system 202 can be configured to provide unique responses during different time ranges on specific days. For example, the user may have a bowling league every third Monday of the month. Accordingly, during that time, (e.g. from 6 pm-8:30 pm) on the third Monday of the month, in response to detecting an indication of a presence of a friendly visitor, the speaker 488 of the security system 202 can emit a friendly message telling the visitor that their presence is appreciated but the visitor should come back another time. In another example, the user may be on vacation from the $1^{st}$ to the $10^{th}$ and the user may wish to emit more intimidating warnings to secure the building 300. Generally speaking, the security system 202 can be configured to emit any type of sound in response to any time of day and/or day.

The security system 202 can be configured to detect specific visitors and emit certain sounds in response to detecting the specific visitors. For example, if the security system 202 detects a first visitor, such as a relative of the homeowner, the security system 202 can always emit a friendly sound, no matter how the first visitor approaches the home, or during what time of day. As well, if the security system 202 detects a second visitor, such as an unknown party (e.g. a solicitor), the security system 202 can emit an unfriendly sound, no matter how the second visitor approaches the home, or during what time of day.

To determine the identity of a visitor, the security system 202 can use any type of identity recognition technology, such as facial recognition, to determine an indication of an identity of a visitor. Some of these types of identity recognition technologies are disclosed in U.S. Nonprovisional patent application Ser. No. 14/612,376; filed Feb. 3, 2015; and entitled DOORBELL COMMUNICATION SYSTEMS AND METHODS. The entire contents of patent application Ser. No. 14/612,376 are incorporated by reference herein.

The different types of sounds emitted by the speaker 488 can be configured to match the appropriate indication as detected by the security system 202. For example, if the security system 202 detects an unfriendly visitor, the speaker 488 can emit a message spoken by a male voice to thereby intimidate the unfriendly visitor. Contra, if the security system 202 detects a friendly visitor, the speaker 488 can emit a message spoken by a female voice to thereby welcome the visitor. As well, the security system 202 can be configured to emit any other type of sound. For example, a welcome visitor can be greeted by a pleasant melody or a ding-dong, while an unwelcome visitor can be greeted by an alarm sound or a warning message.

As well, messages can be spoken in any language, volume, pitch, accent, and the like. Users may find that various combinations of vocal characteristics to be useful in different situations. For example, if a user is hosting a Mardi gras party, the user can configure the security system 202 to emit a message spoken by a person with a southern accent. Generally, it should be appreciated that the speaker 488 of the security system 202 can be configured to emit any type of sound for any type of specific situation.

Likewise, the security system 202 can be configured to play a specific message if the potential visitor is not included in a list. For example, where a potential visitor is not included in a list of the resident's contacts, the security system 202 can be configured to indicate that the resident does not accept solicitors and/or request the visitor to provide identifying information or describe the purpose of the visit.

In some embodiments, the security system 202 can be configured to play a specific message if the potential visitor has a criminal background. For example, a user can configure the security system 202 to play a specific message where a potential visitor is a registered sex offender.

The sounds emitted by the security system 202 can be recorded by the user him/herself. As well, the sounds can be downloaded from another source, such as a remote computer (e.g. a remote server), a remote computing device (e.g. a smart phone), a website, a database (e.g. iTunes®), and the like. Also, methods can include selecting the first sound and the second sound with a remote computing device that is configured to receive alerts from the doorbell. The selected sounds can be wirelessly transmitted to the doorbell.

As well, the sounds can be recorded with a remote computing device 204 and the sounds can be set up for temporary use whereby the sounds can expire upon a predetermined time. For example, a user can enter an expiration date of the recorded sound with the remote computing device 204. Furthermore, the user can wirelessly send the first sound and the expiration date from the remote computing device to the doorbell. Once the expiration date passes, the security system 202 can then cease to emit the recorded sound from the security system 202.

As well, the security system 202 can be configured to receive sound emitting parameters from a remote computing device 204. The security system 202 can emit a predetermined sound based upon the sound emitting parameter. In some embodiments, the sound emitting parameter includes at least one of an identity of the first visitor, data associated with the first visitor, a time, a location of a user of the remote computing device. In some embodiments, the security system 202 can automatically download a third sound based on the sound emitting parameters. The security system 202 can emit the third sound from the speaker according to rules associated with the third sound.

Alert Communication Embodiments

Embodiments of the security system 202 can be configured to alert individuals located outside of a building (e.g. a home). For example, the security system 202 can be configured to flash a light, emit a sound (e.g. alternating high pitch and low pitch sounds), initiate a communication session with a remote computing device 204, and the like. These various alerts can be useful to individuals, such as first responders, seeking to identify the location of an event, such as an emergency event(s) occurring within or outside the home. Home, as used herein, may refer to a building whereby one or more occupants sleep in the building on a permanent basis. Home may distinguishable from an office building by the lack of permanent occupants that sleep in the office building. Home may refer to an apartment building due to the permanent nature of an occupant for the duration of a lease. Home may be distinguishable from a hotel due to the lack of permanent occupants.

Figure 11:
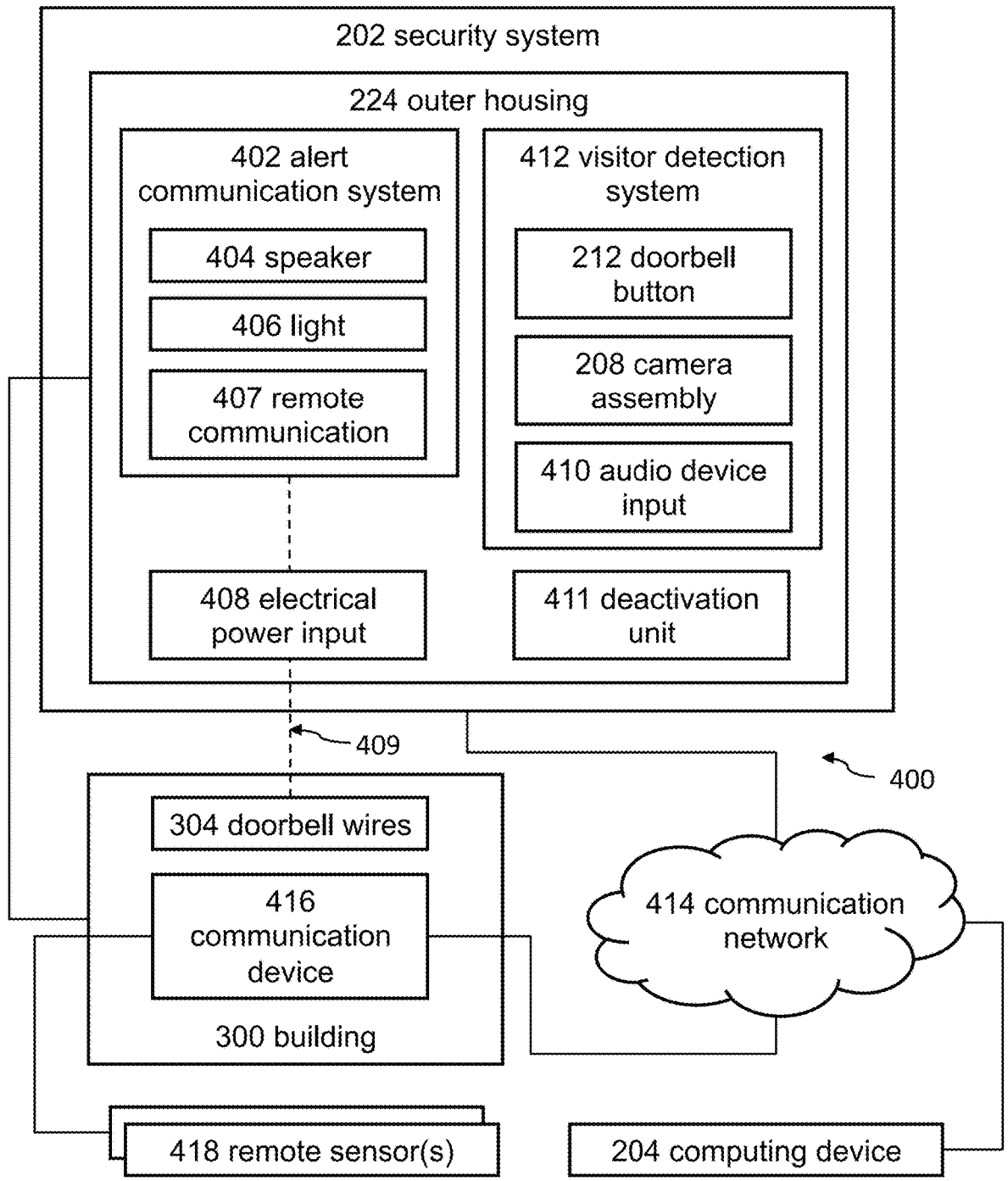
FIG. 11 illustrates a block diagram of a security system that is communicatively coupled to a communication system, according to some embodiments.

FIG. 11 illustrates an embodiment in which a security system 202 is communicatively coupled to a communication device 416. The security system 202 may be part of a communication system 400. The communication system 400 can be similar to that of the communication system 200 except, the communication system 400 may also be configured to allow communication between the security system 202 and the communication device 416.

In various embodiments, the security system 202 can be communicatively coupled, directly and/or via the cloud, to a communication device 416, such as a hub device, a communication system, and/or an event detection device 418, such as a sensor, (e.g., a peripheral device, such as a Nest Protect® (registered by Google Inc.), Nest Learning Thermostat® (registered by Google Inc.), DropCam® (registered by Google Inc.), and the like. The communication device 416, event detection device 418 and/or the security system 202 can be used to monitor various events within the building 300 (e.g., home). Specifically, the communication device 416 and/or event detection device 418 can detect emergency events and then notify the security system 202. In some embodiments, the communication device 416 is communicatively coupled to the event detection device 418 that detects the emergency event or adverse event (which is discussed further herein). In this manner, the security system 202 may directly or indirectly receive a notification of the emergency event from the event detection device 418 and/or the communication device 416.

The security system 202 can communicate with the communication device 416 via a communication network 414. The communication network 414 can be similar to the wireless communication 230, however, the communication network 414 can be wired or wireless. In embodiments, the communication network 414 can utilize the existing electrical wires in the doorbell wires to communicate with the security system 202 (e.g., powerline networking). The communication network 414 can also utilize a wired Local Area Network. In embodiments, the communication network 414 can include a Wide Area Network (WAN) that connects the communication device 416 to the security system 202 over the Internet.

In embodiments, the communication device 416 is a type of device that is configured to connect multiple devices and facilitate communication between the multiple devices. The security system 202 may be a device that also is communicatively coupled to the communication device 416. The communication device 416 may receive a transmission from one device (i.e., an event detection device 418), make a determination on what type of communication to perform (e.g., an alert), and transmit the communication to a second device (e.g., the security system 202) to take further action.

The security system 202 can be configured to communicate with remote computing devices (i.e., the computing device 204). The computing device 204 may refer to a remote computing device in embodiments. The security system 202 can initiate a communication session through the communication network 414 by sending a request to the computing device 204 to establish a secure connection (e.g., a virtual private network) to enhance security. In embodiments, the communication session may also include an indication that an event (as discussed further herein) has been initiated.

The security system 202 can have an outer housing 224. The outer housing 224 may be configurable to attach to a building 300. The outer housing 224 of the security system 202 can attach to the building 300 using a variety of permanent or temporary mounting mechanisms. In embodiments, the permanent mounting mechanism may prevent the removal of the security system 202. The building 300 may include a variety of structures. For example, the building 300 includes a home, which is a type of building 300. The home can include various types of structures in various square footages. For example, a home can be a wooden framed building with an exterior of stucco, brick, or siding. In embodiments, a home can be distinguished from other types of buildings based on the livable area (e.g., 500 square feet to 5000 square feet). In embodiments, a home can also be defined as being a freestanding structure without shared walls. A home may also be defined by zoning constraints. For example, the home may be zoned residential instead of commercial or industrial.

The outer housing 224 can also include a visitor detection system 412 coupled to the outer housing 224. The visitor detection system 412 can be an assembly of components that are collectively configured to detect visitors in the immediate vicinity (e.g., within 0.5 to 50 feet) of the security system 202. The visitor detection system 412 can include the doorbell button 212, the camera assembly 208, and an audio input device 410. In addition, the visitor detection system 412 can also include the motion detector 218 and fingerprint sensor 210. The audio input device 410 can be a device that captures audio (e.g., a microphone). The audio input device 410 can have various sensitivity ranges depending on the application. In embodiments, the audio input device 410 can include multiple microphones to extend the coverage area of audio capture. For example, the audio input device can have one microphone on board the outer housing 224 and receive input from another microphone located within the house (e.g., through the communication network 414).

The outer housing 224 may also include a deactivation unit 411. The deactivation unit 411 can be a component that is communicatively coupled to the security system 202. The deactivation unit 411 may be responsible for disabling the alert communication system 402. In embodiments, the deactivation unit 411 is part of the alert communication system 402. The alert communication system 402 may work passively or actively. In an active configuration, the security system 202 can actively monitor for a command to deactivate. For example, the security system 202 can send "activation status requested" signal to a deactivation unit 411 in regular intervals along with a unique randomized code and receive an "activation=True" signal from the deactivation unit 411 along with the unique randomized code. When communication is interrupted, then a non-response of the activation status may indicate "activation=True". When deactivated, the deactivation unit 411 transmits an "activation=False" signal along with the unique randomized code. The actively monitoring for the command can be advantageous where communication is lost with the deactivation unit 411 (i.e., the communication is modified or the deactivation is spoofed by an intruder).

The deactivation unit 411 may also passively monitor for the command. For example, an occupant may input a command through the deactivation unit 411 that is transmitted to the security system 202. The security system 202 can receive the command passively. In embodiments, the deactivation unit 411 may also be communicatively coupled with a remote computing device 204. The deactivation command may originate from the remote computing device 204 to deactivate the alert communication system 402 in either actively or passively.

The outer housing 224 can also include an alert communication system 402 coupled to the outer housing 224. The alert communication system 402 can be configurable to activate in response to an initiation of an event. For example, an alert from the communication device 416 that is transmitted to the security system 202 can activate various components on the security system 202 through the alert communication system 402. The alert communication system 402 can include components to communicate alerts to a user (e.g., an occupant of the home). In embodiments, the alert communication system 402 is the security system 202 or part of the security system 202. In embodiments, the alert communication system 402 includes a light 406 and a speaker 404. The light 406 can comprise the diagnostic light 216 and/or the power indicator light 220, as shown in FIG. 1, and/or any other light coupled to the security system 202.

As well, the speaker 404 may comprise the speaker 488, as illustrated in FIG. 1, and/or any other speaker coupled to the security system 202.

In embodiments, the alert communication system 402 refers to a collection of components for the purpose of alerting an occupant of the building 300. The alert communication system 402 can also refer to a control unit for the components that alert an occupant of the building 300. The control of the alert communication system 402 can be separate from the control for the security system 202. In embodiments, the alert communication system 402 is attached to an exterior surface of the home (i.e., a building 300). The outer housing 224 may be attached to an interior surface of the home (i.e., a building 300). The remote computing device 204 can be operated by the homeowner (i.e., a type of occupant).

The speaker 404 of the alert communication system 404 can be configured to emit a sound in response to the initiation of the event. For example, if the communication device 416 transmits an alert that indicates an emergency, then the security device 202 can emit a sound in the speaker 404 that indicates danger. The speaker 404 can be configured to emit a wide-range of sounds and various decibel levels depending on the application. For example, a more severe alert can be louder than a less severe alert. The security system 202 can alert an occupant of suspicious smoke by saying the location of the smoke and the time the smoke was detected.

The speaker 404 can simply emit a voice that says "Danger, Danger, Danger" to alert an occupant of the building 300. The sound emitted by the security device 202 can be unique to the type of alert. For example, if a fire alert is transmitted by the communication device 416, then the security device 202 can emit a voice that says "Fire, Fire, Fire" and repeats at a set interval. Various sounds can also be used to selectively alert other occupants. For example, a high frequency sound of 24 kHz to 45 kHz can selectively alert canine occupants of the building 300 without alerting a human. In another example, a sound from 17 kHz to 23 kHz may selectively alert children but not adults. Various patterns of sounds can also be produced. For example, the "SOS" Morse code pattern may be used to indicate distress.

The light 406 of the security system 202 may be configurable to illuminate in response to the initiation of the event. The light 406 can emit a variety of colors in a variety of patterns. For example, the light 406 can emit a green light, a white light, and a red light. A green light can be lit during normal operation. A white light color can be used for ordinary alerts, such as a power outage. A red light color can be used to indicate an imminent emergency that alerts the occupant to leave the building 300 immediately. For example, the red light color can be used to alert the occupant of a gas leakage or a fire or armed intruders.

In embodiments, the light 406 can flash at various frequencies to indicate a pattern. For example, three short flashes, followed by three long flashes, followed by three short flashes, can indicate distress. While rapid flashes can indicate a higher priority than slower flashes of light. The light 406 can be coordinated with the speaker 404. For example, the light 406 can flash at the same time that the speaker 404 makes a sound. The light 406 can also flash before or after the emission of sound from the speaker 404.

The alert communication system 402 can also include emission of an odor. The odor can be discernable by an occupant to know that something is wrong or can ward away an intruder. For example, if the communication device 416 alerts the security system 202 of an intruder, then a strong smell (such as that of a skunk) can trigger a silent alarm. Various smells can be used. For example, flowery odors can be used for non-urgent alerts (such as a water leak) while mercaptan-based odors can be used for urgent alerts.

The alert communication system 402 can include remote communication 407. The remote communication 407 can be responsible for communicating with a remote computing device 204 the status of the alarm. In embodiments, the remote communication 407 can be a module that communicates with a security monitoring service, which can also have a dedicated communication channel that is different than the communication network 414 in order to alert authorities in the event of a power outage.

In embodiments, the security system 202 is powered by an electrical power input 408. The electrical power input 408 can be a battery. The electrical power input 408 can also be from an electrical source such as from a household Alternating Current. The electrical power input 408 can also be configured to receive a step-down voltage (e.g., around 8V to 24V) from doorbell wires 304. The alert communication system 402 may be electrically coupled to electrical wires 409 (through the electrical power input 408). The electrical wires 409 can be configurable to be coupled to the doorbell wires 304 of a home (e.g., the building 300). The alert communication system 402 can be configurable to activate in response to a determination that an event has been initiated through the electrical wires 409. In embodiments, the communication can happen over powerline networking. Various spikes in electrical signals from the electrical wires 409 can also signal the alert communication system 402. In embodiments, a lack of electrical signal from the electrical wires 409 can also activate the alert communication system 402. For example, the lack of electrical power input 408 from the electrical wires 409 can activate the alert communication system 402. The alert communication system 402 can further utilize a backup battery system through the electrical power input 408 and cause the light 406 to emit white colored light so that an occupant can see.

The security system 202 may be configured as a passive or active device. As a passive device, the security system 202 may receive notifications of emergency events from the communication device and/or the event detection device 418. For example, a smoke detector event detection device 418 can transmit a smoke event to the communication device, which may communicate to the security system 202 an indication that the smoke event is occurring. The security system 202 can be monitoring for notifications from the communication device whenever a communication channel is established.

As an active device, the security system 202 may be configured to actively monitor whether the communication device and/or event detection device 418 has detected the occurrence or initiation of an emergency event (or adverse event). For example, the security system 202 can periodically request from the communication device a status of events. If there is no status, then the security system 202 can wait until another request is filled.

Figure 12:
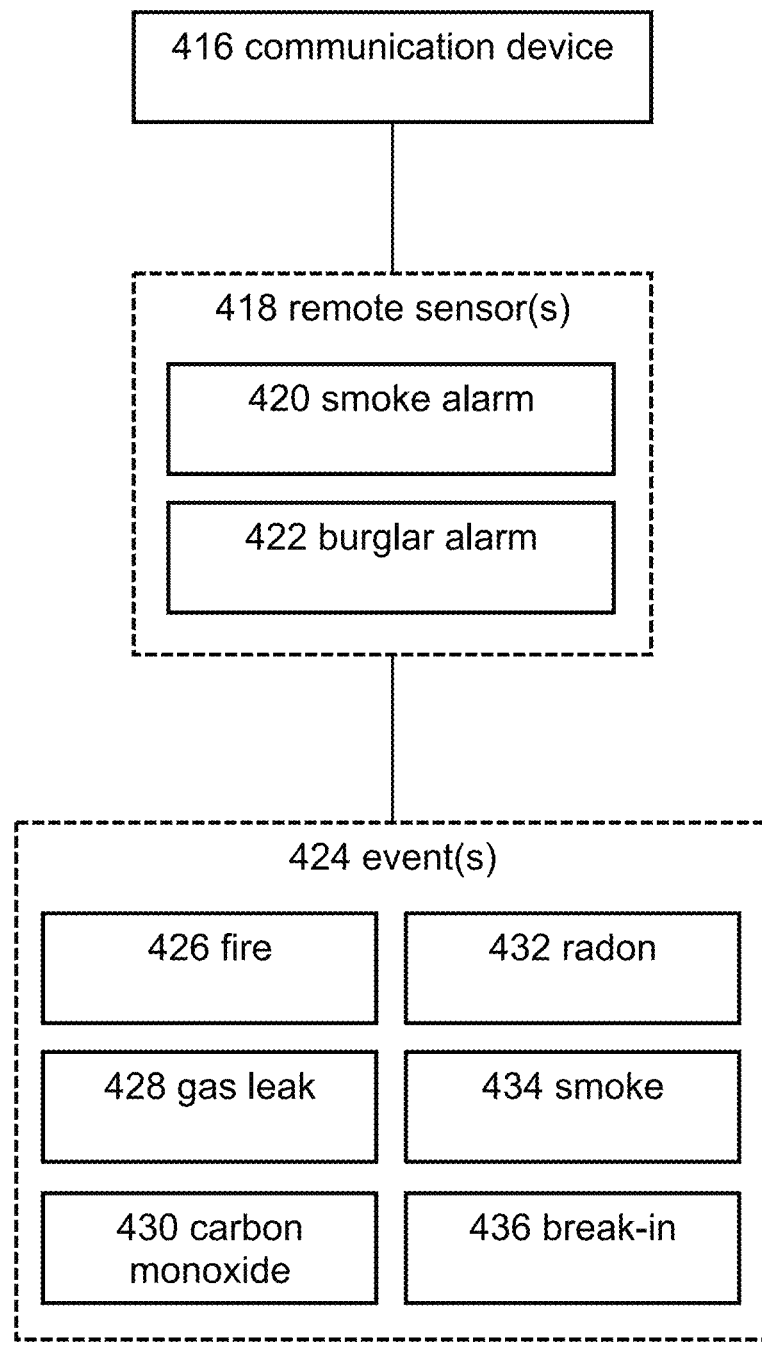
FIG. 12 illustrates a block diagram of various event detection devices that are communicatively coupled to a communication system, according to some embodiments.

FIG. 12 illustrates a block diagram of an enhanced view of various event detection devices 418, according to some embodiments. The event detection devices 418 can be communicatively coupled to the communication device. Types of event detection device 418 can include a smoke alarm 420 or a burglar alarm 422. The event detection device 418 can be configured to communicate with a communication device or to the remote device 204 through the communication network 414. In embodiments, the event detection device 418 can be "smart" and communicate with a variety of devices. The event detection device 418 can connect via the Internet of Things (IoT) and may each have a unique network identifier. The IoT may encompass various standards. For example, standards may include ALLJOYN® (Registered by Qualcomm Innovation Center Inc.), Thread Group, IEEE® (Registered by the Institute of Electronic and Electrical Engineers, Inc.) P2413 working group, IoTivity® (Registered by Samsung Electronics Co., Ltd.), or Representational State Transfer.

The security system 202 may comprise an alert communication system 402 that may include a light 406, a speaker 404, and a wireless communication system 230 that may be configured to initiate a transmission with a remote computing device 204. For example, the communication device may comprise a smart smoke detector 420 (e.g. Nest Protect®, registered by Google Inc.), and in response to the smart smoke detector detecting elevated levels of smoke 434, or elevated levels of other toxic gases, the security system 202 may activate its alert communication system 402 (e.g. flashing a light and/or emit a sound). This may thereby alert individuals outside the home as to the location of the home where the emergency event is occurring.

As well, it should be appreciated that the emergency event can comprise any type of event 424 that may require the attention of another party. As used, event can refer to an emergency event or an adverse event, which indicates harm to an occupant or requires the attention of a party other than the occupant. For example, the emergency event may comprise at least one of a fire 426, a gas leak 428, a break-in 436, elevated levels of smoke 434, elevated levels of radon 432, elevated levels of carbon monoxide 430, and the like.

The alert communication system 402 can be configured to alert individuals located outside the home in any variety of ways. For example, the alert communication system 402 can flash a bright light emitting diode and/or a light located behind the doorbell button 212, such as the diagnostic light 216, on the security system 202. In some examples, the alert communication system 402 can emit a loud sound from the speaker 404. For example, the loud sound can be alternating high and low pitch sounds that may be heard by individuals located within 300 feet of the home. The high and low pitch sounds can be of high and low frequencies that may be heard by individuals located within a neighboring home and/or a vehicle passing by. The loud sound can be a unique sound easily detectable by individuals. As well, the sound can comprise a noise that indicates danger or help is required.

Furthermore, the alert communication system 402 can be configured to initiate a transmission to a remote computing device 204. For example, if the security system 202 determines that a break-in has occurred, the security system 202 may initiate a computing session and/or a notification with the remote computing device 204 to alert an individual that is operating the remote computing device 204 of the break-in 436 at the home. As well, it should be appreciated that the security system 202 can initiate a transmission to any other party, such as an emergency dispatcher (e.g. 911).

The security system 202 may be configured to activate its alert communication system 402 after a predetermined amount of time. The predetermined amount of time may be 0 seconds, 10 seconds, 20 seconds, 1 minute, and the like. Generally, it should be appreciated that the alert communication system 402 may activate nearly at the same time as the communication device 416 detecting the emergency event 424 or any time thereafter.

Figure 13:
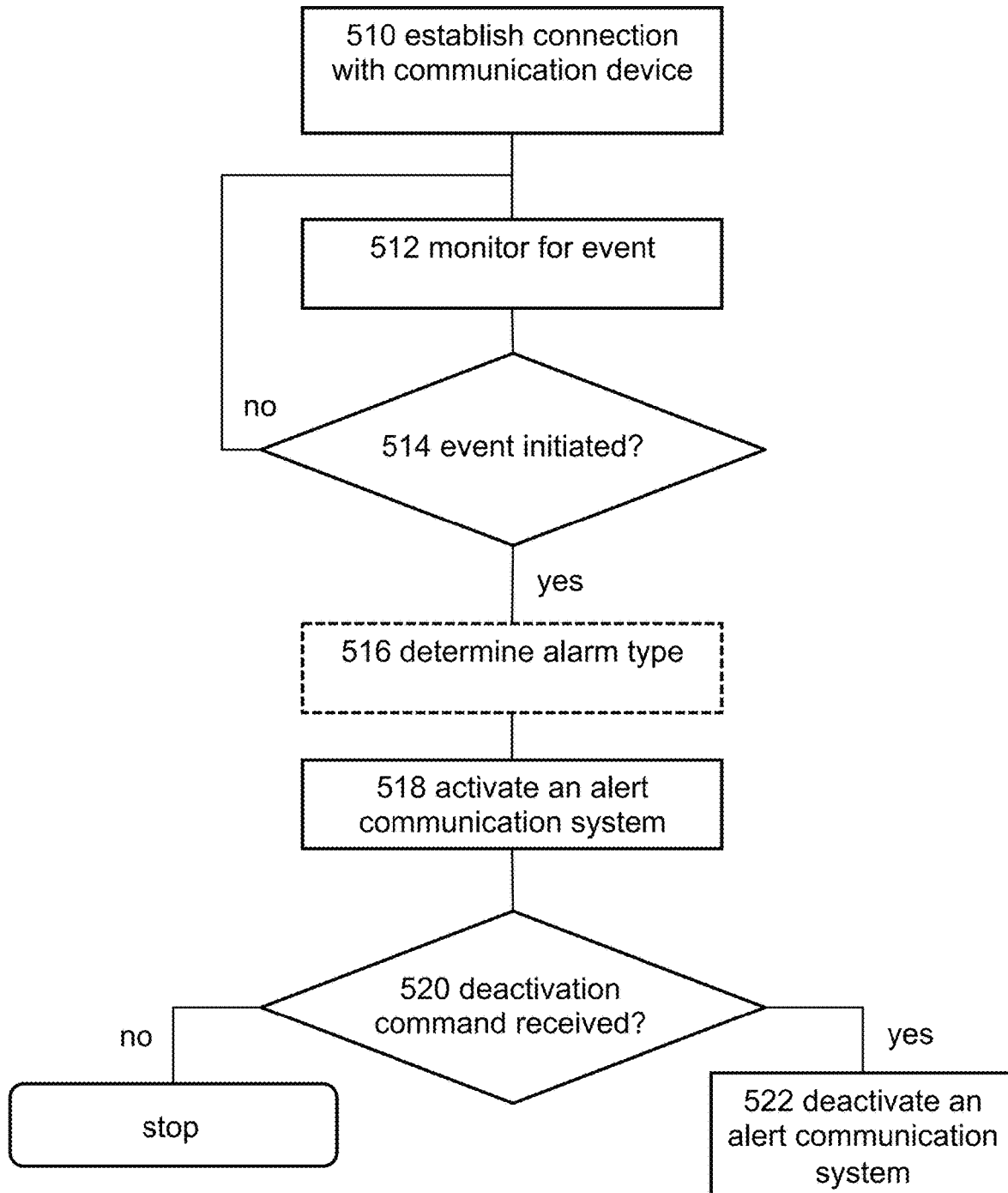
FIG. 13 illustrates a flowchart of a method of monitoring for an event through a communication system, according to some embodiments.

FIG. 13 illustrates a flowchart of a method 500 of monitoring for an event through a communication device 416, according to some embodiments. The method 500 can generally involve connecting to a communication device 416 and receiving a notification of an event from the communication device 416. The security system 202 can react based on the event from the communication system. The method 500 begins at block 510.

In block 510, the security system 202 can establish a connection with the communication system. As mentioned herein, the communication device 416 may utilize either a wired or wireless connection 230 to communicate with the security system 202. For example, a wireless home network that utilizes Wi-Fi may be used or local Bluetooth™ pairing may be used. Once connection is established, then the communication device 416 may be configured to only communicate with security system 202 at the ID provided by the security system 202. For example, the security system 202 may have a unique IPv6 address that the communication device 416 transmits to. The communication device 416 may also have a unique IPv6 address that the security system 202 transmits to. The security system 202 may also be configured to receive alerts from only the IPv6 address that belongs to the communication device 416, thus preventing spoofing type alarms. Various permissions may be set up using an Application Programming Interface (API) of the communication device 416. For example, the security system 202 can be set up as a client with read/write permissions which identifies the security system 202 that has permission to share data with the communication device 416.

In block 512, the security system 202 may monitor for an event. In embodiments, the security system 202 monitors for an event from the communication device 416. For example, the communication device 416 may receive a notification of an event from an event detection device 418. In embodiments, the security system 202 can monitor for an event using localized components. For example, the security system 202 may have a camera that is used to monitor for suspicious activity. The event may be communicated with the communication device 416 and the communication device 416 may take appropriate action (e.g., notify emergency services). As mentioned herein, the types of events may be selected from at least one of a fire, a gas leak, a break-in, elevated levels of smoke, elevated levels of radon, elevated levels of carbon monoxide, and the like.

The event detection device 418 may detect an event using a variety of methods. For example, various thresholds may be employed to detect an event 424. For example, the elevated levels of smoke event 434 can be based off of optical obscuration or electrostatic precipitation. The smoke can be based off of a threshold of parts per million or percentage of optical transmittance. The radon event 432 can be based off of PicoCuries per Liter reading from a radon detection unit. The gas leak event 428 can be based off of an 80% Lower Explosive Limit. Various gas detectors can be used (e.g., electrochemical, infrared point, infrared imaging, semiconductor, ultrasonic, holographic, etc.). A fire event 426 may be detected using temperature or a combination of readings from a smoke event 434 and a carbon monoxide event 430. The break-in event 436 may utilize various sensors present in the security system 202 or external sensors to the security system 202 (e.g., motion sensors). The event 424 is associated with a home (i.e., building 300), and the doorbell (i.e., security system 202) is attached to the home of a homeowner.

In block 514, the security system 202 can determine whether an event has been initiated. The event may be initiated whenever the security system 202 receives a transmission from a communication device 416 communicatively coupled to the security system. The transmission may be over various forms of communication and provide an indication that the event has been initiated. The security system 202 may monitor the communication system to detect whether the event has been initiated. In embodiments, the security system 202 (e.g., the doorbell) can interface with a remote computing device 204 to further communicate to an occupant that there is an alert at the home. Communicating via the remote computing device 204 may have the benefit of keeping occupants informed while away from the home. The security device 202 can establish a communication session with a remote computing device 204 in a similar manner as to the communication device 416. The communication session may include an indication that the event that has been initiated. For example, an occupant can receive a communication of a fire alert on a local application on their remote computing device 204 from the security system 202.

In block 516, the security system 202 can determine the alarm type. In embodiments, block 516 may be optional. Despite a variety of devices available to the security system 202, not all devices or tools may be appropriate in certain settings. For example, a non-urgent alert (such as elevated radon levels) may not warrant a high-pitched, high-volume noise in the middle of the night. The security system 202 can balance the severity of the alert with the certainty for the alert. For example, significant amounts of dust can trigger a smoke detector but the certainty of a fire can be determined using a carbon monoxide detector in conjunction with the smoke detector. The severity of a fire may be high but if the certainty that a fire is occurring is low, then the security system 202 can determine that another alarm type is more appropriate. Examples of determining an alarm type are described further herein.

In block 518, the security system 202 can activate the alert communication system 402 in response to determining that the event has been initiated in block 514. In embodiments, activating the alert communication system 402 can include activating selected components of the alert communication system 402 (e.g., the speaker 404 or the light 406). As mentioned herein, the alert communication system 402 can include a light 406 which, when the alert communication system 402 is activated, can cause the light 406 to illuminate in a variety of patterns and colors. The alert communication system 402 can also include a speaker 404 that emits a sound in a variety of intensities, frequencies, and patterns. The activating can also include activating a control element for the alert communication system 402. The control element for the alert communication system 402 can instigate a variety of patterns and alerts for multiple components (e.g., a flashing light followed by emission of selected sound frequencies).

In block 520, once the alert communication system 402 is activated, the security system 202 can monitor for a command to deactivate the alert communication system 402. In embodiments, block 520 may be optional. For example, a user of the security system 202 may not desire the security system 202 to alert occupants (e.g., a false positive). The command can be a sequence of instructions that is understood by the security system 202 to deactivate the alert communication system 402. In embodiments, the command can be a button press and an audible predetermined message. For example, an occupant can push a button (e.g., the door bell button 220) and speak an audible predetermined message such as "Alarm Deactivate" to deactivate the alert communication system 402. In various embodiments, the deactivation unit 411 can be configured to perform vocal recognition in order to distinguish between the voice of the occupant with the voice of a non-occupant, such as a prowler. Once the command is received, then the method 500 can continue to operation 522.

In block 522, the security system 202 can deactivate the alert communication system 402 in response to receiving the command to deactivate the alert communication system. The alert communication system 402 may be deactivated in a variety of ways. For example, the alert communication system 402 may deactivate (e.g. turn off the current alert) in response to the security system 202 receiving an indication that the doorbell button 212 has been pressed. In some embodiments, the security system 202 may be configured to turn off the alert communication system 402 in response to receiving an audible predetermined message, such as a spoken safety message or a spoken password that indicates that the event is being attended to or has ended. In some embodiments, the security system 202 can receive a deactivation command from the remote computing device 204. In this manner, the individual operating the remote computing device 204 may send a command through the remote computing device 204 to terminate the ongoing alert. The deactivation of the alert communication system 402 can include selectively deactivating less than all of the components of the alert communication system 402. For example, the deactivating of the alert communication system 402 can include deactivating only the localized communication (i.e., the speaker 404 and the light 406) but not the remote communication 407 with law enforcement (e.g., a silent alarm).

Figure 14:
FIG. 14 illustrates an example of various alarm types that may be used based on the certainty and severity of the event, according to some embodiments.

FIG. 14 illustrates an example table 600 of various alarm types that are used based on the certainty and severity of the event, according to some embodiments. The table 600 can correspond to block 516 in FIG. 13 where a security system 202 can determine the alarm type. In embodiments, the alarm type may be pre-assigned depending on the certainty and the severity of the event. For example, an occupant may desire that a gas leak is always associated with an audible alarm and a red light, despite a low certainty.

The alarm type can also be based on threshold values. For example, if the certainty of a fire is 20% but the severity is high, the security system 202 can create a score that is based on the severity and the certainty. The security system 202, based on the score, can determine the type of alarm. For example, a high severity event with a low certainty may (such as the fire) may be associated with a sound to invite an occupant to investigate further. A high severity event such as a gas leak but with a higher certainty may trigger a red flash along with the sound. A low severity event such as a baby crying can trigger a different set of alarm types such as playing comforting music.

Customized Sound Embodiments

Figure 15:
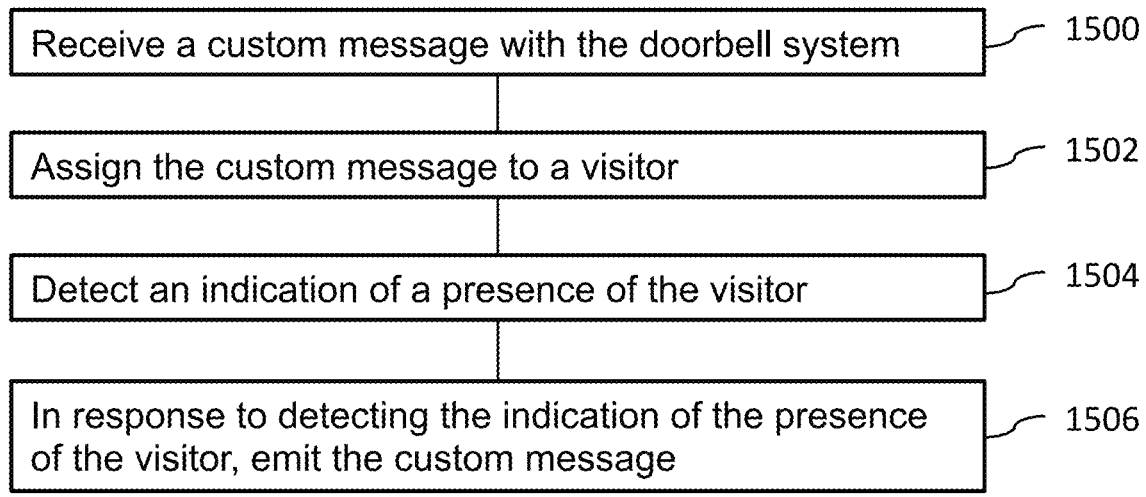
FIGS. 15, 16, 17, 18, 19, 20, 21, 22, 23, 24, 25, 26, 27 and 28 illustrate flow diagrams showing methods of operating a security system, according to various embodiments.

The security system 202, or doorbell 202, may be configured to receive a custom sound(s) from a user and thereby emit the custom sound in response to a particular situation (s). For example, as illustrated in FIG. 15, a doorbell system 200 may receive a custom message (at step 1500). A user of the system may then optionally assign the custom message to a select visitor (at step 1502). Thereby when an indication of a presence of the select visitor is detected by the doorbell 202 (at step 1504), the doorbell 202 may then respond by emitting the custom message with a speaker 404, 488 of the doorbell 202 (at step 1506). It should be appreciated that the term "detecting" may be defined as discovering or identifying the presence or existence of a visitor. As such, the term "detecting" may be used interchangeably with the term "determining."

Figure 16:
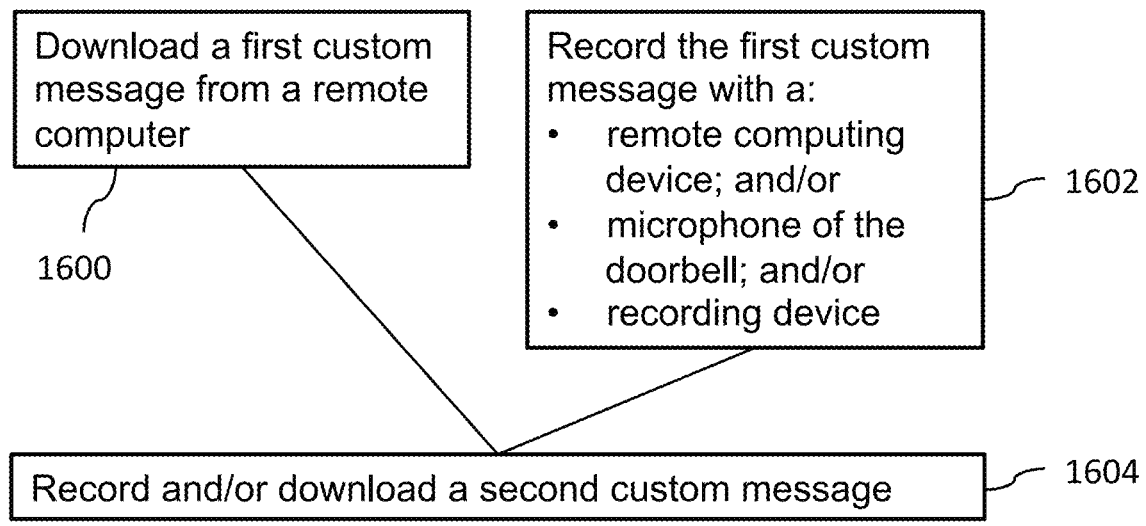

The custom sound, or custom message, may be received by the doorbell system 200 in a variety of ways. As shown in FIG. 16, the doorbell system 200 may download the custom message from a remote computer, such as a remote computing device (e.g. a smart phone) (at step 1600). As well, the doorbell system 200 may record the custom message (at step 1602). For example, a user of the doorbell system 200 may record the custom message on his or her remote computing device, such as a smart phone, (at step 1602) and then download the custom message from the smart phone onto the doorbell system 200. In some embodiments, the custom message may be directly recorded by the doorbell 202 (at step 1602), such as recorded by a microphone of the doorbell 202. Generally, it should be appreciated that the custom message may be recorded by any type of recording device that is communicatively coupled to the doorbell system 200 (at step 1602). In this manner, the doorbell system 200 may download the custom message from the recording device.

As further illustrated in FIG. 16, any number of custom messages may be recorded and/or downloaded by the doorbell system 200. For example, the doorbell system may record and/or download a second custom message (at step 1604), a third custom message, a fourth custom message, and any number of additional custom messages.

Figure 17:
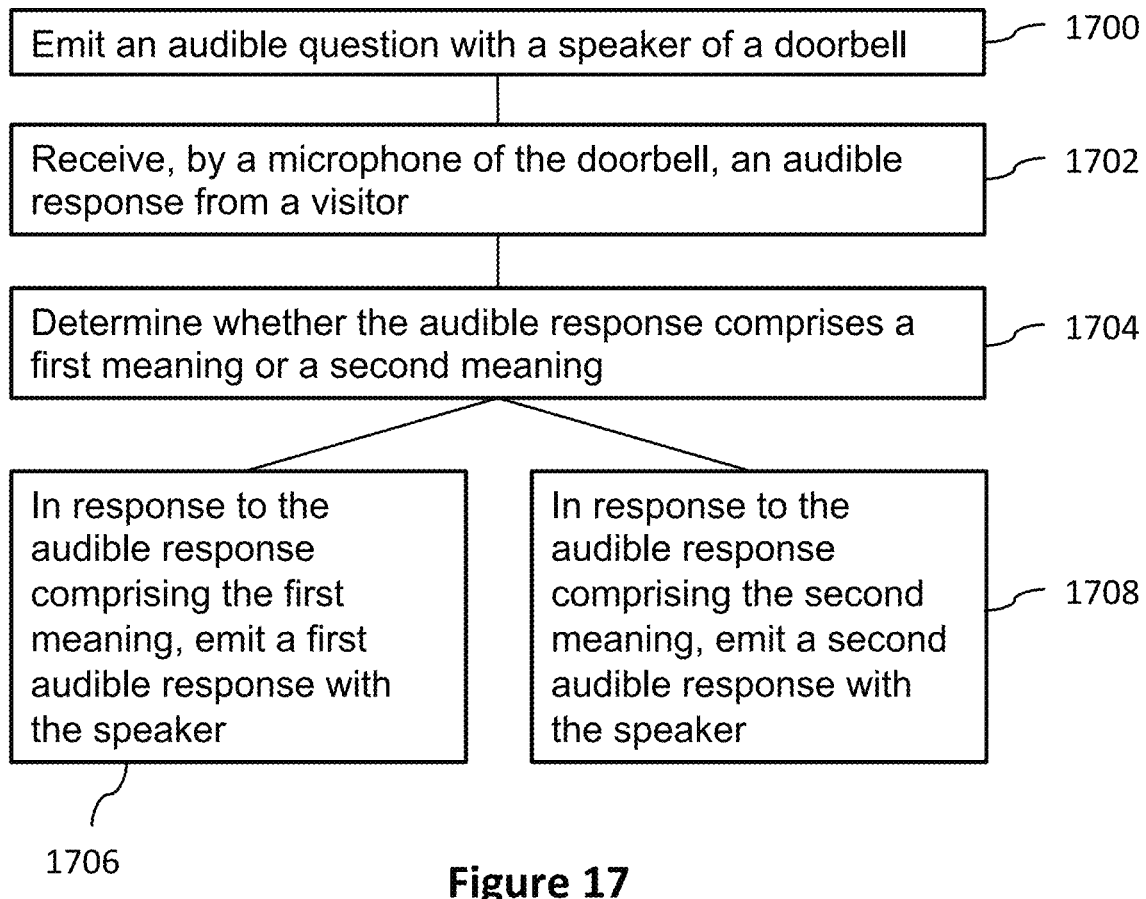
Figure 18:
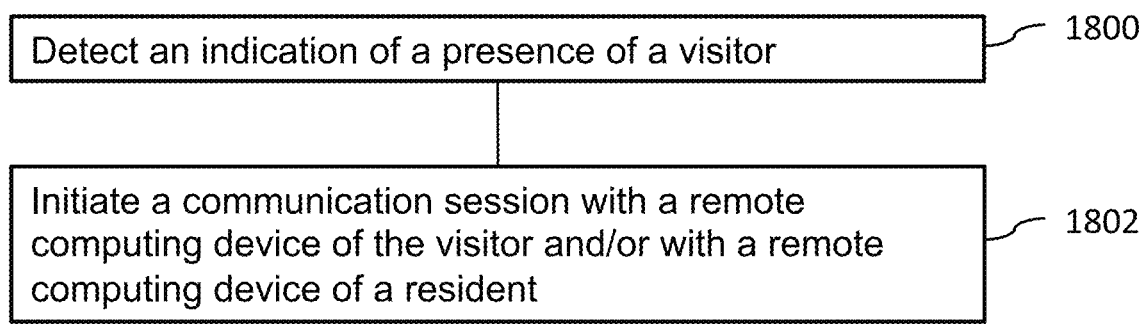

The doorbell system 200 may also be configured to interact with a visitor whereby the doorbell system 200 gives and receives audible information. In this manner, the doorbell system 200 may interpret information from the visitor. With reference to FIG. 17, the doorbell system 200 (e.g. a speaker 404, 488 of the doorbell 202) may be configured to emit an audible question(s) (at step 1700). The doorbell system 200 (e.g. via a microphone of the doorbell 202) may then receive an audible response from the visitor (at step 1702). The doorbell system 200 may thereby determine the meaning of the audible response given by the visitor. For example, the doorbell system 200 may determine whether the audible response comprises a first meaning or a second meaning (at step 1704). For example, if the doorbell system 200 determines that the audible response comprises the first meaning, the doorbell 202 may then emit a first audible response, via the speaker 404, 488, (at step 1706). As well, if the doorbell system 200 determines that the audible response comprises the second meaning, the doorbell 202 may then emit a second audible response, via the speaker 404, 488, (at step 1708). In this manner, the doorbell system 200 may be a smart system that is able to interpret and respond to different responses given by the visitor.

The doorbell system 200 may also be configured to initiate a communication session with a remote computing device 204, such as a remote computing device 204 associated with the visitor and/or a user of the doorbell system 200 (e.g. a resident of the building 300). For example, the doorbell system 200 may detect an indication of a presence of a visitor (at step 1800). The doorbell system 200 may then initiate a communication session with the remote computing device of the visitor and/or the resident (at step 1802). The communication session may comprise any type of communication and/or transmission to the remote computing device, such as a text message, phone call, voicemail, email, and the like. For example, the communication session may comprise a written message that substantially matches a content of the custom message as emitted by the speaker 404, 488. In this manner, hearing impaired visitors may be able to receive the message.

Furthermore, in some embodiments, the doorbell system 200 may be configured to determine an identity of a first visitor and/or a second visitor. Accordingly, the doorbell system 200 may intiate a communication session, such as transmit a text message, to a remote computing device 204 that includes at least one of the identity of the first visitor and/or the identity of the second visitor. Generally, it should be appreciated that the communication session may include any type of information relating to the visitor and/or the visitor's presence at the doorbell 200.

Figure 19:
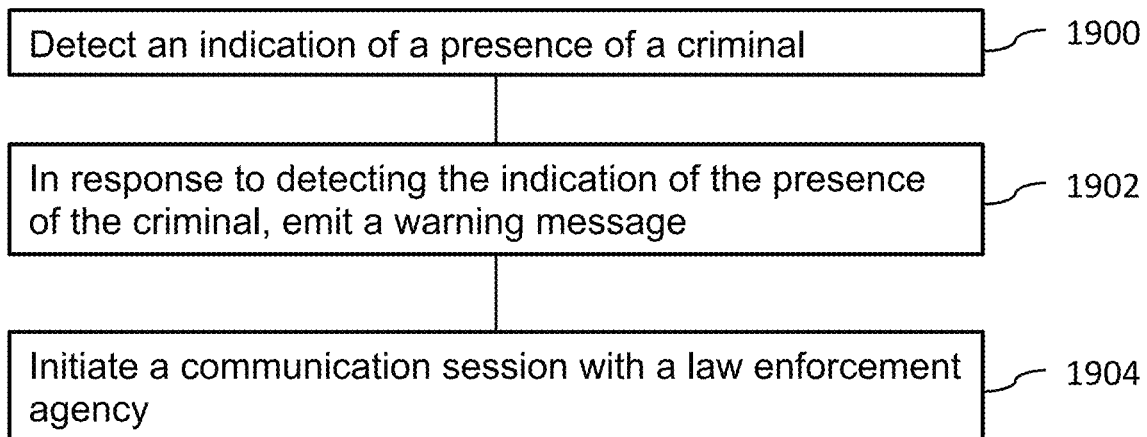

The doorbell system 200 may also be configured to detect various types of visitors. In some embodiments, as illustrated in FIG. 19, the doorbell system 200 may be referred to as a first doorbell system 200*a*, which may be configured to detect an indication of a presence of a criminal (at step 1900). The first doorbell system 200*a* may detect the indication of the presence of a visitor, such as a criminal, by receiving a notification from a second doorbell system 200*b* that is communicatively coupled to the first doorbell system 200*a* and remotely located with respect to the first doorbell system 200*a*. For example, the second doorbell system 200*b* may determine that a criminal is in the area and then alert all other doorbell systems 200 located within the vicinity, including the first doorbell system 200*a*.

With reference to FIG. 19, in response to the doorbell 202 and/or doorbell system 200 detecting the indication of the presence of the criminal, the doorbell 202 may emit a warning message with a speaker 404, 488 of the doorbell 202 (at step 1902). The doorbell system 200 may then initiate a communication session with a law enforcement agency to notify the agency of the presence of the criminal (at step 1904). It should be appreciated that the warning message may include a message to scare away the criminal and/or inform the criminal that the law enforcement agency has been contacted.

Figure 20:
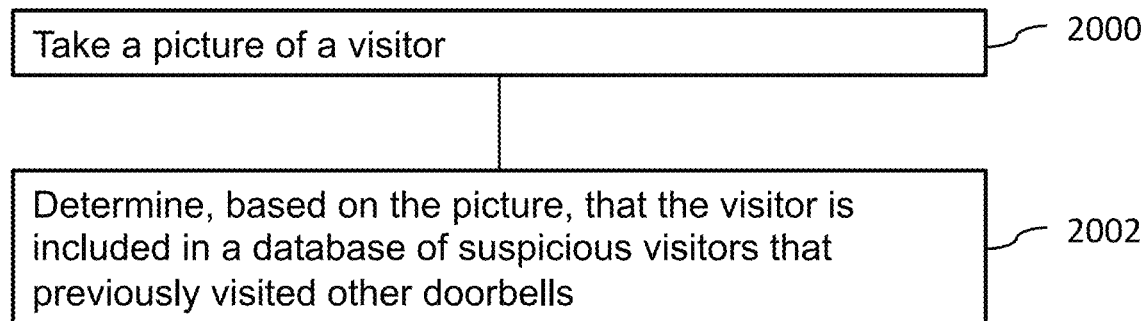

As shown in FIG. 20, the doorbell system 200 may also be configured to identify a visitor, such as a criminal or suspicious person, by taking a picture of the visitor (at step 2000). The doorbell system 200 may then determine, based on the picture, that the visitor is included in a database of suspicious visitors, such as a database of criminals, that previously visited other doorbells 202 (at step 2002). The doorbell system 200, and/or a remote computer, may use facial recognition software to match the facial data of the criminal with facial data from a law enforcement database. As well, the doorbell system 200 may detect the indication of the presence of the criminal by detecting body language of the criminal, such as detecting evasive or suspicious moves, detecting a fingerprint of the criminal, detecting a retina of the criminal, and the like.

Figure 21:
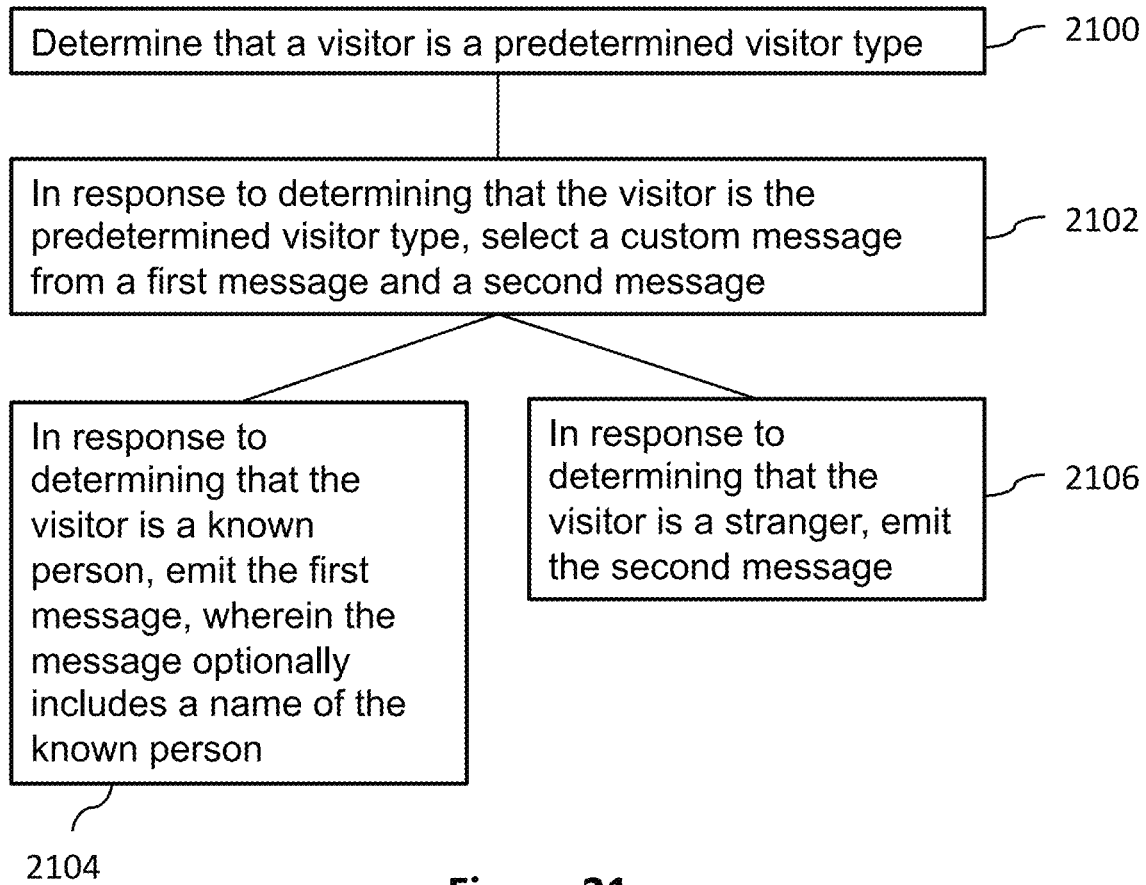

As well, the doorbell system 200 may be configured to determine various types of visitors. As shown in FIG. 21, for example, the doorbell system 200 may determine that a visitor is a predetermined visitor type (at step 2100). The predetermined visitor type may comprise any type of visitor, such as a known visitor (e.g. a friend, a family member, and/or anyone included on a smart phone contact list of a user), a known visitor, a suspicious visitor, a criminal, and the like. In response to determining that the visitor is the predetermined visitor type, the doorbell system 200, via the doorbell 202, can select a custom message from a first message and a second message (at step 2102). In response to determining that the visitor is a known person, the doorbell system 200 may emit the first message (at step 2104). In some embodiments, the first message optionally includes a name of the known person. For example, the doorbell system 200 may determine that a known person named Tim, who is a friend of the resident, is present. Accordingly, the doorbell 202 may audibly announce, "Welcome, Tim."

Likewise, in response to determining that the visitor is a stranger, the doorbell 202 may emit the second message (at step 2106). For example, if the doorbell system 200 determines that the stranger is a solicitor, the doorbell 202 may emit an audible message informing the solicitor that the resident does not purchase items from solicitors, an apology, and an invitation to exit the premise. Generally, it should be appreciated that the doorbell system 200 may be configured to determine any type of visitor and emit any type of custom message in response to the type of visitor.

Figure 22:
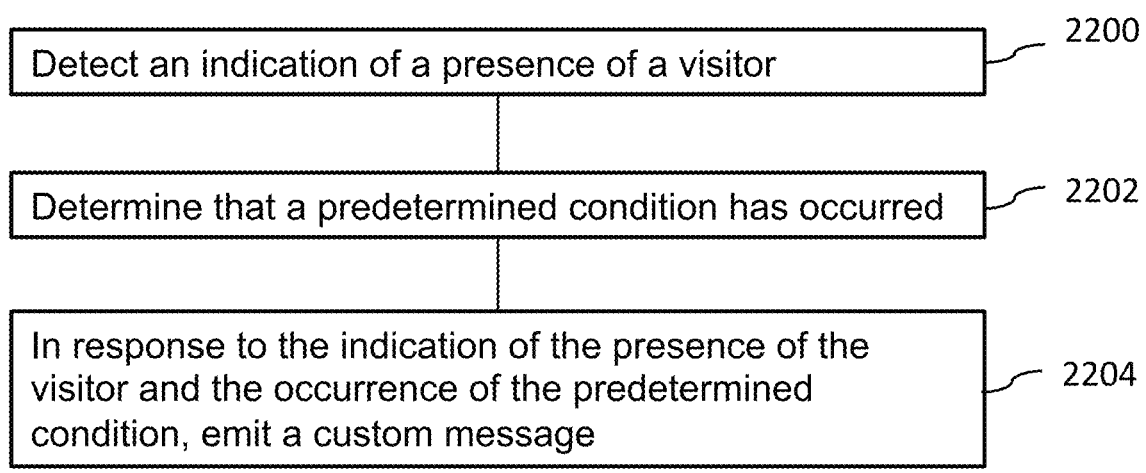

The doorbell system 200 may also be configured to emit custom messages in response to the occurrence of predetermined conditions. As illustrated in FIG. 22, the doorbell system 200 may detect an indication of a presence of a visitor (at step 2200). The doorbell system 200 may thereby determine that a predetermined condition has occurred (at step 2202). For example, the predetermined condition may be a time of day, a period of days, such as a time when the resident(s) is on vacation, an event (e.g. a birthday party, during a football game, etc.), and the like. Accordingly, in response to the indication of the presence of the visitor and the occurrence of the predetermined condition, the doorbell 202 may thereby emit a custom message (at step 2204). It should be appreciated that the custom message may correspond with the occurrence of the predetermined condition. For example, if the predetermined condition is the occurrence of a game in which the resident's favorite football team is competing, then the custom message may be the fight song for the football team.

Figure 23:
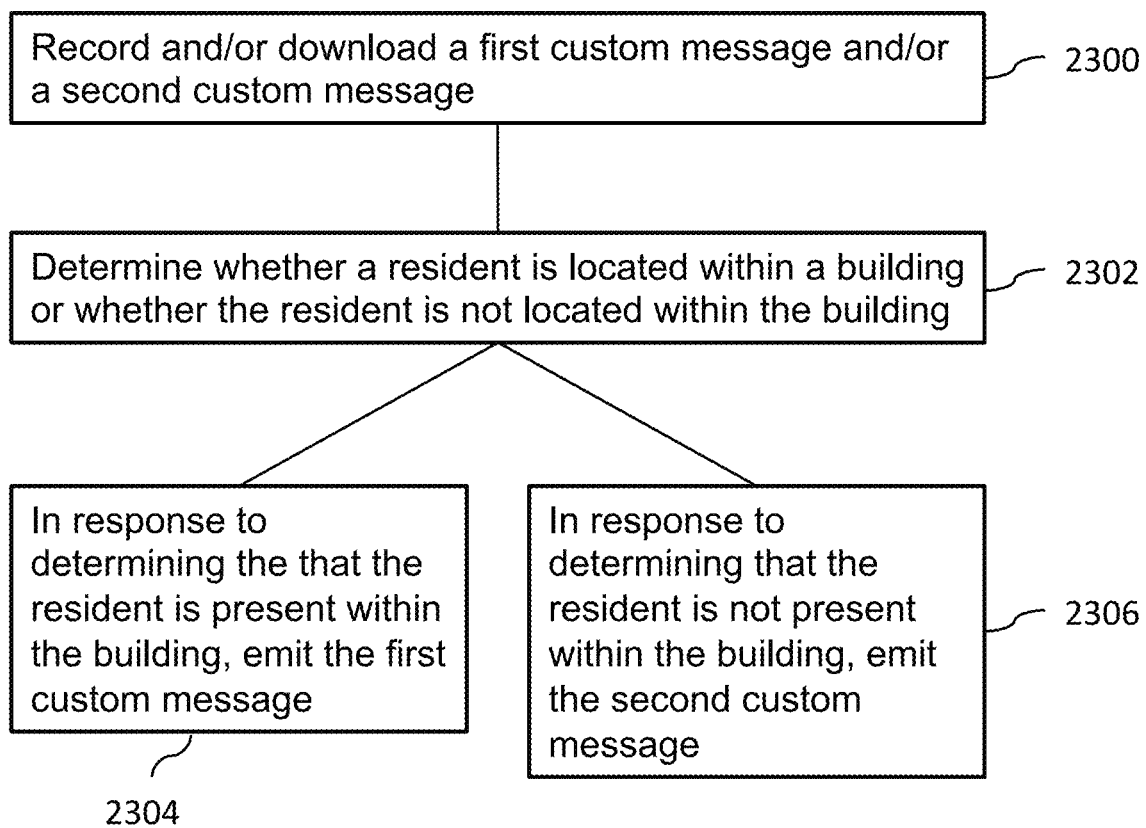

The predetermined condition may also be an occurrence when the resident(s) is away from the building 300 or when the resident(s) is located within the building 300. With specific reference to FIG. 23, the doorbell system 200 may be configured to record and/or download more than one custom message, such as a first custom message and/or a second custom message, and then emit the respective custom message in particular situations (at step 2300). Accordingly, the method may thereby include determining whether a resident is located within the building 300 or whether the resident is not located within the building 300 (at step 2302). In response to determining that the resident is present within the building 300, the doorbell 202 may thereby emit the first custom message (at step 2304). For example, the first custom message may be a message informing the visitor that the resident will be right there, such as, "Please wait a moment. Mr. Banks will be right there" (whereby Mr. Banks is the resident). In response to determining that the resident is not present within the building, the doorbell 202 may thereby emit the second custom message (at step 2306). The second custom message may include a message informing the visitor that the resident is busy (if the visitor is a suspicious person—to avoid a robbery) or away from the building 300 (if the visitor is a known person). For example, the second custom message may state, "I'm sorry. Mr. Banks is currently occupied. Please come back another time."

Figure 24:
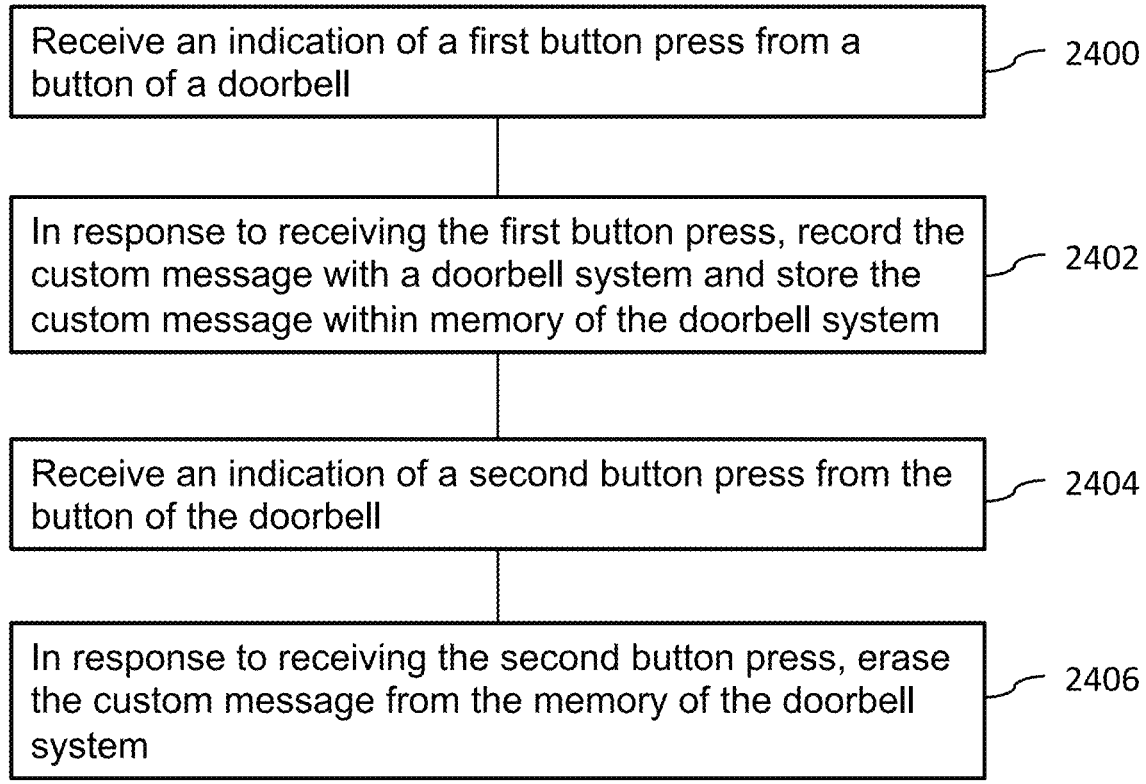

The doorbell system 200, via the doorbell 202, may be configured to receive the custom message in response to a variety of inputs as received by the doorbell system 200. For example, as shown by FIG. 24, the doorbell 202 may receive an indication of a first button press from a button 212 of the doorbell 202 (at step 2400). In response to receiving the first button press, the doorbell 202 may thereby record the custom message and store the custom message within a memory of the doorbell system 200 (at step 2402). As well, the doorbell system 200 may be configured to receive an input, such as receive an indication of a second button press from the doorbell 202 (at step 2404). In response to receiving the second button press, the doorbell system 200 can thereby erase the custom message from the memory of the doorbell system 200 (at step 2406).

It should be appreciated that any reference to first button press, second button press, and the like, can refer to any number of button presses or duration of respective button presses. For example, the first button press can comprise two button presses and the second button press can comprise one button press. As well, the first button press can comprise one button press and the second button press can comprise two button presses. In some embodiments, the first button press can comprise the button 212 being pressed for a first duration and the second button press can comprise the button 212 being pressed for a second duration. It should be appreciated that the first duration can be greater than, equal to, or less than the second duration.

However, it should be appreciated that the inputs may be any type of inputs into the doorbell system 200. For example, in conjunction or instead of a first and second button press, the doorbell system 200 may be configured to receive various motions from the user. In some embodiments, the camera 208 of the doorbell 202 may detect a first motion from the user, such as the user waving a hand once. In response to detecting the first motion, the doorbell 202 may thereby record the custom message and store the custom message within a memory of the doorbell system 200. As well, the camera 208 may detect a second motion from the user, such as the user waving a hand twice. In response to detecting the second motion, the doorbell 202 may thereby erase the custom message from the memory of the doorbell system 200. Generally, it should be appreciated that any type of input, such as a bodily motion, may be received by the doorbell system 200.

Figure 25:
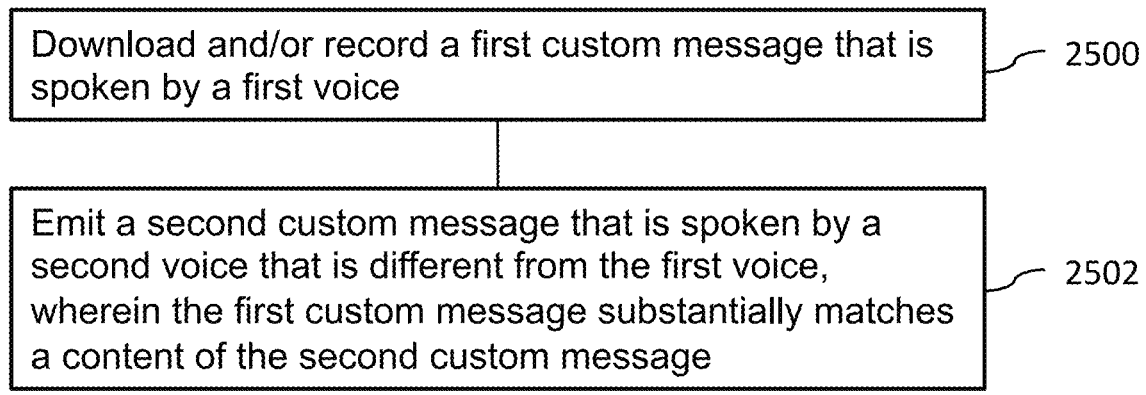

The doorbell system 200 may also be configured to provide security and anonymity to a user of the doorbell system 200. For example, as shown in FIG. 25, the doorbell system 200 may record and/or download a first custom message (at step 2500). The first custom message may be spoken by a first voice. The doorbell system 200 may be configured to effectively convert the first message into a second message, whereby the second message is spoken by a second voice that is different from the first voice. The content of the first custom message can substantially match the content of the second custom message. As such, the doorbell system 200 may emit the second custom message (at step 2502) that is spoken by the second voice. In this manner, the doorbell system 200 may effectively protect the identity of the user (e.g. resident) of the doorbell system 200.

Figure 26:
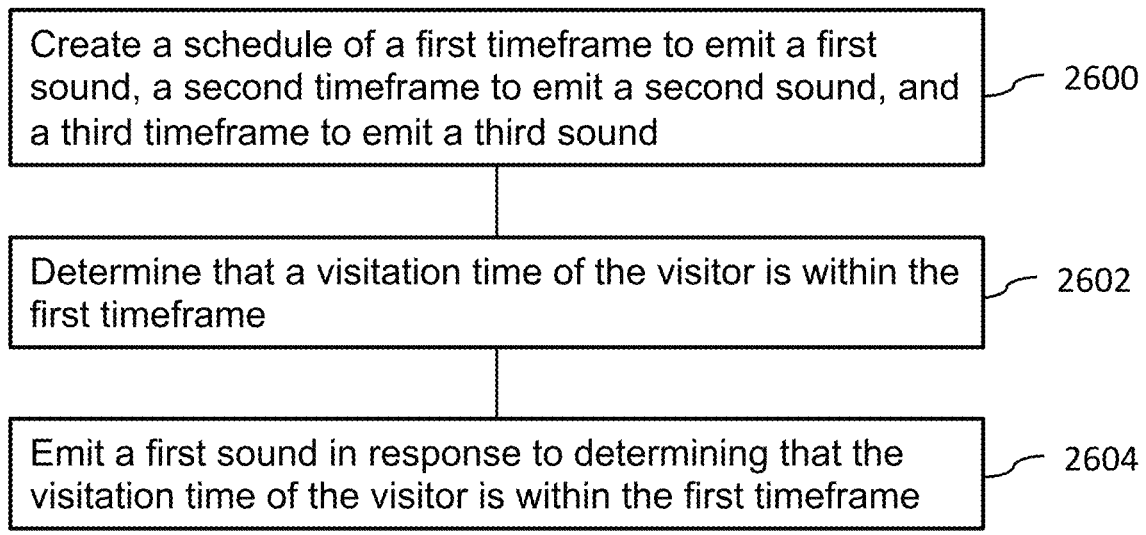

With respect to the various predetermined conditions, as shown in FIG. 26, the doorbell system 200 may create a schedule of a first timeframe to emit a first sound, a second timeframe to emit a second sound, and a third timeframe to emit a third sound (at step 2600). The doorbell system 200 may thereby determine that a visitation time of the visitor is within the first timeframe (at step 2602), and in response to determining that the visitation time of the visitor is within the first timeframe, the doorbell 202 may emit the first sound (at step 2604). Accordingly, if the doorbell system 200 determines that the visitation time of the visitor is within the second timeframe, the doorbell 202 may emit the second sound. Likewise, if the doorbell system 200 determines that the visitation time of the visitor is within the third timeframe, the doorbell 202 may emit the third sound. For example, the first timeframe might include overnight and morning hours when the resident is either sleeping or getting ready for work. The first sound may thereby inform a visitor that the resident is busy and that the visitor should come back another time. As well, the second timeframe might include daytime hours, when the resident is away at work. The second sound might include a message that the resident is not available and that the visitor can reach the resident at work or on the resident's smart phone, if the visitor is a known or trusted visitor. Finally, the third timeframe might include a time during evening hours when the resident is home from work. The third sound may thereby inform the visitor that the resident will answer the door shortly. Generally, it should be appreciated that the doorbell system 200 may be configured to accommodate any timeframe or number of timeframes. As well, the doorbell system 200 may be configured to receive and thereby emit any sound in response to any of the respective timeframes.

Figure 27:
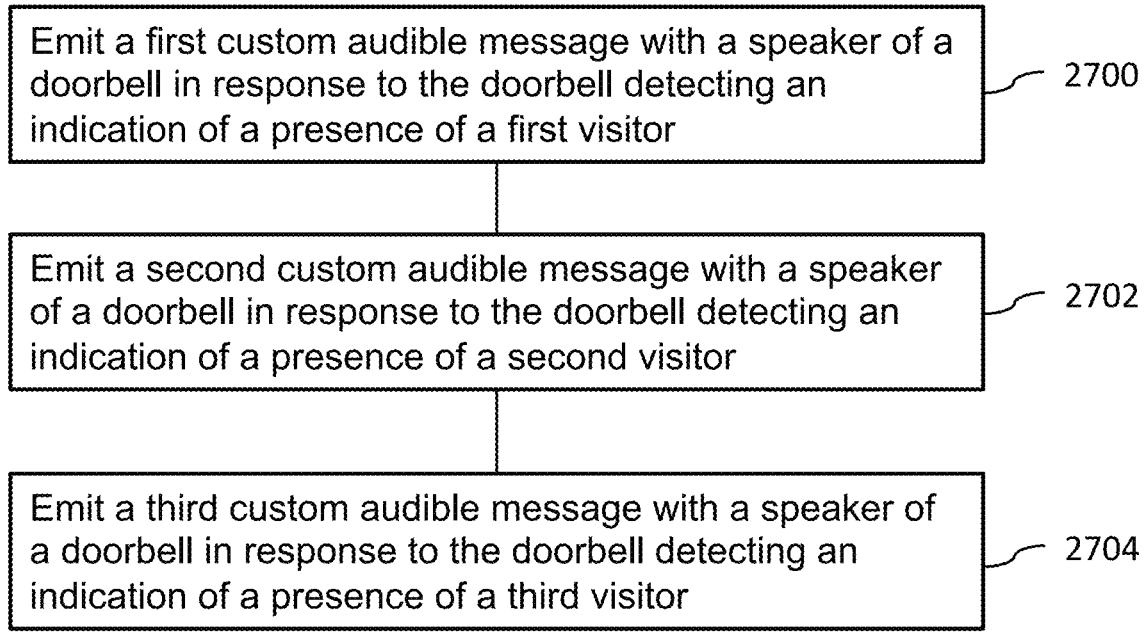

With reference to FIG. 27, the doorbell system 200 may be configured to receive any number of custom messages and then emit respective messages in response to the doorbell system 200 (e.g. the doorbell 202) detecting an indication of a presence of any number of respective visitors. The doorbell 202 may emit a first custom audible message with a speaker 404, 488 in response to the doorbell system 200 detecting an indication of a presence of a first visitor (at step 2700). As well, the doorbell 202 may emit a second custom audible message with the speaker 404, 488 in response to the doorbell system 200 detecting an indication of a presence of a second visitor (at step 2702). Likewise, the doorbell 202 may emit a third custom audible message with the speaker 404, 488 in response to the doorbell system 200 detecting an indication of a presence of a third visitor (at step 2704).

The first, second and third custom audible messages can be assigned to specific visitors or groups of visitors. For example, the first custom audible message may be assigned to a specific first visitor. As well, the first custom audible message may be assigned to a specific group or type of visitor, such as any known visitor.

Figure 28:
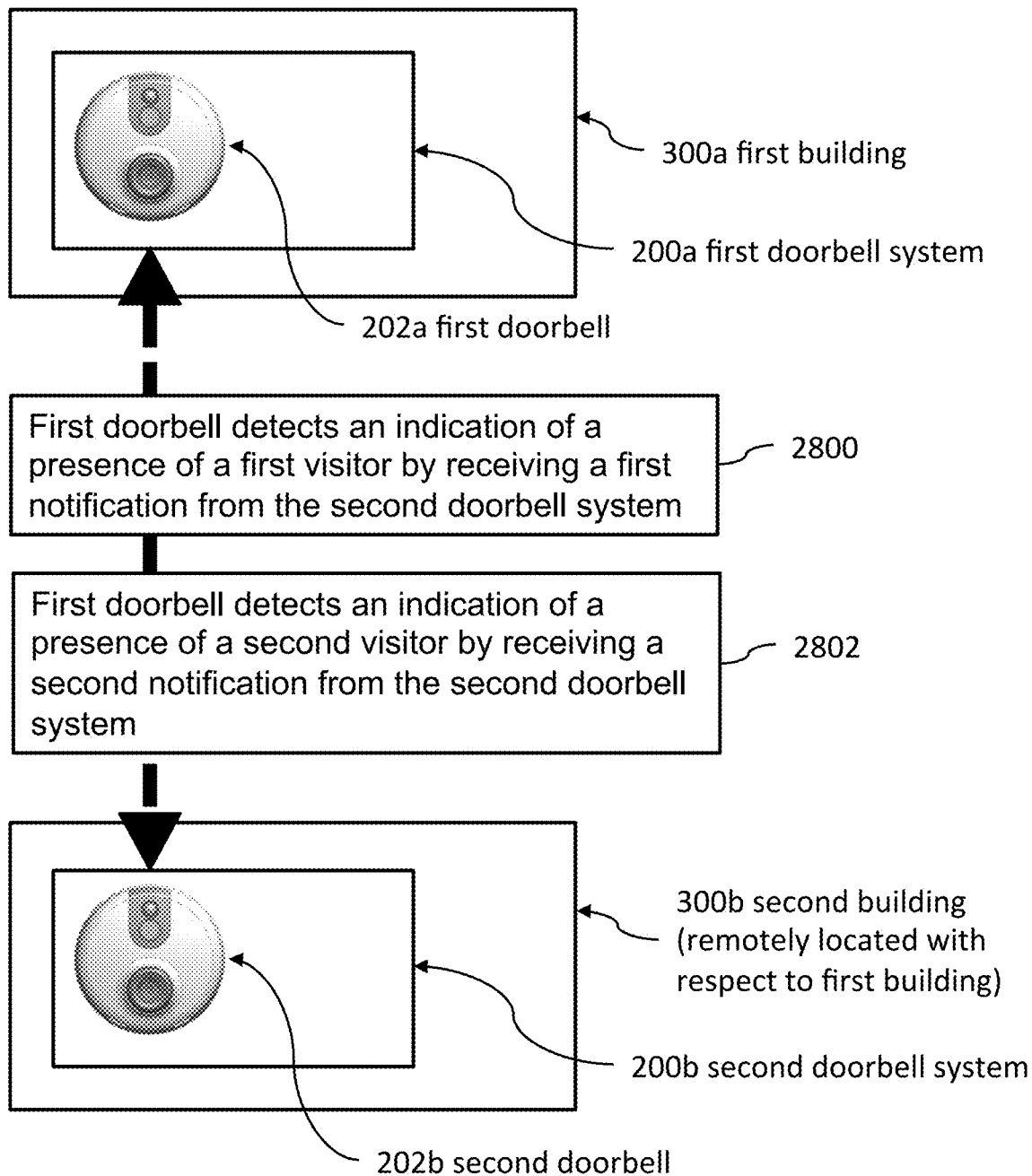

As shown in FIG. 28, the doorbell system 200 may be referred to as a first doorbell system 200a that is attached to a first building 300a. The first doorbell system 200a may be communicatively coupled to a second doorbell system 200b that is attached to an exterior of a second building 300b that is remotely located with respect to the first building 300a. Accordingly, the first doorbell 202a may also be communicatively coupled to the second doorbell 202b. Thereby, the first doorbell system 202a may detect an indication of a presence of a first visitor by receiving a first notification from the second doorbell system 202b (at step 2800). As well, the first doorbell system 202a may detect an indication of a presence of a second visitor by receiving a second notification from the second doorbell system 202b (at step 2802). In this manner, the first doorbell system 202a and the second doorbell system 202b may be networked. This may allow doorbell systems 200 that are located within a specific area, such as a neighborhood, to communicate and transmit data to each other. The network of doorbell systems may exchange information and/or data to thereby monitor the entire neighborhood.

Chime Embodiments

Chimes 302 (shown in FIGS. 3 and 31-37) can include all of the features, assemblies, parts, systems, and components of any doorbell 202 described herein or incorporated by reference. Chimes 302 can include all the items shown in FIG. 12.

Referring now to FIGS. 31-37, a user can use the remote computing device 204 to select a sound emitted by the chime 302 located inside the building or silence the chime 302 located inside the building. Several embodiments include many different sounds that the chime 302 can emit when someone "rings" the doorbell 202 or is detected by the doorbell 202.

Figure 31:
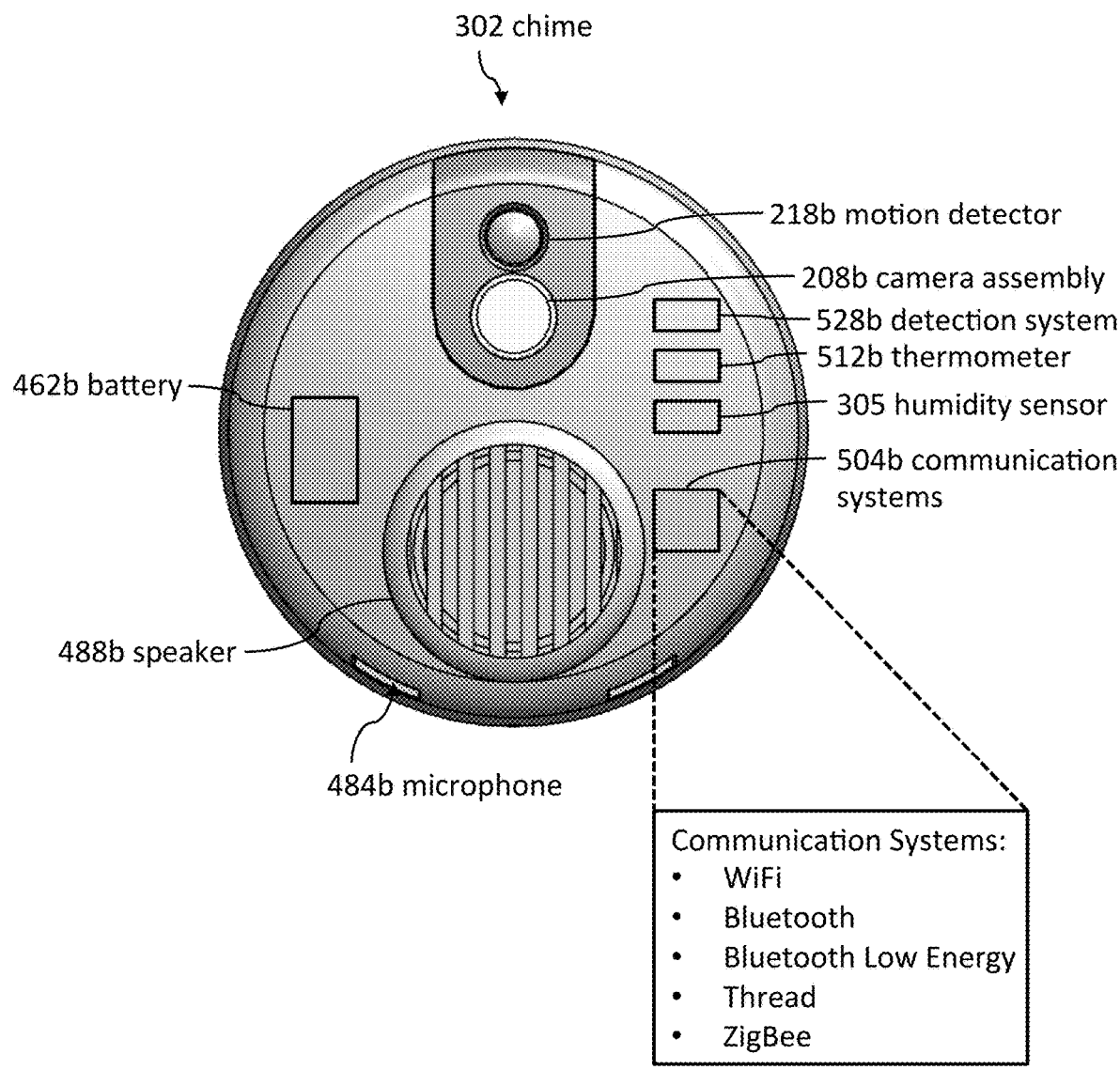
FIG. 31 illustrates a front view of a doorbell chime, according to some embodiments.

As illustrated in FIG. 31, the chime 302 may receive backup or primary power from a power source of a building 300 and/or a battery 462b located within the chime. As well, the chime 302 may include various components to detect different events within the vicinity of the chime 302. For example, embodiments may include a motion detector 218 configurable to detect motion along an inside portion of the building 300. The chime 302 may also include a camera assembly 208b configurable to capture an image along the inside portion of the building 300. As well, the chime 302 may include a speaker 488b configurable to emit sounds and a microphone 484b configurable to receive an audible message spoken by a user.

Even still, in embodiments, the chime 302 may include additional components including, but not limited to, a thermometer 512b configurable to determine temperature along the inside portion of the building 300 and a humidity sensor 305 configurable to determine humidity along the inside portion of the building 300. The chime 302 may include a detection system 528b that may include miscellaneous detection components to monitor and detect various other events. As well, the chime 302 may include a communication system 504b configurable to communicatively couple the chime to the doorbell 202, the remote computing device 204, and/or any other communication device. The communication system 504b may communicate via WiFi, Bluetooth, Bluetooth Low Energy, Thread, ZigBee, and the like. It should be appreciated that the chime 302 may utilize none, some, or all the same components as utilized by the doorbell 202.

A user can select a sound to be emitted by the chime 302 on her remote computing device 204 by using a control application 600. The remote computing device 204 can then send the sound to the chime 302 via the doorbell 202 (and/or via a server 206 and a wireless network 308). The sound can be a song, a greeting recorded by the user, or any other type of sound. Some embodiments include using a remote computing device 204 to download a sound from the Internet, sending the sound (or data associated with the sound) to the doorbell 202 (e.g., in response to using the remote computing device 204 to select the sound), sending the sound (or data associated with the sound) from the doorbell 202 to the chime 302, and/or emitting the sound from the chime 302.

Figure 32:
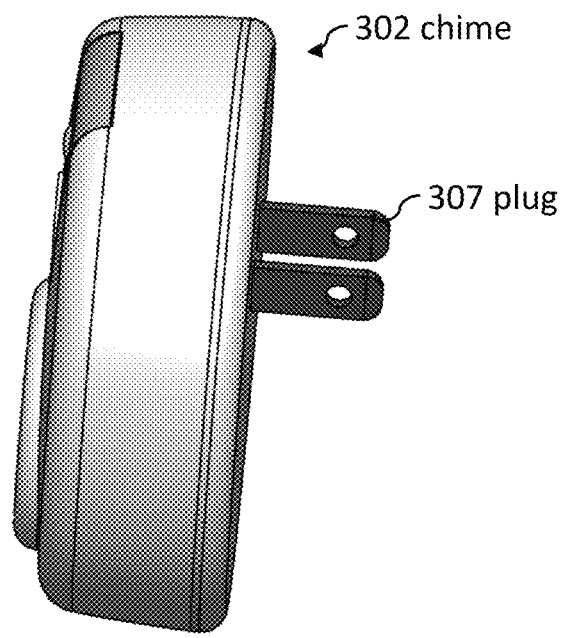
FIG. 32 illustrates a side perspective view of a doorbell chime, according to some embodiments.
Figure 33:
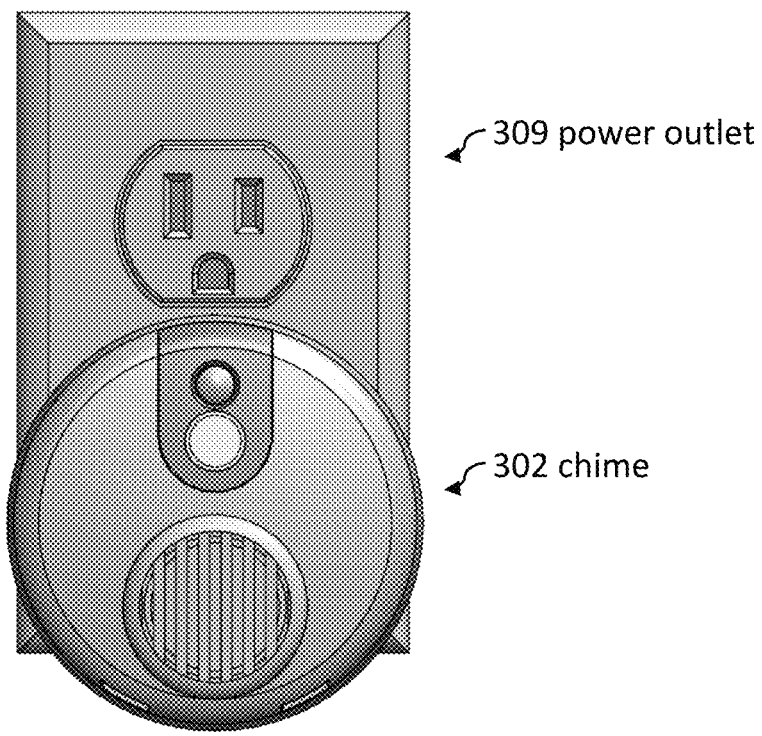
FIG. 33 illustrates a front view of a doorbell chime coupled to a power outlet, according to some embodiments.

As shown in FIGS. 32 and 33, the chime 302 can include an electrical plug 307. The plug 307 can be mechanically and electrically coupled to a power outlet 309 (as shown in FIG. 33).

Figure 34:
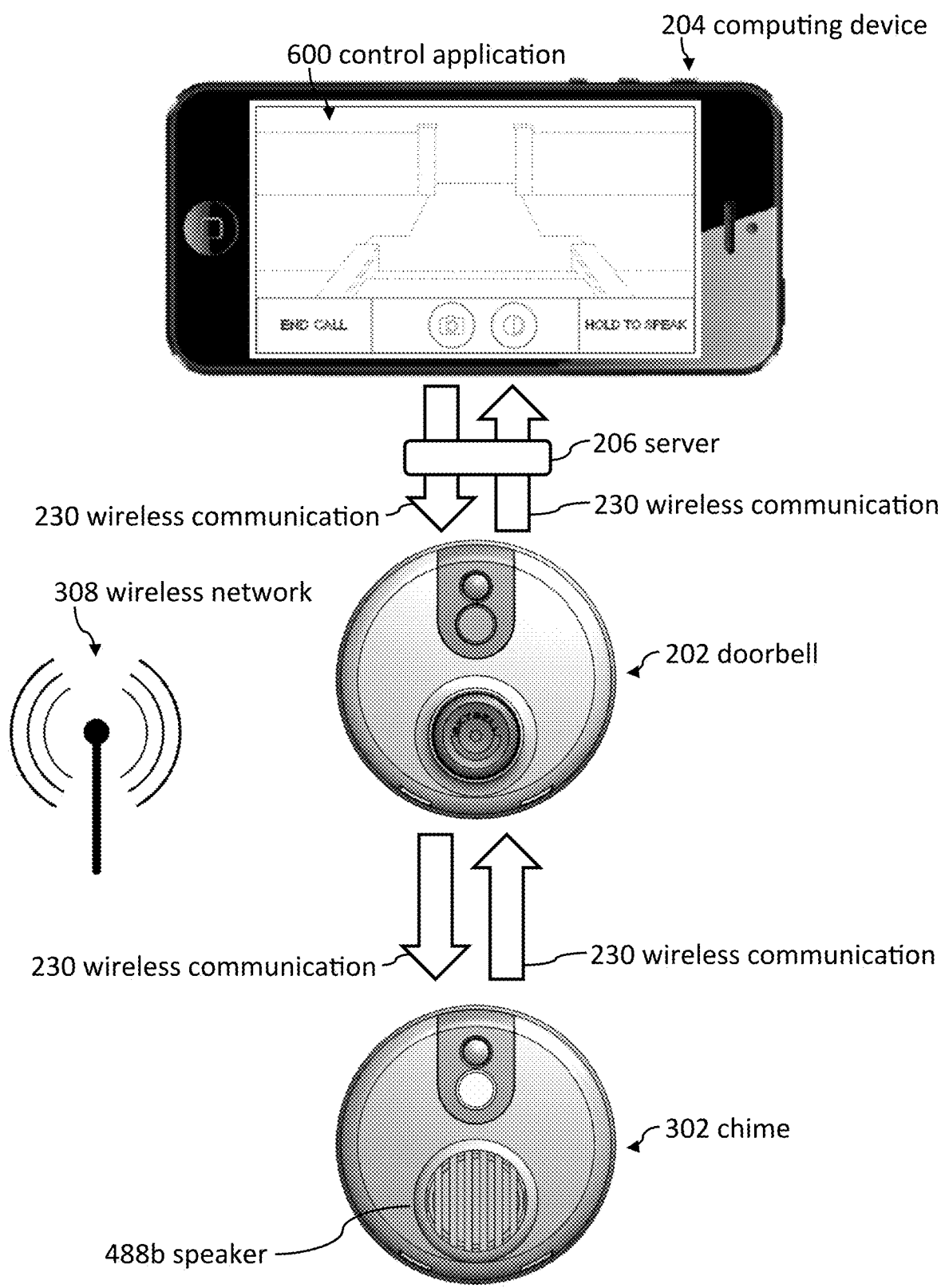
FIGS. 34, 35, and 36 illustrate diagrammatic views view of doorbell systems, according to some embodiments.

As illustrated in FIG. 34, the doorbell 202 can serve as a communication bridge between the remote computing device 204 and the chime 302. The doorbell 202 can be used to enable the remote computing device 204 to control the chime 302. A user can select an option (e.g., a song or a chime setting) on the remote computing device 204, then the system can send information regarding the option to and/or from the computing device 204. Then, the system can send information regarding the option from the doorbell 202 to the chime 302 in response to the user selecting the option via the remote computing device 204. The communication 230 between the computing device 204 and the doorbell 202 can be wireless. The communication 230 between the doorbell 202 and the chime 302 can be wireless.

Figure 36:
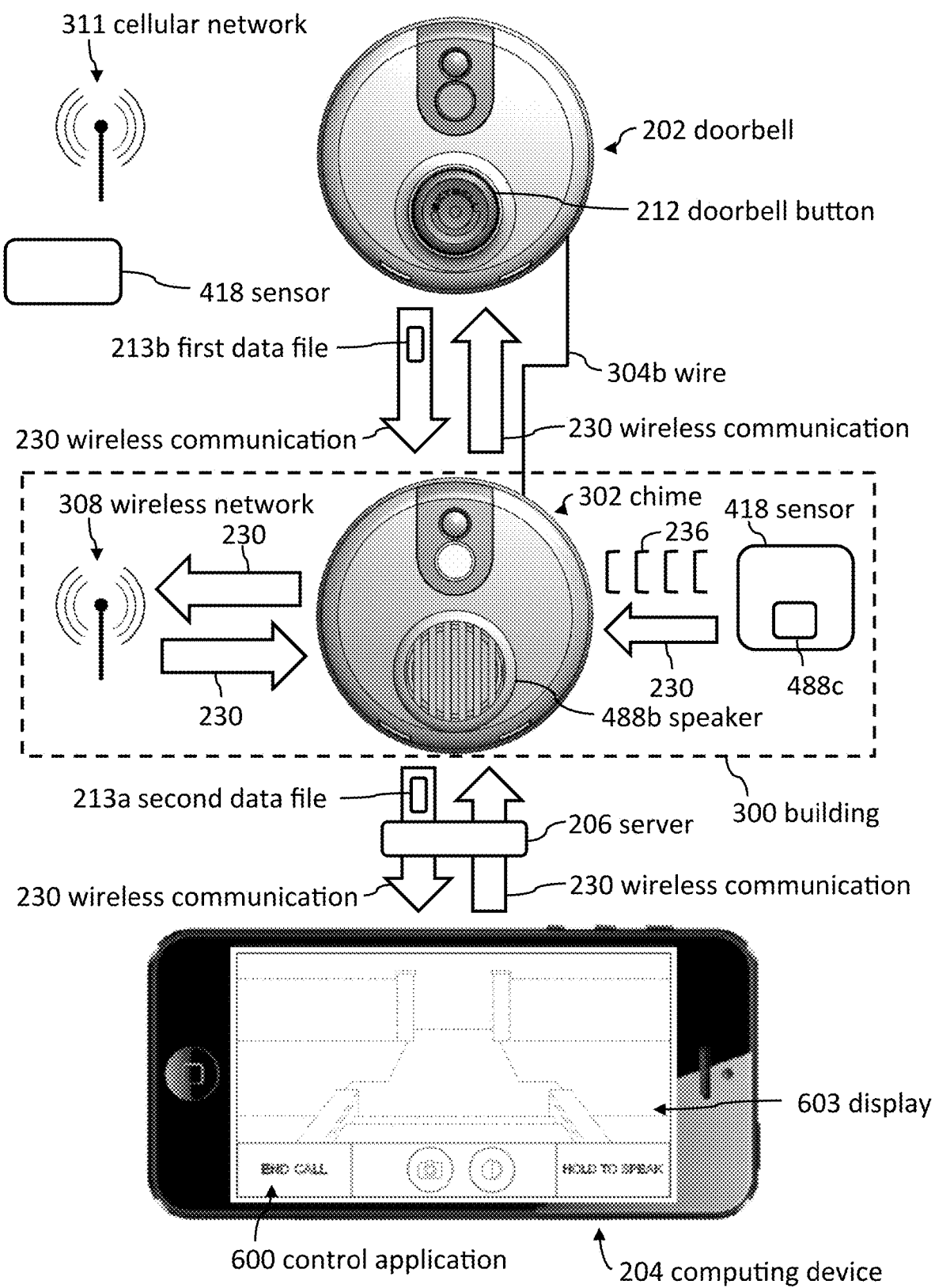
Figure 37:
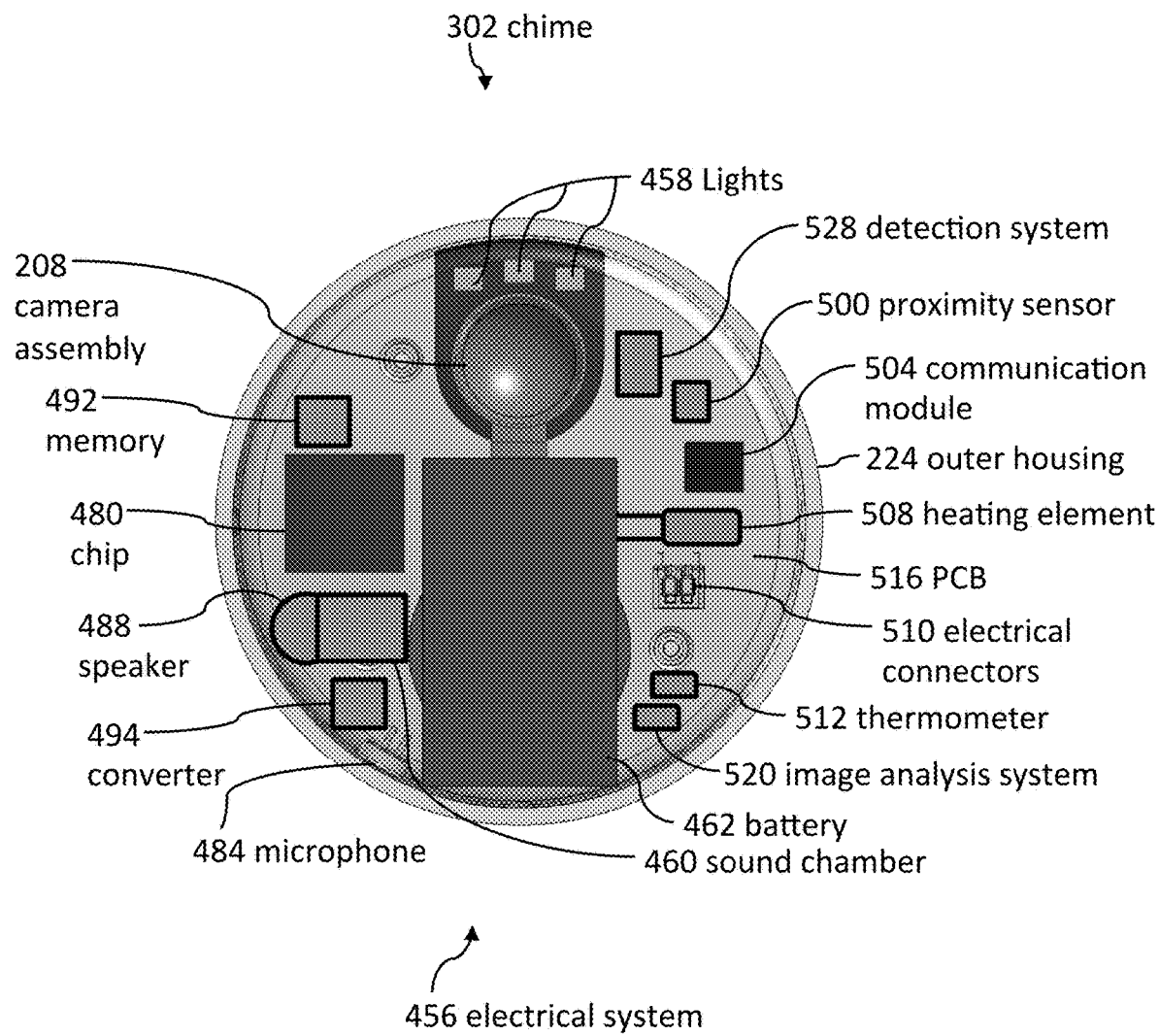
FIG. 37 illustrates a back view of a chime without a back cover to show various components of the chime's electrical system, according to some embodiments.

As illustrated in FIG. 36, the chime 302 can serve as a communication bridge between the remote computing device 204 and the doorbell 202. This can be especially helpful when the doorbell 202 cannot access the wireless network 308 of the building 300 to which the doorbell is mechanically and/or electrically coupled. The chime 302 can be located inside the building 300, and thus, is more likely to access the wireless network 308 of the building 300 (due to a superior signal strength of the wireless network 308 at the chime 302 compared to the signal strength at the doorbell 202, which can be located much farther from a router of the wireless network 308). Some embodiments include configuring the chime 302 to serve as a communication bridge between the remote computing device 204 and the doorbell 202 in response to a first wireless signal strength of the wireless network 308 at a first location of the chime 302 being greater than a second wireless signal strength of the wireless network 308 at a second location of the doorbell 202.

As well, FIG. 32 illustrates embodiments of the chime 302 that include at least one plug 307 that may be electrically and/or communicatively coupled to a power outlet 309. The one plug 307 can thereby electrically and/or communicatively couple the doorbell 202 to the wires of the power outlet 309.

The system 200 can be configured to communicate in various manners. In some embodiments, the remote computing device 204 communicates directly with the doorbell 202, while the doorbell 202 communicates directly with the chime 302. In some embodiments, the remote computing device 204 communicates directly with the chime 302, while the doorbell 202 communicates directly with the chime. Generally, it should be understood that the system 200 can be configured in any manner by the user.

Methods of Using a Chime

Figure 38:
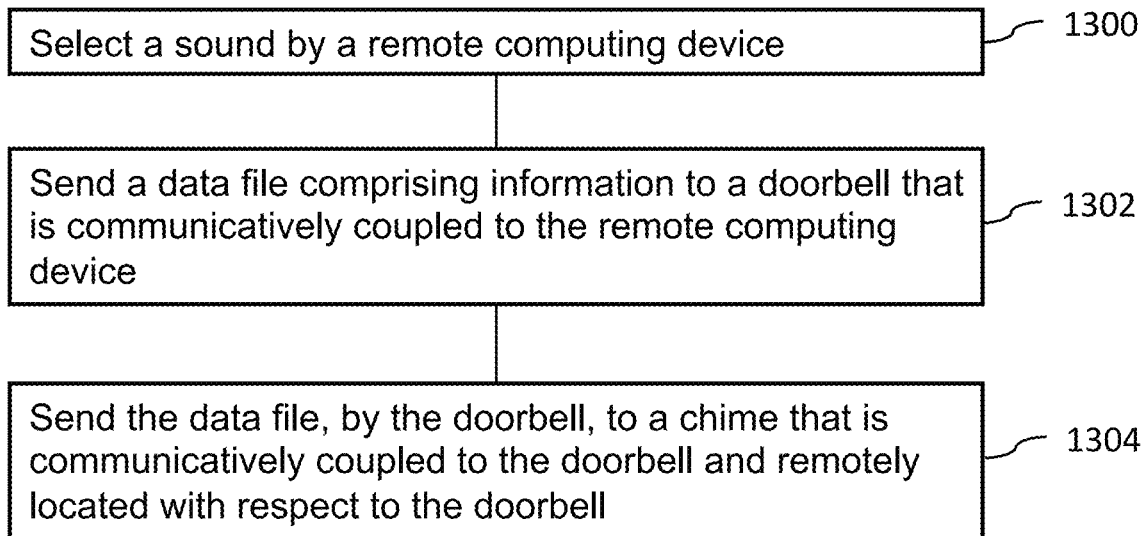
FIGS. 38, 39, 40, 41, 42, and 43 illustrate flowcharts of methods, according to some embodiments.

According to various embodiments, the doorbell system 200 can emit sounds from a chime 302. As illustrated in FIG. 38, the method can include selecting the sound by a remote computing device 204 (at step 1300). For example, the remote computing device 204 can allow a user to select the sound by toggling a radio button (not shown) as displayed on a screen of the remote computing device 204. In some examples, the user can select the sound by selecting a song or any type of audio file from a database, such as a music database (e.g. iTunes®), that is accessible through the remote computing device 204. In some embodiments, the remote computing device 204 can be a server 206, a communication device with a user interface (e.g. smart phone, tablet, etc.), and the like.

Figure 30:
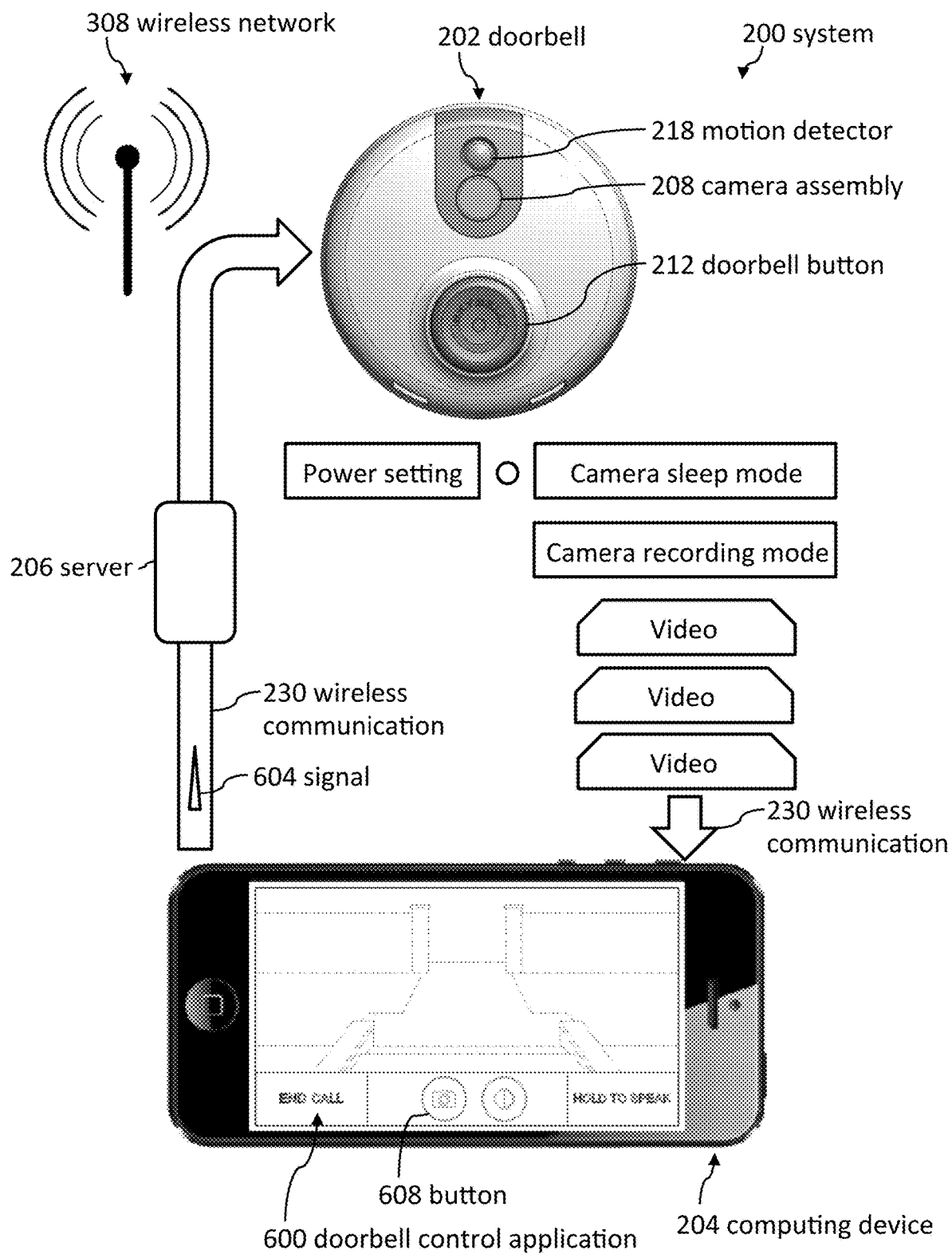
FIG. 30 illustrates a diagrammatic view of a doorbell and a doorbell control software application running on a computing device, according to some embodiments.

With continued reference to FIG. 38, methods can also include sending a data file, which can include a first data file 213 and/or a second data file 211, to a doorbell 202 that is communicatively coupled to the remote computing device 204 (at step 1302). The data file 211, 213 can include information that can represent the sound. The data file 211, 213 can be sent by the remote computing device 204 to the server 206 to the doorbell 202. However, in some embodiments the data file 211, 213 can be sent by the remote computing device 204 to the doorbell 202. As shown in FIG. 30, the remote computing device 204 can instruct the server 206, via a wireless communication 230 including a signal 604, to send the data file 211, 213 to the doorbell 202.

As well, methods can include the doorbell 202 sending the data file 211, 213 to the chime 302 that is communicatively coupled to the doorbell 202 and remotely located with respect to the doorbell 202 (at step 1304). In embodiments, the data file 211, 213 is transmitted wirelessly to the chime 302. As well, in embodiments, the data file 211, 213 is transmitted via a wire, such as wire 304b, as shown in FIG.

38. In this manner, the data file 211, 213 is transmitted via a sound file communication 209.

There are various ways that the chime 302 can receive the data file 211, 213. In some methods, the data file can be downloaded from a web server, by at least one of the doorbell and the chime. Even still, in some embodiments, the remote computing device 204 can download the data file from the web server.

Methods can also include emitting the sound from a speaker 488b of the chime 302 at least partially in response to the chime 302 receiving the data file 211, 213 and at least partially in response to the doorbell 202 detecting an indication of a presence of a visitor. In this manner, when a visitor visits the building 300, the doorbell system 200 can alert the user by playing any type of customized or prerecorded sound through the speaker 488b of the chime 302.

As well, users of the doorbell system 200 may configure the system 200 to emit the sound in accordance with certain parameters, such as sound emission parameters. Accordingly, methods may include receiving, by the doorbell 202, a sound emission parameter from the remote computing device 204. Methods may also include emitting the sound from a speaker 488b of the chime 302 in response to the doorbell system 202 determining that the sound emission parameter has been met. In some embodiments, the sound emission parameters may comprise predetermined timeframes. For example, the user may elect a sound emission parameter, such as a "do not disturb" parameter, so that the chime 302 does not emit the sound during predetermined hours of the day. As well, in embodiments, the sound emission parameters 302 may comprise specific visitors. For example, if an unknown visitor or unwelcome visitor (e.g. a door-to-door salesperson) visits the building 300, the sound emission parameters can instruct the chime 302 not to emit the sound when the doorbell system 200 detects the presence of the unknown or unwelcome visitor.

The chime 302 may also be configured to emit an audible message from a speaker 488b of the chime 302. The audible message may be a message that is spoken by a user and recorded by the doorbell 202, the remote computing device 204, and/or the chime 302 itself. In embodiments, a user of the system 200 may wish to transmit an audible message through the chime 302. For example, a first resident may speak an audible message such as, "Honey, I'll be home in 30 minutes," into his/her remote computing device 204. Accordingly, the system 200 may emit the audible message from the chime 302. Furthermore, in embodiments, the first resident my type a message into his/her remote computing device 204, and the system 200 may thereby announce an audible message that comprises the contents of the typed message.

The chime 302 may also be used to detect motion and capture audio and video recordings along an inside portion of a building 300. Specifically, the method may include the motion detector 218b of the chime 302 detecting a first motion within the inside portion of the building 300. Methods may also include initiating a first communication session with the remote computing device 204 in response to the motion detector 218b of the chime 302 detecting the first motion. The first communication session may include a first notification of the first motion detected by the motion detector of the chime. For example, the chime 302 may detect a prowler within the inside portion of the building 300 and the system 200 may thereby send an alert to the remote computing device 204 of the user.

In embodiments, the method may also include the motion detector 218b of the chime 302 detecting a second motion within an inside portion of the building 300. It should be appreciated that the second motion may be different from the first motion, or the same. The system 200 may thereby initiate a second communication session with a second remote computing device 204b in response to the motion detector 218b of the chime 302 detecting the second motion. The second communication session can comprise a second notification of the second motion detected by the chime 302. In this regard, the first remote computing device 204a may not receive the second communication session. Accordingly, the system 200 can be configured to alert different users based on different motions within the building 300. For example, the chime 302 may detect suspicious motions and thereby alert the police. In some examples, the chime 302 may detect non-suspicious motions within the building 300, such as the dog walking around, whereupon an alert is sent to the remote computing device 204 of the resident.

As well, methods may include selecting more than one sound and sending the more than one sound to the chime 302. For example, methods may include selecting a second sound by the remote computing device 204 and thereby sending a second data file comprising second information to the doorbell 202. The second information may represent the second sound. As well, methods may include sending the second data file to the chime 302.

In embodiments, the chime 302 may be configured to emit different sounds in response to different motions detected by the motion detector 218 of the doorbell along an outside portion of the building 300. For example, methods may include detecting a first motion, by a motion detector 218 of the doorbell 202, along the outside portion of the building 300. In response to the doorbell 202 detecting the first motion, the chime may thereby emit the first sound from a speaker 488b of the chime 302. As well, the motion detector 218 of the doorbell 202 may detect a second motion along the outside portion of the building 300. It should be appreciated that the second motion may be different from the first motion, or the same. Accordingly, methods may include emitting the second sound from the speaker 488 of the chime 302 in response to the doorbell 202 detecting the second motion. In this manner, the chime 302 may be configured to audibly alert people within the building 300 as to whether various motions have been detected by the doorbell 202. In embodiments, the chime 302 may emit an audible alarm if the doorbell 202 detects a suspicious motion. In embodiments, the chime 302 may emit a more friendly sound (e.g. "ding-dong") if the doorbell 202 detects a non-suspicious motion.

Figure 39:
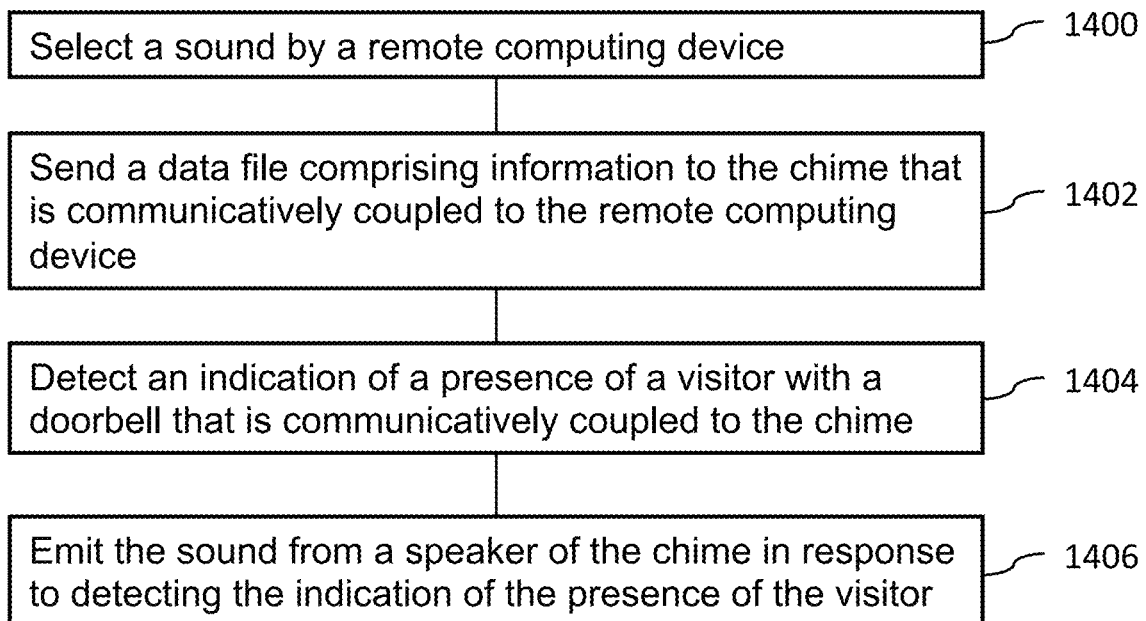

As illustrated in FIG. 39, this disclosure also includes a method of using a doorbell system 200 to emit a sound from a chime 302. The method may include selecting a sound by a remote computing device 204 (at step 1400) and sending a data file 211, 213 comprising information to the chime 302 (at step 1402). It should be appreciated that the information may represent the sound. As well, the data file 211, 213 may be sent to the chime 302 by the remote computing device 204 and/or the server 206. Furthermore, methods may include detecting an indication of a presence of a visitor with a doorbell 202 (at step 1404) and emitting the sound from a speaker 488b of the chime 302 in response to detecting the indication of the presence of the visitor (at step 1406).

Figure 35:
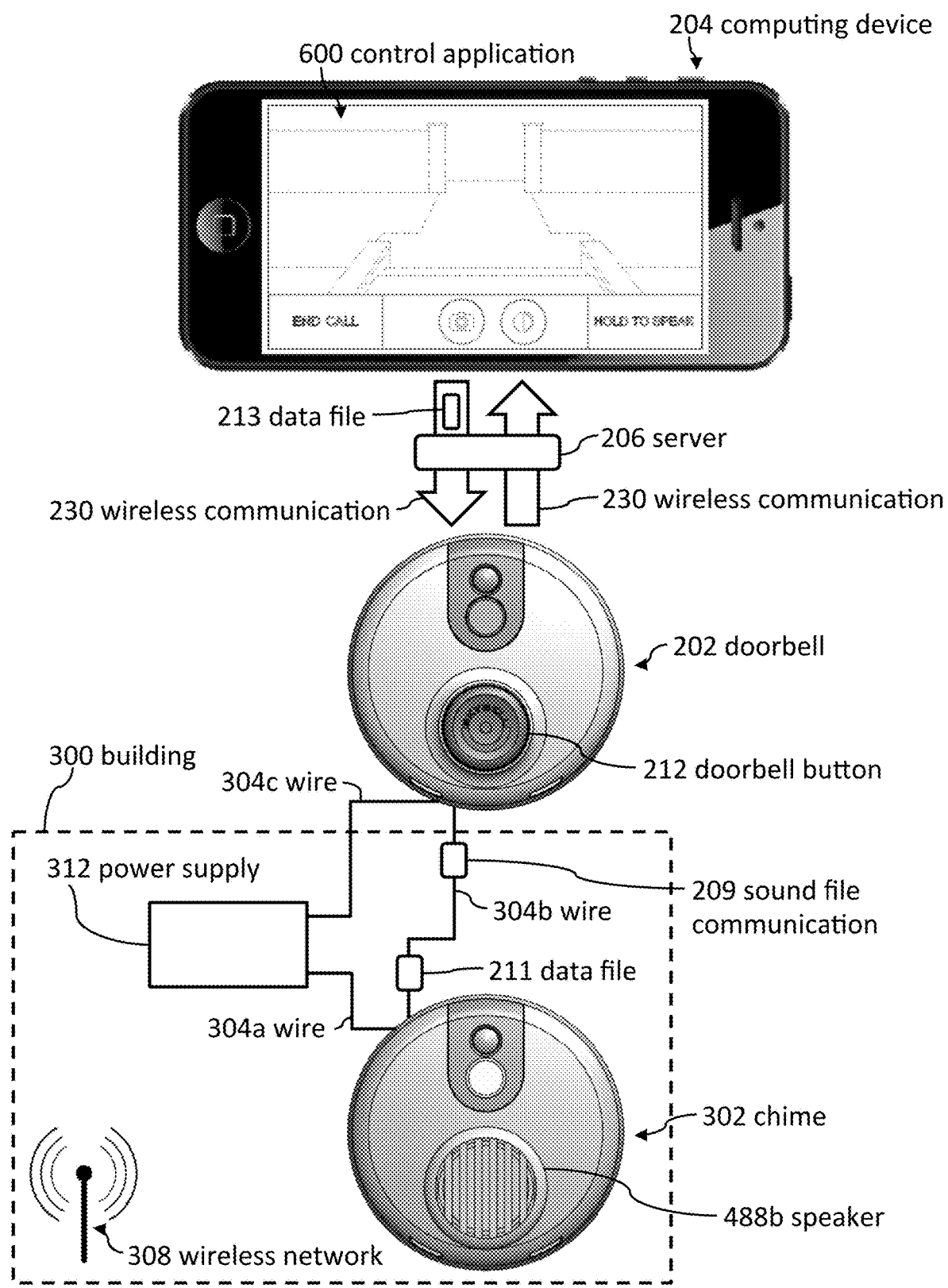

In addition to detecting motion, the chime 302 and/or the doorbell 202 may also capture audio, images and/or video. For example, as shown in FIGS. 35 and 36, in response to detecting a motion with the motion detector 218b of the chime 302, methods may include using the camera 208b of the chime 302 to capture an image and/or video within the inside portion of the building 300. It should be appreciated that the image and/or video may correspond to the motion detected by the chime 302. The image and/or video may thereby be sent to the doorbell 202 and/or the remote computing device 204 where the image and/or video can be viewed via a control application 600 viewed on a display 603 of the computing device 204.

As well, the method may use a microphone 484b of the chime to detect and record audio within the inside portion of the building 300. The audio recording may thereby be transmitted to the doorbell 202 and/or the remote computing device 204, where it can be played back.

As well, the system 200 may be configured to respond in other various ways in response to detecting a motion. For instance, in embodiments, in response to detecting a motion with the motion detector 218b of the chime 302, the doorbell 202 may flash a light 216, 220 to thereby indicate to people passing by the building 300 that there is an event underway at the building 300. This may serve useful to personnel (e.g. law enforcement) to thereby determine the exact location of the building 300.

The chime 302 may be configured to emit any various type of sound in response to any of the previously mentioned components detecting various events. In embodiments, the chime 302 may emit a first sound in response to the doorbell detecting an indication of a presence of a visitor. As well, the chime 302 may emit a second sound in response to the motion detector 218b detecting motion along the inside portion of the building 300. Furthermore, if thermometer 512b detects that the temperature has exceeded a predetermined threshold, the chime 302 may emit a third sound, such as an announcement of the temperature as detected by the thermometer 528b. Even still, the chime 302 may be configured to emit a fourth sound in response to the humidity sensor 305 detecting that a predetermined humidity has been met.

Figure 40:
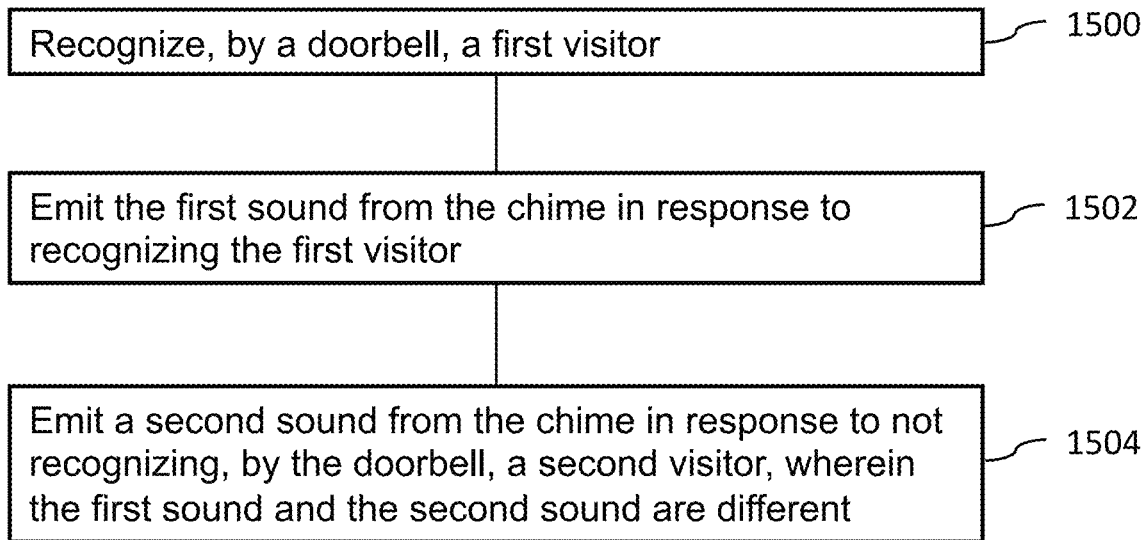

As illustrated in FIG. 40, the disclosure also includes methods of identifying visitors and emitting different sounds according to the visitor detected. For example, methods may include recognizing, by a doorbell 202, a first visitor (at step 1500). The method may include emitting the first sound from the chime 302 in response to recognizing the first visitor (at step 1502). As well, the method may include emitting a second sound from the chime in response to not recognizing, by the doorbell 202, a second visitor (at step 1506). It should be appreciated that the first sound and the second sounds can be different, or the same.

In order to detect the visitor, methods may include recognizing the first visitor and/or the second visitor by detecting various traits, such as a physical trait of the respective visitor. Physical traits can include traits such as a fingerprint, gait, body type, height, silhouette traits, silhouette volume, silhouette dimensions, other physical characteristics, and the like. As well, the system 200 may be configured to recognize the first visitor and/or the second visitor by the doorbell 202 detecting a trait of an electronic device in the possession of the first visitor and/or the second visitor. For example, the system 200 may be configured to detect a first remote computing device 204d associated with the first visitor and/or a second remote computing device 204e associated with the second visitor. In response to detecting a visitor by physical traits and/or electronic traits, the chime 302 may emit a sound associated with the particular visitor.

The following patent applications, which are incorporated by reference herein, describe additional embodiments of recognizing visitors: U.S. Provisional Patent Application No. 62/135,133; filed Mar. 18, 2015; and entitled DOORBELL COMMUNICATION SYSTEMS AND METHODS; U.S. Provisional Patent Application No. 62/016,050; filed Jun. 23, 2014; and entitled IDENTITY VERIFICATION USING A SOCIAL NETWORK; U.S. Provisional Patent Application No. 62/016,053; filed Jun. 23, 2014; and entitled IDENTITY VERIFICATION USING A SOCIAL NETWORK AND A NAME OF A VISITOR; and U.S. Provisional Patent Application No. 62/016,057; filed Jun. 23, 2014; and entitled IDENTITY VERIFICATION OF FREQUENT AND NON-FREQUENT VISITORS.

Wired Communication Embodiments

In addition to the doorbell system 200 being configured to be electrically and communicatively coupled via any wireless communication standard, the doorbell system 200 may also be electrically and communicatively coupled via any type of wired communication standard (e.g. wires). In embodiments, the wires may be the copper wires of the building 300.

As shown in FIG. 36, the doorbell system 200 may be coupled to a doorbell power supply 312 of a building 300. Accordingly, the doorbell system 200 may include a first wire 304c that may electrically couple the doorbell 202 to the power supply 312 of the building 300. As well, the doorbell system 200 may include a second wire 304b that may electrically and/or communicatively couple the chime 302 to the doorbell 202. As well, the doorbell system 200 may include a third wire 304a that may electrically couple the chime 302 to the power supply 312 to form a circuit comprising the first wire 304c, the doorbell 202, the second wire 304b, the chime 302, the third wire 304a, and the power supply 312.

Because the doorbell 202 may be communicatively coupled to the chime 302 via the second wire 304b, the chime 302 may be configured to receive a first data file from the doorbell 202 via the second wire 304b. As well, the doorbell system 200 may include a sound file communication 209 that may be sent from the doorbell 202 to the chime 302 via the second wire 304b. In some embodiments, the sound file communication 209 may comprise at least one thousand bytes. As well, in embodiments, the sound file communication 209 may comprise less than one thousand bytes. It should also be appreciated that the second wire 304b may enable two-way communication from the doorbell 202 to the chime 302 and/or from the chime 302 to the doorbell 202.

In embodiments, the first data file may comprise commands to perform various operations or put the doorbell system 200 into various settings. For example, the first data file may comprise a command configured to place the chime 302 into silent mode, such that the chime 302 does not emit a sound. Likewise, the first data file may comprise a command configured to adjust a volume setting of the chime 302. Even still, the first data file may comprise a command configured to adjust a duration of a notification sound emitted by the chime 302. Generally, it should be appreciated that the first data file may command the chime 302 to perform any such operation.

Even still, the data file may comprise data gathered by the doorbell system 200, such as a video recorded by the doorbell 202. Accordingly, the data file may include information regarding an event that occurred outside the chime 302, such as the presence of a prowler or an image of an object associated with a motion detected by the system 200. In this regard, the data file may comprise identifying information regarding the person and/or object detected by the chime 302. For example, the doorbell 202 and/or chime 302 may detect a person located outside or inside the building

300. The chime may then receive the data file that comprises the identity of the person as detected by the doorbell 202 and/or chime 302. As well, the doorbell 202 may wirelessly receive the first data file from the remote computing device 204. In this manner, the doorbell 202 may receive various files, such as audio, and an image and/or video as recorded by the chime via the first wire. It should also be appreciated that the chime 302 may receive the various files from the doorbell 202 and/or the remote computing device 204.

Figure 41:
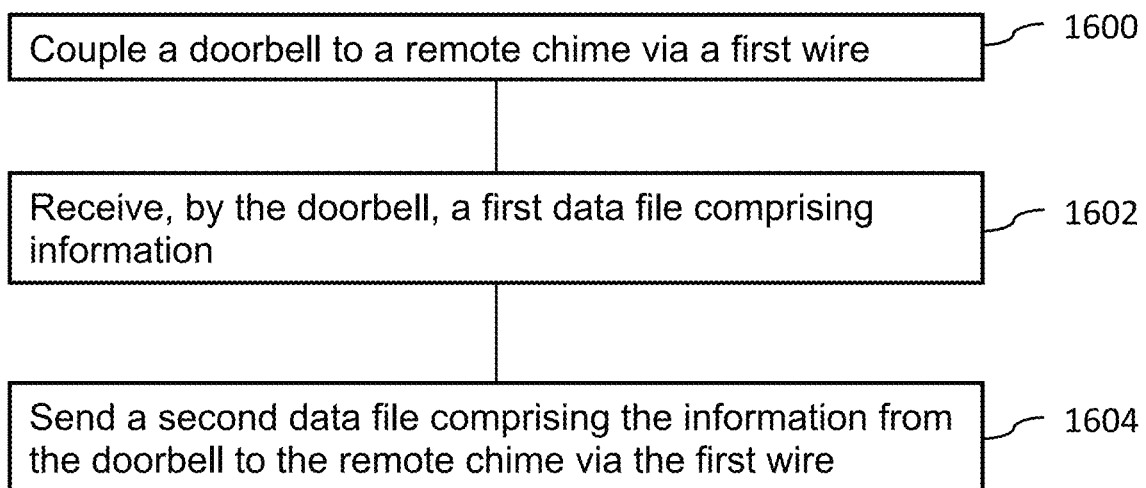

As illustrated in FIG. 41, the disclosure also includes a method of electrically coupling a doorbell system 200 to a doorbell power supply 312 of a building 300. The method may include coupling a doorbell 202 to a remote chime 302 via a first wire 304c (at step 1600). As well, the method may include receiving, by the doorbell 202, a first data file comprising information (at step 1602). As further shown in FIG. 41, the method may include sending a second data file comprising the information from the doorbell to the remote chime via the first wire (at step 1604).

The information may represent a sound that was unknown to the chime 302 prior to receiving the second data file. In this regard, the method may include emitting the sound from the chime 302 at least partially in response to receiving the second data file. In this regard, the method may include the chime using the second data file to emit a sound. In some embodiments, the second data file may comprise at least one thousand bytes. As well, in embodiments, the second data file may comprise less than one thousand bytes.

As well, the method may include emitting the sound from the chime 302 at least partially in response to the chime 302 receiving a sound emission parameter from the doorbell 202 and/or the remote computing device 204. For example, the chime 302 may receive a sound emission parameter to only emit the sound between the hours of 9 am and 9 pm. Accordingly, if the system 200 detects a presence of a visitor between 9 am and 9 pm, and in response to the chime 302 having received the data file, the chime 302 may emit a sound in response to the doorbell system 200 having determined that the sound emission parameter has been met.

Chime-Hub Communication Embodiments

In embodiments, the chime 302 can serve as the communication hub that links the doorbell 202 to the remote computing device 204, and vice versa. The chime 302 can be configured as the communication hub for a variety of reasons. For example, in certain situations, the doorbell system can be configured to detect whether the doorbell 202 comprises inadequate wireless performance to communicate with a remote computing device 204 via at least one of the wireless network and a cellular network. Accordingly, when the doorbell 202 receives inadequate wireless performance, the doorbell 202 can thereby communicate with the chime 302, which in turn communicates with the remote computing device 204 to thereby communicatively couple the doorbell 202 to the remote computing device 204.

Figure 42:
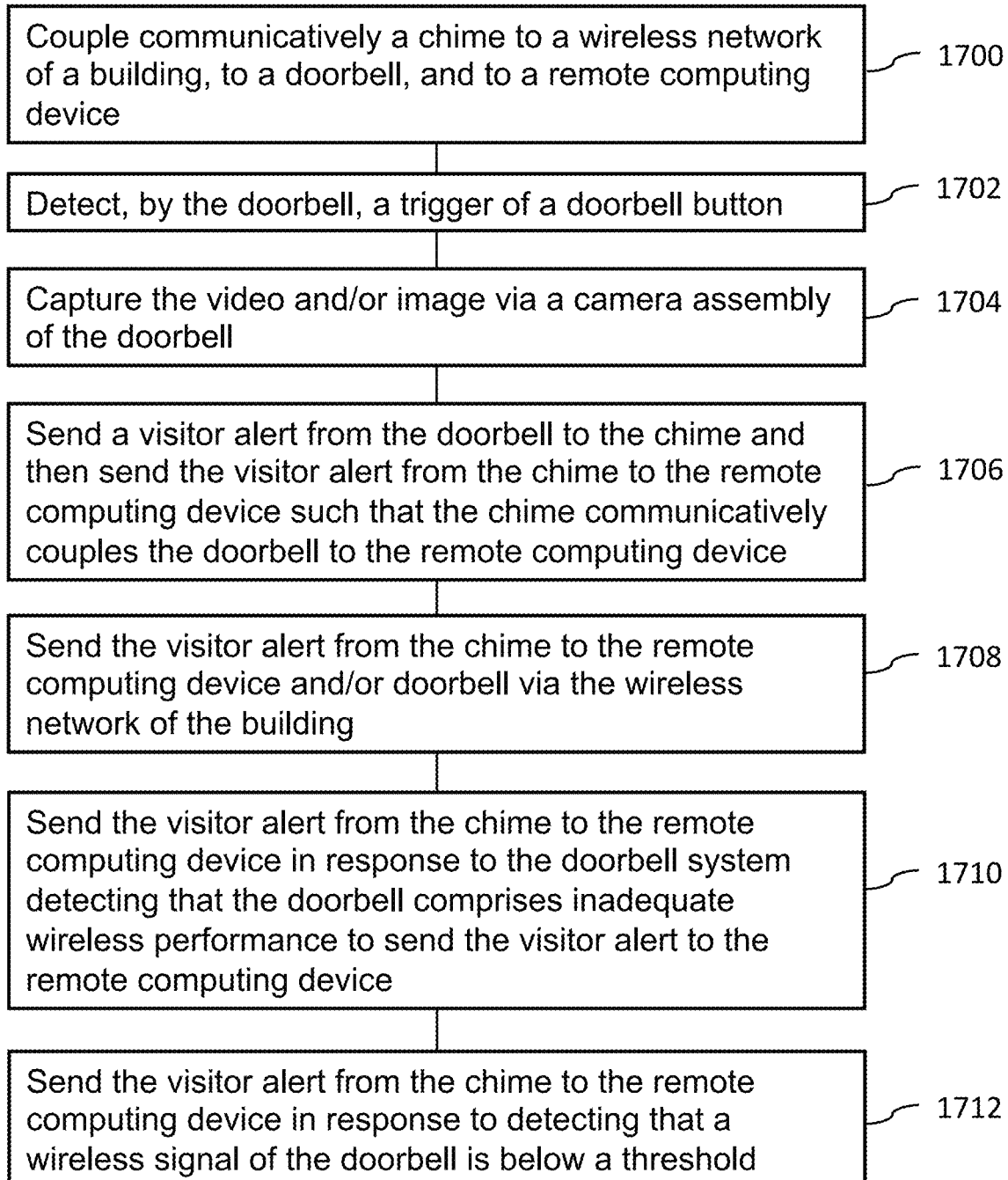

Accordingly, and as illustrated in FIG. 42, methods of using the doorbell system can include coupling communicatively the chime 302 to a wireless network of the building 300 (at step 1700). The chime 302 can thereby be communicatively coupled to the doorbell 202 and to a remote computing device 204 (at step 1700).

In embodiments, the doorbell system can be used to detect an indication of a presence of a visitor and thereby transmit the indication from the doorbell 202 to the remote computing device 204 via the chime 302. The presence of the visitor can be detected via a variety of indications. For example, methods can include detecting, by the doorbell 202, a trigger of a button 212 of the doorbell 202 (at step 1702).

As further illustrated in FIG. 42, methods can also include sending an alert 232a, such as a visitor alert 232a, from the doorbell 202 to the chime 302 and thereby sending the visitor alert 232a from the chime 302 to the remote computing device 204 (at step 1706). In this manner, the chime 302 can communicatively couple the doorbell 202 to the remote computing device 204. As such, the chime 302 can serve as the hub that communicatively couples the doorbell 202 to the remote computing device 204. In some embodiments, the visitor alert 232a, 232b can be transmitted via the data file 213, first data file 213b, second data file 213a, and/or the data file 211.

Accordingly, the visitor alert 232a can be sent from the doorbell 202 to the chime 302 and/or the remote computing device 204 by a variety of methods. For example, in some embodiments, the doorbell 202 can be communicatively coupled to the chime 302 via a wire, a wireless network of the building 300, and/or a cellular network. As well, the chime 302 can be communicatively coupled to the remote computing device 204 via the wireless network of the building 300 and/or a cellular network. Methods can thereby include sending the visitor alert 232a from the doorbell 202 to the chime 302 via any combination of transmission systems including the wire, wireless network of the building 300, and/or cellular network (at step 1708). As well, methods can include sending the visitor alert 232a from the chime 302 to the remote computing device 204 via any combination including the wireless network of the building 300 and/or cellular network (at step 1708).

In some situations, the doorbell 202 may receive a wireless signal, but the wireless signal may be inadequate to transmit specific communications from the doorbell 202 to the remote computing device 204. In these situations, the chime 302 may serve as the communication hub between the doorbell 202 and the remote computing device 204. Accordingly, methods may include sending the visitor alert 232a from the chime 302 to the remote computing device 204 in response to the doorbell system detecting that the doorbell 202 comprises inadequate wireless performance to send the visitor alert 232a to the remote computing device 204 via at least one of the wireless network and a cellular network (at step 1710). Described differently, some methods can include sending the visitor alert 232a from the chime 302 to the remote computing device 204 in response to the doorbell system detecting that a wireless signal of the doorbell 202 is below a threshold (at step 1712).

Figure 43:
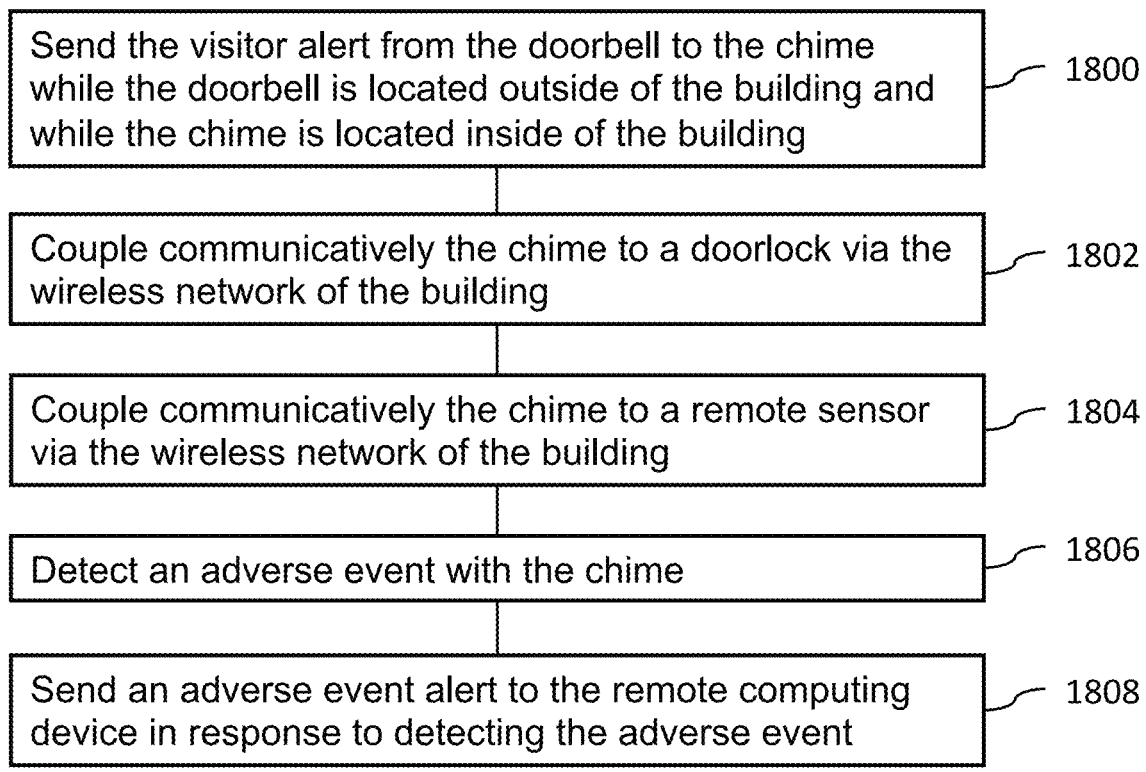

The doorbell 202, remote computing device 204, and the chime 302 may be located in different locations with respect to each other. For example, the doorbell 202 may be located outside of the building 300, the chime 302 may be located inside the building 300, and the remote computing device 204 can be remotely located with respect to the building 300. As illustrated in FIG. 43, methods may include sending the visitor alert 232a from the doorbell 202 to the chime 302 while the doorbell 202 is located outside the building 300 and while the chime 302 is located inside the building 300 (at step 1800). As well, methods may include sending the visitor alert 232a from the chime 302 to the remote computing device 204 that may be located inside or outside of the building 300.

The visitor alert 232a can take various forms that alert a user that a visitor is present at the doorbell 202 or that a visitor has left a message for the user via the doorbell 202. In this regard, the visitor alert 232a can comprise a video, an image, a sound, a text message, an email, a phone call, and the like. With reference to FIG. 42, methods can include capturing the video and/or image via a camera assembly 208 of the doorbell 202 (at step 1704). As well, in embodiments where the visitor alert 232a comprises a sound, methods can include recording the sound with a microphone 484 of the doorbell 202. Methods can even include the visitor making a phone call through the doorbell 202 to the remote computing device 204, whereby the chime 302 communicatively couples the doorbell 202 to the remote computing device 204 to enable the phone call.

Upon the doorbell 202 capturing video, images, sounds, and the like, the doorbell system can thereby include various communications between the doorbell 202 and the chime 302, and between the chime 302 and the remote computing device 204. For example, the doorbell system can include a first communication from the doorbell 202 to the chime 302. The first communication can include a video and/or image taken by a camera 208 of the doorbell 202. Accordingly, the doorbell system can include a second communication from the chime 302 to the remote computing device 204. The second communication can also comprise the video.

Even still, the chime 302 can be communicatively coupled via the wireless network and/or cellular network to other peripheral devices, such as a door lock (e.g. a smart door lock) (at step 1802), a remote sensor (e.g. a fire alarm, a smoke alarm, a carbon monoxide detector, and a burglar alarm) (at step 1804), and the like. In this regard, the chime 302 can serve as the communication hub, not only between the doorbell 202 and the remote computing device 204, but also between the doorbell 202, the remote computing device 204, the door lock, the remote sensor, and any other peripheral device.

By configuring the chime 302 as the communication hub between such devices, the chime 302 may be used to transmit and communicate messages and instructions between devices. For example, a user may enter an instruction on a remote computing device 204 to lock a front door lock. The instruction may then be sent from the remote computing device 204 to the chime 302 whereby the chime 302 sends the instruction to the front door lock to move to a locked position. In response, the front door lock may lock the front door.

In another example, the chime 302 may detect an indication of an adverse event and/or receive the indication of the adverse event from the remote sensor. The adverse event can comprise various events, such as a motion, breaking glass, fire, a fire alarm sound, smoke, and the like. Accordingly, methods can include directly detecting an adverse event with the chime 302 (at step 1806), such as detecting the sound of glass breaking via a microphone of the chime 302. As well, methods can include the chime 302 receiving an indication of the adverse event from the remote sensor that is communicatively coupled to the chime 302, whereby the remote sensor is configured to detect adverse events. As illustrated in FIG. 43, methods can include sending an alert 232b of the adverse event (e.g. an adverse event alert 232b) to the remote computing device 204 in response to detecting the adverse event (at step 1808). As should be appreciated, the adverse event alert 232b can comprise a notification of the adverse event to thereby put the user on notice of the adverse event.

The chime 302 can be configured to communicate with other devices, such as the remote computing device 204, remote sensors, and the like, via any wireless personal area network. For example, the chime 302 can be configured to communicate via Bluetooth, Bluetooth low energy, and the like. In this manner the chime 302 can communicate with Bluetooth low energy tags.

In various embodiments, the chime 302 may include a light configurable to illuminate an area or provide ambient lighting for comfort, such as a nightlight. The light may comprise the diagnostic light 216, the power indicator light 220, and/or any other light electrically coupled to the chime 302. As well, the light may be activated by various means, such as in response to an audible message from a user (e.g. "Max, turn on the light"). Even still, the light may be configurable to activate in response to external conditions, such as darkness of an adjacent area, much like a nightlight.

Referring now to FIG. 36, a system can include a remote sensor 418 that is located outside of the doorbell 202, outside of the chime 302, and outside of the remote computing device 204. The remote sensor 418 can be located inside or outside of the building 300. The remote sensor 418 can include a speaker 488c that can emit sounds 236 (e.g., alarm sounds). A microphone 484b (shown in FIG. 31) of the chime 302 can detect (e.g., "hear") the sounds 236. Then, the chime 302 can send a notification to the remote computing device 204 in response to detecting the sounds 236 and/or in response to receiving a wireless communication 230 from the remote sensor 418.

Remote sensors 418 can include a fire alarm, a smoke alarm, a carbon monoxide detector, a motion sensor, a glass-break sensor, and a burglar alarm. For example, the chime 302 can listen for a smoke alarm. Then, the chime 302 can send a notification to the remote computing device 204 in response to hearing the alarm sound of the smoke alarm.

Some embodiments include sending a second alert from the chime 302 to the remote computing device 204 in response to receiving, by the chime 302, a communication from the remote sensor 418. Several embodiments include coupling communicatively the chime 302 to a remote sensor 418. The remote sensor 418 can comprise at least one of a fire detector, a smoke detector, and a carbon monoxide detector. Embodiments can also include sending a second alert from the chime 302 to the remote computing device 204 in response to receiving, by the chime 302, a communication from the remote sensor 418.

Several embodiments comprise detecting, by a microphone 484b (shown in FIG. 31) of the chime 302, an alarm sound emitted by a remote sensor 418, and then sending a second alert from the chime 302 to the remote computing device 204 in response to detecting the alarm sound. Some embodiments include detecting, by a microphone 484b of the chime 302, an alarm sound emitted by a remote smoke detector (e.g., 418), and then sending a second alert from the chime 302 to the remote computing device 204 in response to detecting the alarm sound. Several embodiments include detecting, by a microphone 484b of the chime 302, an alarm sound emitted by a remote motion sensor device (e.g., 418), and then sending a second alert from the chime 302 to the remote computing device 204 in response to detecting the alarm sound.

Burglars often break glass windows and glass doors to enter homes and other buildings. Some embodiments include detecting, by a microphone 484b of the chime 302, glass breaking, and then sending a second alert from the chime 302 to the remote computing device 204 in response to detecting the glass breaking.

Some systems include a remote sensor 418 having at least one of a fire detector, a smoke detector, a carbon monoxide detector, a motion detector, and a glass-break detector. The remote sensor 418 can be communicatively coupled to the chime 302 (e.g., via wireless communication 230). Systems can include a third communication from the remote sensor 418 to the chime 302.

Several systems include a chime 302 that has a microphone 484b (shown in FIG. 31). Systems can also include a remote sensor 418, an alarm sound 236 emitted by the remote sensor 418, and a third communication sent from the chime 302 to the remote computing device 204 in response to the microphone 484b of the chime 302 detecting the alarm sound 236.

The following patent is incorporated herein by reference: U.S. Pat. No. 7,583,191, entitled SECURITY SYSTEM AND METHOD FOR USE OF SAME, and filed Nov. 14, 2006.

Remote Commuting Device and Appliance Embodiments

The use of communication systems incorporating "smart appliances," such as refrigerators, ranges, microwaves, dishwashers, laundry machines, dryers, and vacuum cleaners— to name but a few examples—have become more popular with the increase of computing power and network capability. A smart appliance is an electronic device, generally connected to other devices or networks via different wireless protocols such as Bluetooth, NFC, WiFi, 3G, etc., that can operate to some extent interactively and autonomously. In those cases where one is unable to access the computing devices referenced above, communication between a remotely located person and a visitor can occur directly through a smart appliance over a wireless network. Incorporating smart appliances into the communication system 200 provides the remotely located individual (e.g., a homeowner) a more secure, reliable, and convenient way of detecting and interacting with visitors. Throughout this disclosure the terms "smart appliance" and "appliance" be interpreted to mean the same thing and can be used interchangeably.

Figure 44:
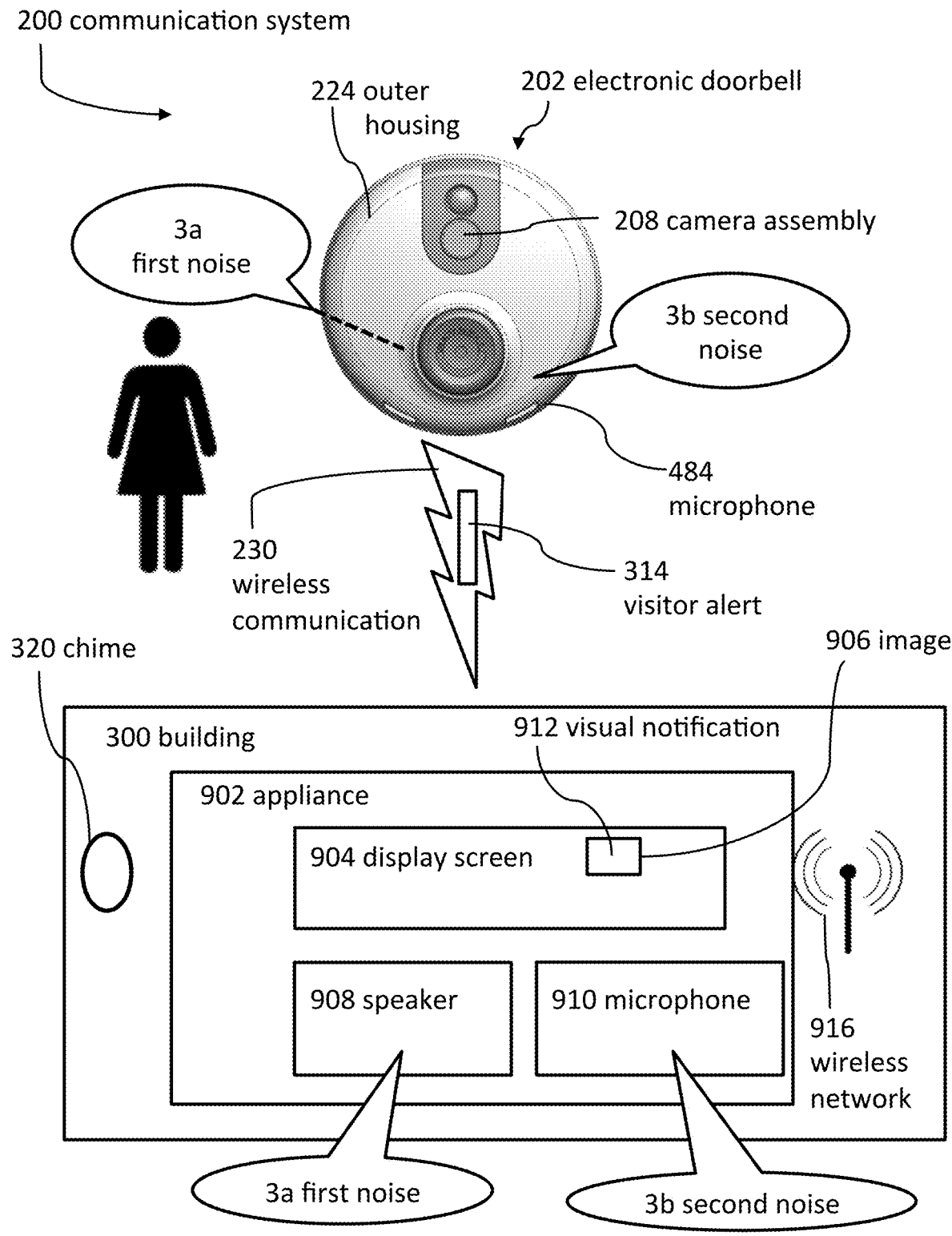
FIGS. 44, 45, 46, 47, and 48 illustrate a front view of the electronic doorbell, according to some embodiments.

FIG. 44 illustrates a front view of an electronic doorbell embodiment. The electronic doorbell 202 can include an outer housing 224 configurable to couple to a building 300. In some embodiments, the electronic doorbell 202 includes a camera assembly 208 coupled to the outer housing 224. The camera 208 can be configurable to capture an image 906.

In some embodiments, the electronic doorbell 202 includes a microphone 484 coupled to the outer housing 224. The microphone 484 can audibly detect a first noise 3a. The electronic doorbell 202 can include a button 212 coupled to the outer housing 224. The button 212 can enable a visitor to sound an electronic chime 320. The electronic doorbell 202 can wirelessly communicate with an appliance 902 located within the building 300.

As shown in FIG. 44, the system 200 can include an electronic doorbell 202. The system 200 can display an image 906 captured by the camera 208 of the electronic doorbell 202 on a display screen 904 of the appliance 902. For example, the electronic doorbell 202 may capture the image 906 of a visitor located at the front door adjacent to the electronic doorbell 202, and the electronic doorbell 202 may send (directly or indirectly) the image 906 to a smart refrigerator whereby the smart refrigerator displays the image 906 on a display screen of the refrigerator.

The system 200 may be configured to enable two-way communication, whereby the person located near the appliance 902 can not only see the image 906 of the visitor, but also be able to speak to the visitor. Accordingly, as shown in FIG. 44, a microphone 484 of the electronic doorbell 202 can detect a first noise 3a from the visitor and the first noise 3a can be transmitted to the appliance 902, whereby the first noise 3a is emitted by a speaker 908 of the appliance 902. As well, a microphone 910 of the appliance 902 can detect a second noise 3b from the visitor and the second noise 3b can be transmitted to the appliance 902, whereby the second noise 3b is emitted by a speaker 908 of the appliance 902.

As shown in FIG. 44, the system 200 may be configured to emit a visitor alert 914, whereby the electronic doorbell 202 wirelessly transmits a visitor alert 914 to the appliance 902. In some embodiments, the visitor alert 914 comprises one of a notification that a visitor is present at the electronic doorbell 202 and a notification that the visitor has left a message via the electronic doorbell 202. In this way, a user may know which visitor was present at the home, what their purpose was, and when they visited. For instance, one may not be available to accept a package from a delivery service. However, the system 200 can detect the delivery person's presence via the visitor alert 914 and the delivery person can leave a message via the electronic doorbell 202 as to scheduling an alternate time for delivery of a package or, in some cases, instructions for where the package has been placed. The delivery person's presence and identity (detected via the camera 208) can be transmitted by the system 200 and displayed on the display screen 904 of the appliance 902 via an alert message, such as "One Missed Visitor." Furthermore, the delivery person's message can be emitted by the speaker 908 of the appliance 902.

Additionally, FIG. 44 shows an embodiment of the system 200 whereby the visitor alert 914 is sent from the electronic doorbell 202 to the appliance 902 via the wireless network 916 of the building 300. For instance, the visitor alert 914 can be transmitted from the electronic doorbell 202 to the appliance 902 via a WiFi networking system. In the event the WiFi system is inoperable, the electronic doorbell 202 can be connected to a wireless cellular system via a mobile "hotspot" device, such as an iPhone, which establishes wireless connectivity to WiFi enabled devices (e.g., appliance 902) via the mobile carrier's network.

Additionally, FIG. 44 also illustrates the visitor alert 914 having an audible notification emitted by a speaker 908 of the appliance 902. The audible notification can take innumerable forms, such as a preprogrammed message emitted from the speaker 908 of the appliance 902 indicating the visitor's presence, such as "Visitor Detected." If the system 200 recognizes the visitor via the doorbell camera's 208 facial recognition software, the audible notification emitted by the speaker 908 of the appliance 902 can specify the visitor's identify (e.g., "Erin Keyes is at the door.") The user may then view and verify the visitor's identity on the display screen 904 of the appliance 902.

Furthermore, FIG. 44 illustrates that the visitor alert 914 can even comprise a visual notification 912 displayed on the display screen 904 of the appliance 902. As well, the visual notification 912 can include a video and/or a still image. Specifically, the visitor alert 912 can comprise a live-video feed of the visitor standing adjacent the doorway as detected by the camera 208. In the event that the visitor's face cannot be identified via the live feed—the visitor might be moving around too quickly for identification, or may have already left the doorway before the user can identify the visitor on the display screen 904 of the appliance 902—a still image of the visitor can be displayed on the display screen 904 of the appliance 902 for closer examination. This still image can be produced by pausing the live feed through a playback function. Alternatively, the system 200 can select a default still image of the visitor that is recorded by the camera 208 and displayed on the display screen 904 of the appliance 902. This default still image will be recorded by the camera 208 after a predetermined time when the visitor's presence is detected by the system 200.

Additionally, the display screen 904 of the appliance 902 can identify and record the presence of numerous visitors while the user is away form the building. For example, a user who is on vacation may not be able to receive several visitors at her home. The camera 208 of the electronic doorbell 202 can detect and record the presence of these visitors. Accordingly, the visual notification 912 can show at least one of a still image and a video of these visitors, as well as other pertinent information, such as the visitor's identity (if known), and their date and time of arrival. (E.g., "Visitor 1: Aaron Keys arrived on Dec. 25, 2016 at 1:30 pm: Visitor 2: Tommy No arrived on Dec. 26, 2016 at 1:00 am.") Even still, the system 200 can provide advanced information that may be pertinent to the homeowner. (E.g. "Visitors 3 & 4: George and Xiyan arrived holding hands on Dec. 31, 2016 at 11:00 pm: Visitor 5: Unknown person arrived wearing a purple uniform and holding a package on Jan. 2, 2017 at 12:13 pm.)

The system 200 may be configured to send two-way wireless communication from the electronic doorbell 202 to the appliance 902 (e.g. wireless communication 230*a*) and from the appliance 902 to the electronic doorbell 202 (e.g. wireless communication 230*b*). Accordingly, in some embodiments, when the electronic doorbell 202 receives the wireless communication 230*b* from the appliance 902, at least one of the camera 208 and microphone 484 can change from a sleep mode to an alert mode that consumes more power than the sleep mode. For instance, the user can initiate an "On-Demand" live-feed of the doorway by speaking a command message into the speaker 908 of the appliance 902, such as "Show me live-feed." This message can be transmitted from the appliance 902 via a wireless communication 230*b* over the wireless network 916 to the electronic doorbell 202. At this point, the camera 208 and the microphone 484 of the electronic doorbell 202 can be awakened from a sleep mode to an alert mode whereby the electronic doorbell camera 208 can be enabled to record video and the microphone 484 can be enabled to record audio data.

Figure 45:
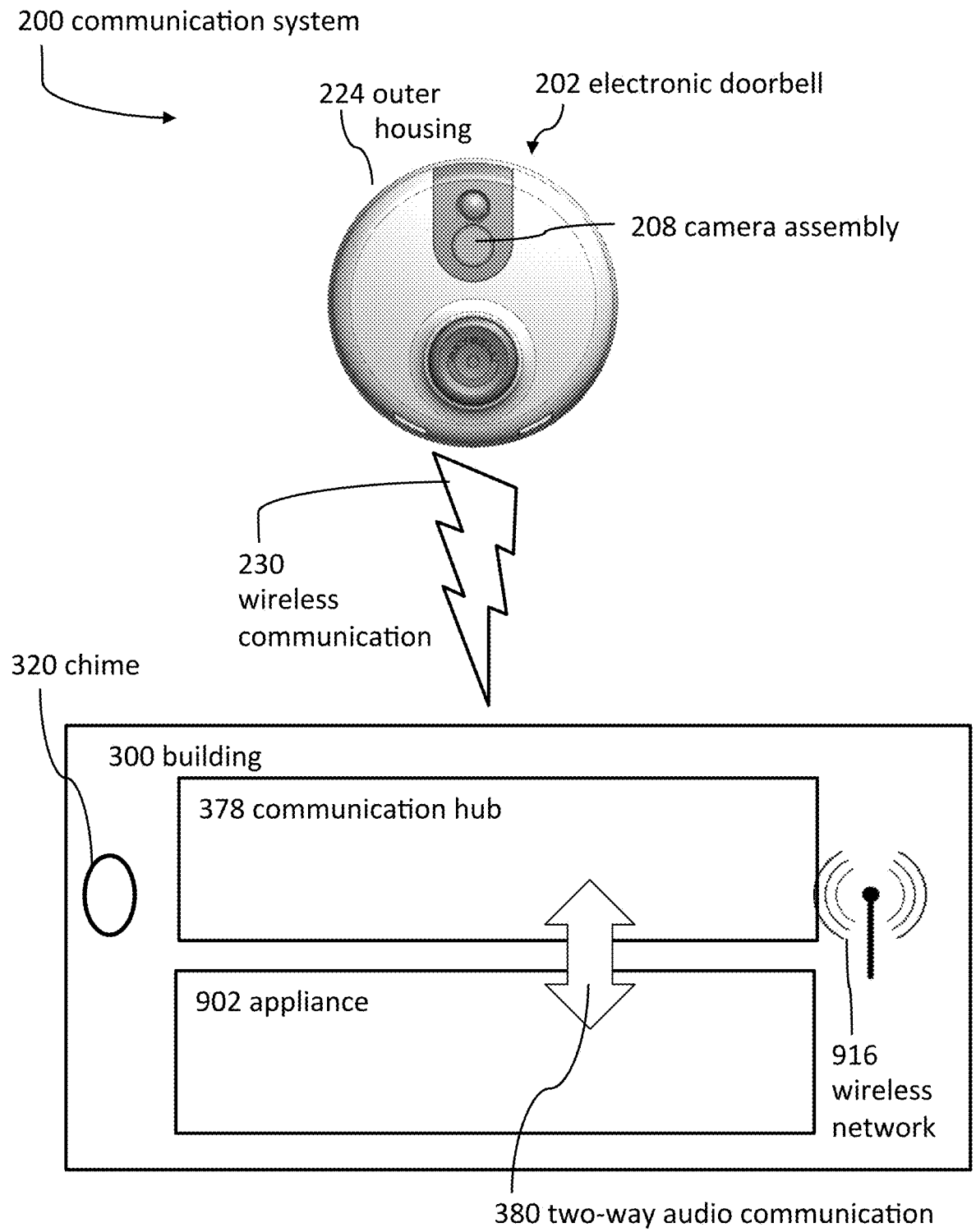

Now with reference to FIG. 45, the electronic doorbell 202 can be configured to allow two-way audio communication 380 between the appliance 902 and the electronic doorbell 202 via a communication hub 378. For example, in certain situations, the system 200 can be configured to detect whether the doorbell 202 comprises inadequate wireless performance to communicate with a remote computing device 204 or the appliance 902 over the wireless network 916. Accordingly, when the doorbell 202 receives inadequate wireless performance, the doorbell 202 can thereby communicate with a chime 302, which in turn communicates with the appliance 902 to thereby communicatively couple the doorbell 202 to the appliance 902.

Figure 46:
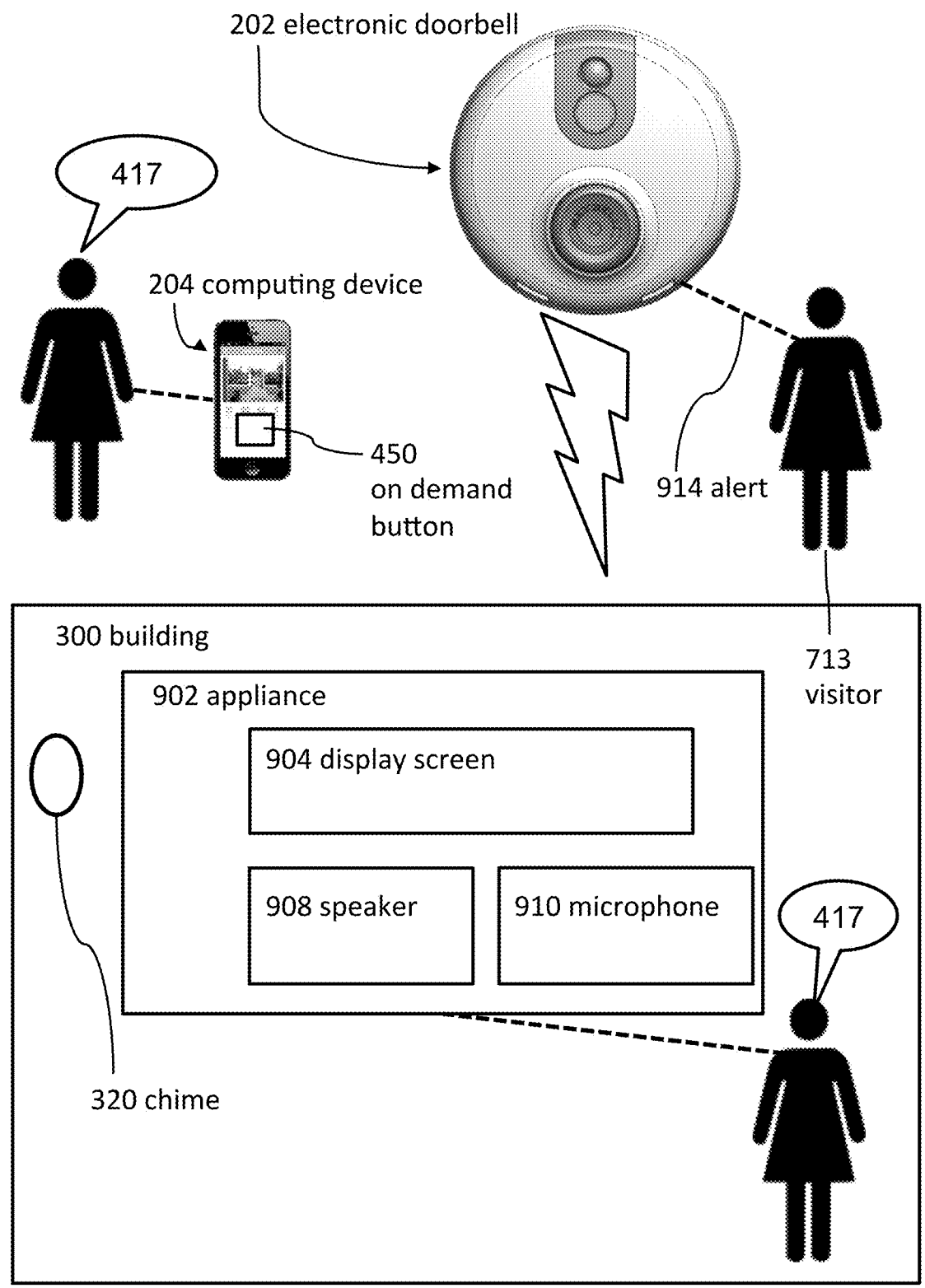

As shown in FIG. 46, the system 200 can include a visitor alert 914 received by the appliance 902. The visitor alert 914 can include a notification that a visitor is present at the electronic doorbell 202 and/or a notification that the visitor has left a message via the electronic doorbell 202. As previously mentioned, the appliance 902 can include a display screen 904 and a speaker 908, to thereby notify the user via a visitor alert 914 that a visitor has been detected by the electronic doorbell 202. For example, a user who is vacuuming his living room may be unable to hear the electronic chime 320 when the electronic doorbell 202 detects the presence of a visitor. However, the vacuum cleaner (appliance 902) will notify the user via a visitor alert 914 on the display screen 904 of said vacuum cleaner, notifying the user that the visitor is present at the electronic doorbell 202, or that the visitor has left a message via the electronic doorbell 202.

As referenced above, several embodiments include "On-Demand" service. With respect to FIG. 46, software can be implemented which starts a video and audio feed On-Demand, which can be viewed from at least one of the remote computing device 204 or the smart appliance 902. For example, a user of the remote computing device 204 who wishes to determine whether there is any activity occurring near the electronic doorbell 202 can initiate communication via the speaker 488 or the camera 208 of the electronic doorbell 202. Specifically, the user can initiate a live video and audio feed via the camera 208, microphone 484, and/or speaker 488 from the electronic doorbell 202 by pressing an "on-demand" button 450 on a user interface of the remote computing device 204. By pressing the "on-demand" button 450, the user can access live video and/or audio from at least one of the remote computing device 204, e.g., smartphone or tablet, and the display screen 904 of the appliance 414.

Additionally, one can access an "On-Demand" live video feed of the electronic doorbell 202 by speaking a predetermined word into the microphone 910 of the appliance 902. Accordingly, a live video feed of the electronic doorbell 202 can be shown on the display screen 904 of the appliance 902. For example, a user can initiate a live video feed by speaking an audible message 417, such as "show me live feed" into the microphone of at least one of the remote computing device 204 or the appliance 902.

Figure 47:
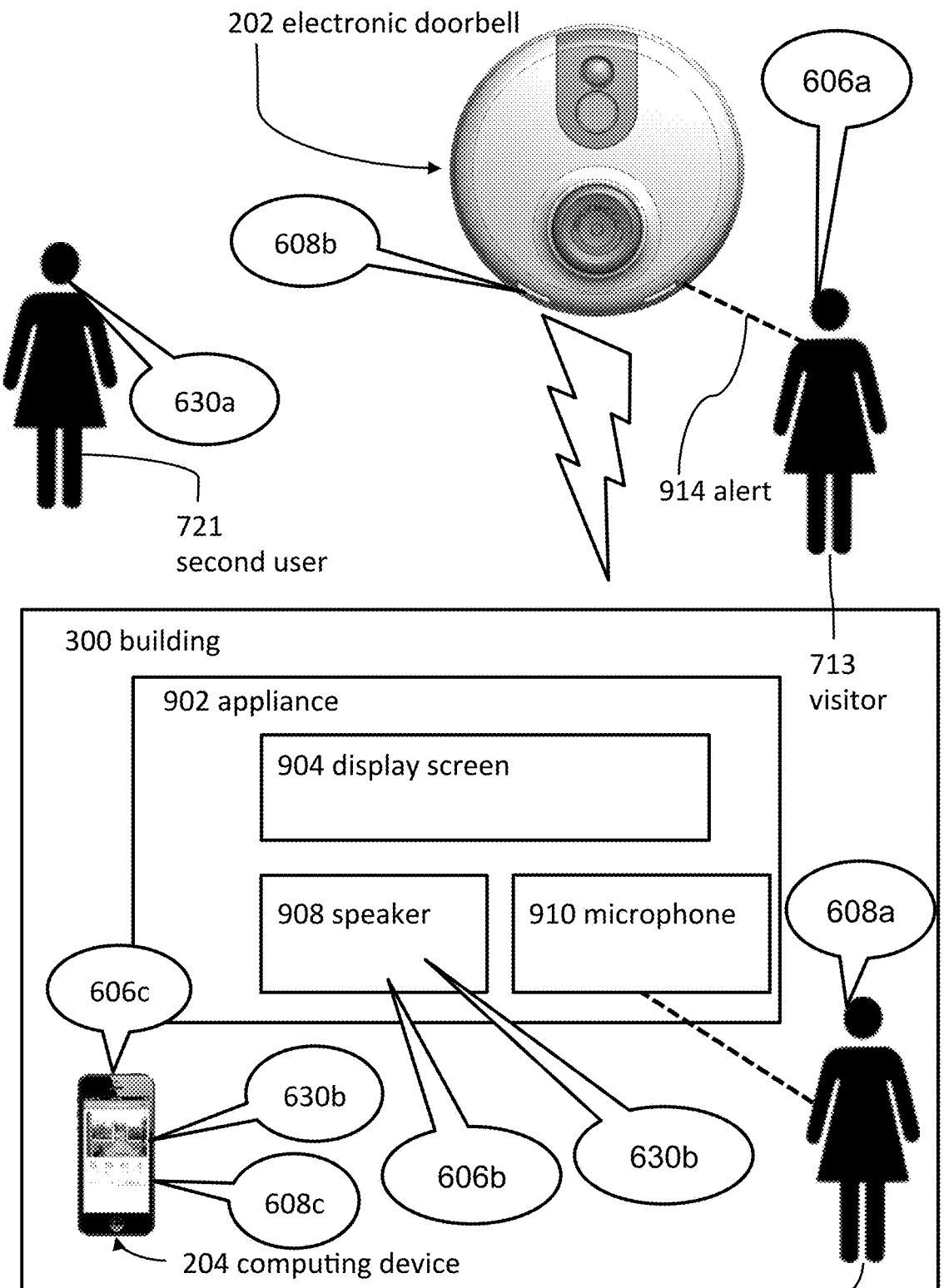

FIG. 47 illustrates the system 200 comprising a first audible message 606*a* sent by visitor 714 and received by the microphone 484 of the electronic doorbell 202. The first audible message 606*b* can be emitted by a speaker 908 of the appliance 902. For example, a visitor can speak an audible message 606*a*, such as "Hello, is anybody home?" into the microphone 488 of the electronic doorbell 202. This first audible message 606*b* can then be emitted by a speaker 908 of the appliance 902, notifying the user of the visitor's presence. Additionally, the audible message 606*c* can also be emitted from the speaker of the remote computing device 204.

Furthermore, FIG. 47 illustrates how the visitor and user can have a conversation via the electronic doorbell 202 and the appliance 902. Specifically, once the user receives the first audible message 606*b* on the speaker 908 of the appliance 902, the user can send a second audible message 608*a* (e.g., "Yes, I'm here!") received by a microphone 910 of the appliance 902. The second audible message 608*b* can concurrently be emitted by a speaker 488 of the electronic doorbell 202. To provide even greater coverage of the system 200, the second audible message 608*c* can also be emitted on the speaker of the remote computing device 204.

Accordingly, FIG. 47 demonstrates how a resident of the building 300 can use a smartphone to directly converse with the visitor via the electronic doorbell 202. Specifically, the user can send a third audible message 630*a* received by a microphone 430 of the remote computing device 204 (e.g. a smartphone or tablet). The third audible message 630*b* can concurrently be emitted by the speaker 908 of the appliance 902. As previously stated, the first audible message 606*c* and second audible message 608*b* are emitted by the speaker 810 of the remote computing device 204. In this way, the user can integrate her remote computing device 204 into the system 200 to provide greater coverage and security.

In some embodiments, a visitor 713 can send a first audible message 606*a* via the microphone 484 of the electronic doorbell 202, which can be emitted by the speaker 908 of the appliance 902 and/or the speaker 810 of the remote computing device 204. A first user 720 can send a second audible message 608a via the microphone 910 of the appliance 902, which can be emitted by the speaker 810 of the remote computing device 204 and/or the speaker 488 of the electronic doorbell 202 (second audible message 608b and 608c, respectively). A second user 721 can send a third audible message 630a via the microphone 430 of the remote computing device 204, which can be emitted by the speaker 488 of the electronic doorbell 202 and/or the speaker 908 of the appliance 902 as third audible message 630a and 630b respectively. Accordingly, the first and second user can hold a real time conversation with the visitor, providing greater coverage and security.

Figure 48:
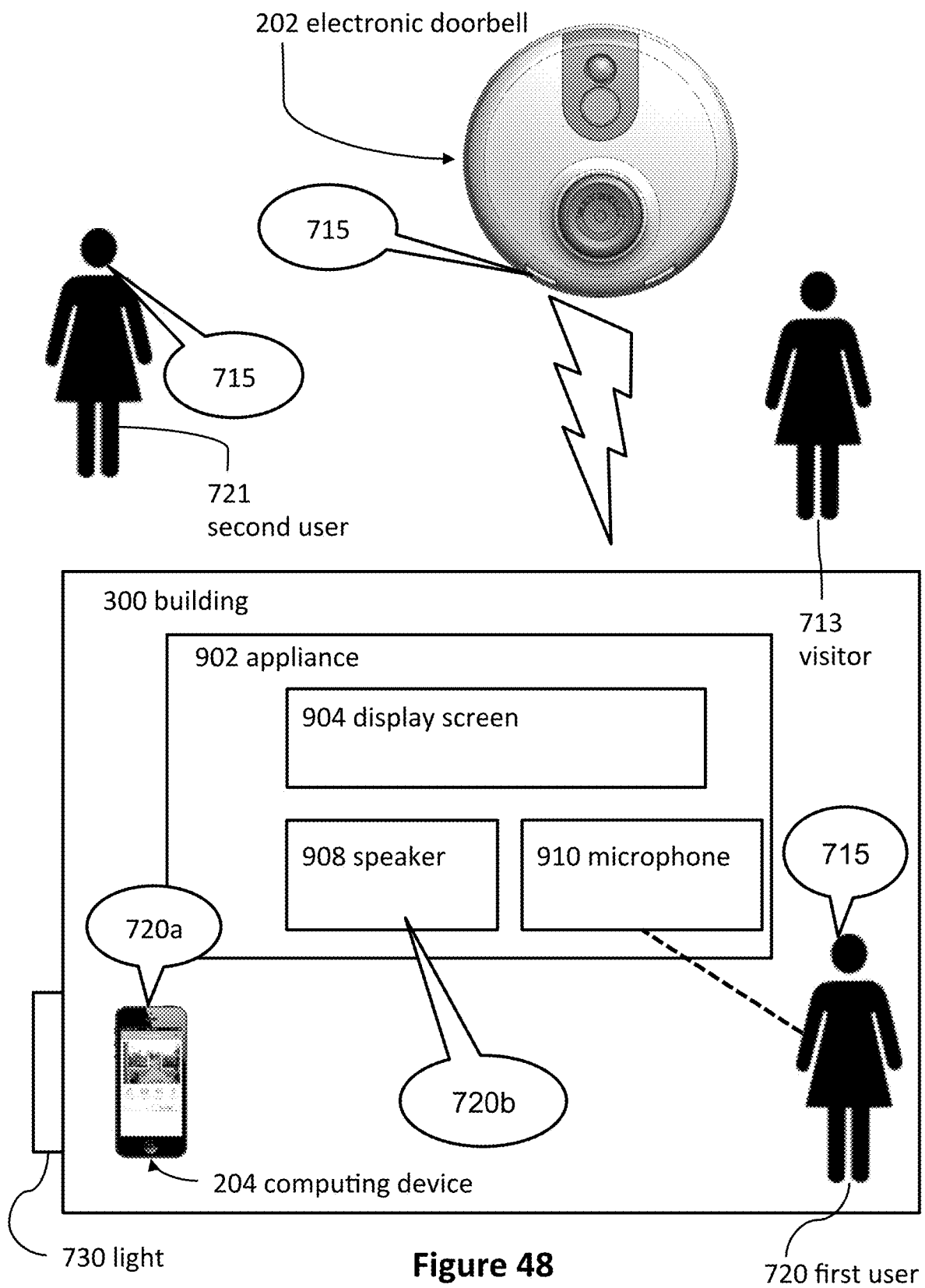

FIG. 48 shows an embodiment intended to provide enhanced privacy and security for users (e.g. residents of the building 300). For example, in some embodiments, the electronic doorbell 202 may receive an audible message 715 from at least one of a speaker 810 of a remote computing device 204 and a speaker 908 of an appliance 902 located within a building 300.

In some embodiments, the audible message 715 is not emitted by a speaker 488 of the electronic doorbell 202. The audible message 715 may be a predetermined message (e.g. "Call 911"). In this regard, if the user feels that his or her safety is threatened by the presence of the visitor, they user may speak the predetermined message. Accordingly, the predetermined message may not be emitted by the speaker of the electronic doorbell 202, so as to protect the safety and privacy of the user from the visitor, and instead the system 200 may perform an event, such as contact local emergency personnel to notify them of the situation. For example, the doorbell 202 may detect a visitor at the front door at 11:30 µm. The resident of the home may be a single women who is afraid to answer the door because the visitor is a threatening looking man and it is late at night. The woman may speak the following message into the microphone 910 of the appliance 902 and/or the microphone of the remote computing device 204, "Call police! Someone is trying to break into my home!" The system 200 may thereby call the police, but to protect the safety of the resident, the speaker 404 of the doorbell 202 will not emit the message, "Call police! Someone is trying to break into my home!" Instead the speaker 404 of the doorbell 202 may emit no sound or the speaker 404 may emit a different message altogether. Accordingly, the visitor may have no idea that the resident just notified the local law enforcement.

As shown in FIG. 48 the audible message 715 may be a first audible message 715a and/or a second audible message 715b whereby either message comprises at least one of a predetermined word and a predetermined message. For instance, if a visitor 713 is determined to be unfriendly by the system 200, at least one of the first user 720 and second user 721 may utter a predetermined word or message (715a and 715b), such as "Alert!, Alert!" into at least one of the microphone of the remote computing device 204 and the microphone 910 of the appliance 902.

For example, FIG. 48 discloses an action 716 performed by the electronic doorbell, wherein the action is performed in response to the system 200 receiving the audible message 715. Upon detection of the unfriendly visitor via the electronic doorbell 202, the first user may utter a predetermined word 715a or message, such as "Alert, Alert!" into the microphone the microphone 910 of the appliance 902. This predetermined word or audible message 715a will trigger an event 716, which may be an audible command issued from the speaker 488 of the system 200, such as "Leave the Premises Now!" to warn the unfriendly visitor away. In other embodiments, the event 716 may constitute a notification to the police for assistance.

As well, the action 716 performed by the system 200 can comprise at least one of recording an image with the camera 208 of the electronic doorbell 202, recording a noise with the microphone 484 of the electronic doorbell 202, and illuminating a light 730 coupled to the building 300. Additionally, the system 200 may turn on the light 730 coupled to the building 300 in response to receiving the predetermined audible message 715. For instance, a distressing audible message 715, such as "Alert! Alert!" can trigger flashing lights 730 on the side of the building 300, which would obviously draw attention. By contrast, a less distressing predetermined audible message 715, such as "Welcome!," may cause the electronic doorbell system 700 to emit a non-flashing softer light 730 onto the visitor.

In some embodiments, the speaker 810 of the remote computing device 204 can be configured to emit a first warning sound 720a in response to the initiation of the event. In some embodiments, the speaker 908 of the appliance 902 can be configured to emit a second warning sound 720b in response to the initiation of the event. For example, if the system 200 transmits an alert that indicates an emergency, then the system 200 can emit a first warning sound 720a from the speaker 810 of the remote computing device 204, as well as a second warning sound 720b from the speaker 908 of the appliance 902 that indicates danger. The referenced speakers can be configured to emit a wide-range of sounds and various decibel levels depending on the application. For example, a more severe alert can be louder than a less severe alert. The system 200 can alert an occupant of suspicious smoke by saying the location of the smoke and the time the smoke was detected.

For instance, the speaker 810 of the remote computing device 204 and the speaker 908 of the appliance 902 can emit a first warning sound 720a and a second warning sound 720b, respectively), such as "Danger, Danger, Danger" to alert an occupant of the building 300. The sound emitted by the system 200 can be unique to the type of alert. For example, if a fire alert is transmitted by the electronic doorbell 202, then the system 200 can emit a voice that says "Fire, Fire, Fire" and repeats at a set interval on the speaker 810 of the remote computing device 204 and the speaker 908 of the appliance 902. Various sounds can also be used to selectively alert other occupants. For example, a high frequency sound of 24 kHz to 45 kHz can selectively alert canine occupants of the building 300 without alerting a human. In another example, a sound from 17 kHz to 23 kHz may selectively alert children but not adults. Various patterns of sounds can also be produced. For example, the "SOS" Morse code pattern may be used to indicate distress.

Interpretation

None of the steps described herein is essential or indispensable. Any of the steps can be adjusted or modified. Other or additional steps can be used. Any portion of any of the steps, processes, structures, and/or devices disclosed or illustrated in one embodiment, flowchart, or example in this specification can be combined or used with or instead of any other portion of any of the steps, processes, structures, and/or devices disclosed or illustrated in a different embodiment, flowchart, or example. The embodiments and examples provided herein are not intended to be discrete and separate from each other.

The section headings and subheadings provided herein are nonlimiting. The section headings and subheadings do not represent or limit the full scope of the embodiments described in the sections to which the headings and subheadings pertain. For example, a section titled "Topic 1" may include embodiments that do not pertain to Topic 1 and embodiments described in other sections may apply to and be combined with embodiments described within the "Topic 1" section.

Some of the devices, systems, embodiments, and processes use computers. Each of the routines, processes, methods, and algorithms described in the preceding sections may be embodied in, and fully or partially automated by, code modules executed by one or more computers, computer processors, or machines configured to execute computer instructions. The code modules may be stored on any type of non-transitory computer-readable storage medium or tangible computer storage device, such as hard drives, solid state memory, flash memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method, event, state, or process blocks may be omitted in some implementations. The methods, steps, and processes described herein are also not limited to any particular sequence, and the blocks, steps, or states relating thereto can be performed in other sequences that are appropriate. For example, described tasks or events may be performed in an order other than the order specifically disclosed. Multiple steps may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present.

The term "and/or" means that "and" applies to some embodiments and "or" applies to some embodiments. Thus, A, B, and/or C can be replaced with A, B, and C written in one sentence and A, B, or C written in another sentence. A, B, and/or C means that some embodiments can include A and B, some embodiments can include A and C, some embodiments can include B and C, some embodiments can only include A, some embodiments can include only B, some embodiments can include only C, and some embodiments include A, B, and C. The term "and/or" is used to avoid unnecessary redundancy.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein.

What is claimed is:

1. An electronic doorbell comprising:
   an outer housing configurable to couple to a building;
   a camera coupled to the outer housing, the camera configurable to capture an image;
   a microphone coupled to the outer housing, the microphone configurable to detect a noise;
   a speaker coupled to the outer housing, the speaker configurable to emit sound; and
   a motion detector coupled to the outer housing, the motion detector configurable to detect motion along an outside portion of the building,
   wherein the electronic doorbell is configurable to:
      enable an entity to cause a chime to sound;
      wirelessly receive a notification from an appliance located within the building;
      change a component of the electronic doorbell from a sleep mode to an alert mode, in response to receiving the notification, wherein the component is selected from the group consisting of the camera, the microphone, the speaker, and the motion detector; and
      cause the appliance to display the image captured by the camera on a display screen of the appliance, wherein the appliance is selected from the group consisting of a refrigerator, a range, a microwave, a dishwasher, a laundry machine, a dryer, and a vacuum.

2. The electronic doorbell of claim 1, wherein the speaker of the electronic doorbell comprises a first speaker, and wherein the electronic doorbell is further configurable to cause a second speaker coupled to the appliance to emit the noise detected by the microphone.

3. The electronic doorbell of claim 1, wherein the electronic doorbell is configurable to wirelessly transmit an alert to the appliance, wherein the alert comprises a notification selected from the group consisting of a notification that the entity is present at the electronic doorbell, a notification that the entity has left a message via the electronic doorbell, and combinations thereof.

4. The electronic doorbell of claim 3, wherein the electronic doorbell is configurable to wirelessly transmit the alert to the appliance via a wireless network of the building.

5. The electronic doorbell of claim 3, wherein the speaker of the electronic doorbell comprises a first speaker, and wherein the electronic doorbell is configurable to cause a second speaker coupled to the appliance to emit an audible notification comprising the alert.

6. The electronic doorbell of claim 3, wherein the alert is configurable to cause a display screen of the appliance to display a visual notification comprising the alert, the visual notification comprising at least one of a video and a still image.

7. The electronic doorbell of claim 6, wherein the visual notification comprises the video, and wherein the electronic doorbell is further configurable to transmit the video to the appliance via a wireless network of the building.

8. The electronic doorbell of claim 1, wherein the electronic doorbell is configurable to enable two-way audio communication between the appliance and the electronic doorbell via a communication hub.

9. An electronic doorbell comprising:
a chime; and
a motion detector being configurable to detect motion along an outside portion of a building, the electronic doorbell being configurable to:
enable activation of the electronic doorbell to cause the chime to sound,
wirelessly receive a first notification from an appliance located within the building,
change a component from a sleep mode to an alert mode, in response to receiving the first notification, wherein the component is selected from the group consisting of a camera, a microphone, a speaker, the motion detector, and combinations thereof,
wirelessly send a second notification to the appliance, and
cause the appliance to display information captured by the component, wherein the appliance is selected from the group consisting of a refrigerator, a range, a microwave, a dishwasher, a laundry machine, a dryer, and a vacuum.

10. The electronic doorbell, as recited in claim 9, wherein the second notification comprises an audible notification.

11. The electronic doorbell, as recited in claim 9, wherein the second notification comprises a visual notification.

12. The electronic doorbell, as recited in claim 9, further comprising a wireless communication module.

13. The electronic doorbell, as recited in claim 12, wherein the second notification comprises a wireless communication notification.

14. The electronic doorbell, as recited in claim 9, wherein the second notification includes notification of an emergency event from an event detection device.

15. The electronic doorbell, as recited in claim 9, wherein the electronic doorbell is additionally configurable to emit a customized sound in response to a selected event.

16. The electronic doorbell, as recited in claim 15, wherein the electronic doorbell is additionally configurable to emit a customized message in response to a predetermined condition.

17. The electronic doorbell, as recited in claim 12, further comprising a microprocessor.

18. The electronic doorbell, as recited in claim 17, further comprising the camera or a different camera.

19. The electronic doorbell, as recited in claim 18, wherein the microprocessor is programmed to use facial recognition software to match facial data of an entity, received in connection with the camera, with facial data from a law enforcement database.

* * * * *